(12) United States Patent
Ishiguro et al.

(10) Patent No.: US 7,600,782 B2
(45) Date of Patent: Oct. 13, 2009

(54) AIRBAG APPARATUS

(75) Inventors: Naohiko Ishiguro, Aichi-ken (JP);
Atsushi Nagata, Aichi-ken (JP);
Kazuaki Bito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 338 days.

(21) Appl. No.: 11/600,098

(22) Filed: Nov. 16, 2006

(65) Prior Publication Data
US 2007/0145729 A1 Jun. 28, 2007

(30) Foreign Application Priority Data
Nov. 28, 2005 (JP) .............................. 2005-342497
May 17, 2006 (JP) .............................. 2006-138128

(51) Int. Cl.
*B60R 21/239* (2006.01)
(52) U.S. Cl. ..................................... 280/739
(58) Field of Classification Search ................... 280/739
See application file for complete search history.

(56) References Cited
U.S. PATENT DOCUMENTS
6,648,371 B2 11/2003 Vendely et al.
6,659,499 B2 * 12/2003 Jenkins .................... 280/735
6,773,030 B2 * 8/2004 Fischer .................... 280/739
7,303,207 B2 * 12/2007 Asai et al. ................ 280/738
7,448,646 B2 * 11/2008 Hall et al. ................ 280/739
2006/0192370 A1 * 8/2006 Abe et al. ................ 280/735
2006/0290116 A1 * 12/2006 Bradburn ................. 280/739
2007/0013177 A1 * 1/2007 Abe ......................... 280/739

* cited by examiner

*Primary Examiner*—Paul N Dickson
*Assistant Examiner*—Nicole Verley
(74) *Attorney, Agent, or Firm*—Posz Law Group, PLC

(57) ABSTRACT

The airbag apparatus includes an airbag having an exhaust hole for discharging part of inflation gas, an open/close controller for controlling opening and closing operations of the exhaust hole, and a flap element releasably joined to the open/close controller and being joined to a periphery of the exhaust hole in an outer side of the airbag which periphery is in a side facing away from the open/close controller, for opening and closing the exhaust hole. The apparatus further includes an open/close means arranged in the periphery of the exhaust hole. Upon airbag inflation, if the flap element is retained by the open/close controller, the open/close means is held down at its outer side by the flap element and keeps the exhaust hole closed. If the flap element is released from the open/close controller, the open/close means opens by the pressure of inflation gas to expand an opening area of the exhaust hole.

4 Claims, 38 Drawing Sheets

AIRBAG APPARATUS

The present application claims priority from Japanese Patent Applications No. 2005-342497 of Ishiguro et al., filed on Nov. 28, 2005, and No. 2006-138128 of Ishiguro, filed on May 17, 2006, the disclosures of which are hereby incorporated into the present application by reference.

BACKGROUND OF THE INVENTION

1. Field of the Invention

The present invention relates to an airbag apparatus provided with an airbag whose internal pressure at inflation is controllable.

2. Description of Related Art

An airbag apparatus is known from U.S. Pat. No. 6,648,371: the apparatus has an airbag provided with an exhaust hole for discharging part of inflation gas and a flap element joined to an open/close controller for opening and closing the exhaust hole. By controlling the opening and closing operations of the exhaust hole in accordance with the position or size of an occupant, the internal pressure of airbag is controlled upon inflation.

In this airbag apparatus, the flap element is formed of a flexible sheet-shaped member having a size capable of closing the exhaust hole. The flap element is joined to the open/close controller disposed proximate an inlet port of the airbag, and also to the periphery of the exhaust hole in the outer side of airbag which periphery is in a side apart from the open/close controller. The flap element is adapted to keep closing the exhaust hole when retained by the open/close controller, whereas open up to expose the exhaust hole due to the pressure of inflation gas when released from the open/close controller.

However, since the airbag apparatus includes only one flap element for opening and closing the exhaust hole, the flap element has to be sewn up to the airbag at more region other than the side facing away from the open/close controller for enhancing the sealing property when closing the exhaust hole. A patch or flap element shown in FIG. 5 of the above reference, for example, is sewn up to the periphery of a vent hole or exhaust hole also at the side closer to the open/close controller. A patch element shown in FIG. 6 is sewn up to the airbag at three sides around a plurality of vent holes except the side closest to the open/close controller. With these arrangements, if the flap element is released from the open/close controller upon airbag inflation, the vent hole is exposed only when a sewing yarn joining the flap element and the airbag is torn to separate the flap element and the airbag. That is, the sewing yarn has to be securely torn in order to open the exhaust hole.

In the prior art, moreover, the patch element in FIG. 5 has a size capable of passing through the vent hole. With this arrangement, if the patch element is retained by the open/close controller upon airbag inflation, the airbag inflates while the patch element closes the vent hole. However, if the patch element fails to securely seal the vent hole, inflation gas may leak from a gap between the vent hole and the patch element. For this reason, the apparatus has required a separate means for securely closing the vent hole to prevent gas leakage from the vicinity of the vent hole. In order to secure a stable closed condition of the vent hole it is alternatively contemplated to reduce the size of the vent hole, but a small-sized vent hole cannot discharge enough inflation gas.

SUMMARY OF THE INVENTION

The present invention contemplates to solve the above-mentioned problems, and therefore, has an object to provide an airbag apparatus capable of controlling the opening and closing operations of the exhaust hole securely with a simple structure.

The above object is achieved by an airbag apparatus including:

an airbag inflatable with inflation gas from a folded and housed state, the airbag including an exhaust hole for emitting part of inflation gas;

an open/close controller for controlling opening and closing operations of the exhaust hole;

a flap element foldable together with the airbag, the flap element being releasably joined to the open/close controller and being joined to a periphery of the exhaust hole in an outer side of the airbag which periphery is in a side facing away from the open/close controller, upon airbag inflation if the flap element is retained by the open/close controller, the flap element holding down a circumference of the exhaust hole to close the exhaust hole, and if the flap element is released from the open/close controller, the flap element opening by a pressure of inflation gas to open the exhaust hole; and an open/close means arranged around the exhaust hole in an foldable manner, the means, upon airbag inflation, if the flap element is retained by the open/close controller, being held down at an outer side thereof by the flap element to keep the exhaust hole closed, and if the flap element is released from the open/close controller, opening by the pressure of inflation gas to expand an opening area of the exhaust hole.

In the airbag apparatus thus constructed, if the airbag inflates while the flap element is held-by the open/close controller, the open/close means is pressed by the flap element from outside while closing the exhaust hole. On the other hand, if the airbag inflates with the flap element released from the open/close controller, the open/close means is allowed to open up in such a manner as to expand an opening area of the exhaust hole. That is, if the airbag inflates while the flap element is held by the open/close controller, since the flap element presses the open/close means from outside, the open/close means is prevented from floating up due to the pressure of inflation gas, and keeps closing the exhaust hole, thereby preventing gas leakage from the exhaust hole. On the contrary, if the airbag inflates with the flap element released from the open/close controller, the open/close means is allowed to open up to expand the opening area of the exhaust hole and thereby a great deal of inflation gas is emitted from the exhaust hole. As a result, emission of inflation gas from the exhaust hole, i.e. the internal pressure of the completely inflated airbag is controlled depending on whether or not the flap element is retained by the open/close controller.

Moreover, the flap element and open/close means are capable of being folded up together with the airbag, and thus can be housed together with the airbag, which contributes to keep the apparatus compact and simple.

Therefore, the airbag apparatus of the present invention is capable of controlling the opening and closing operations of the exhaust hole securely with a simple structure.

In the above airbag apparatus, it is desired that the exhaust hole is formed through a circumferential wall of the airbag in such a manner as to be opened at any time;

the open/close means is an inner flap joined to the periphery of the exhaust hole on the outer side of the airbag;

upon airbag inflation, if the flap element is retained by the open/close controller, the inner flap is held down at the outer side thereof by the flap element to close the exhaust hole, whereas if the flap element is released from the open/close controller, the inner flap opens around a first joint portion joining the inner flap to the airbag due to the pressure of inflation gas such that the exhaust hole opens to exhaust inflation gas.

With this arrangement, since the exhaust hole is formed through the airbag to open at any time, when the airbag inflates with the flap element released from the open/close controller, emission of inflation gas from the airbag is decided by the opening area of the exhaust hole, so that emission of inflation gas is stabilized.

In this airbag apparatus, it is desired that the first joint portion joining the inner flap to the airbag is located opposite from a second joint portion joining the flap element to the airbag with respect to the exhaust hole.

With this arrangement, when the airbag inflates with the flap element retained by the open/closer controller, an outer circumference of the opening end of the inner flap is held down by an area of the flap element proximate the second joint portion or the joint portion of the flap element. Accordingly, the flap element securely prevents the inner flap from opening up due to the pressure of inflation gas.

In this airbag apparatus, it is further desired that at least one of the first joint portion of the inner flap and the second joint portion of the flap element has a bent shape such that opposite ends thereof are directed toward the other joint portion, and that ends of the first joint portion and ends of the second joint portion are located proximate to each other.

With this construction, when the airbag inflates with the flap element retained by the open/close controller, outer circumferences of the vicinity of ends of the hinge portion i.e. the first joint portion of the inner flap is held down by the vicinity areas of ends of the hinge portion i.e. the second joint portion of the flap element, which further securely prevents the inner flap from opening by the pressure of inflation gas.

Moreover, in the airbag apparatus of the present invention, it will also be appreciated that:

the exhaust hole is a slit formed through a circumferential wall of the airbag;

the open/close means is constituted by a peripheral region of the slit;

upon airbag inflation, if the flap element is retained by the open/close controller, the open/close means is held down at the outer side thereof by the flap element to keep the slit closed such that the exhaust hole is kept closed, whereas if the flap element is released from the open/close controller, the open/close means opens by the pressure of inflation gas to expand an opening area of the slit whereby the exhaust hole is opened.

With this construction, the open/close means is provided by simply forming the slit in a cloth member to be the airbag. This arrangement will reduce processes and cost for manufacturing the airbag apparatus.

In this airbag apparatus, the slit desirably has a generally U-shape as viewed from outside of the airbag such that an area surrounded by the slit serves as a door that opens around a hinge portion linking ends of the slit, and such that, upon airbag inflation, if the flap element is released from the open/close controller, the door opens by the pressure of inflation gas to expand the opening area of the slit, whereby the exhaust hole is opened.

With this arrangement, when the airbag inflates with the flap element released from the open/close controller, the area surrounded by the U-shaped slit opens like a door to expose the exhaust hole. This arrangement secures a wider opening area of the exhaust hole compared to a case where the slit is straight.

In this airbag apparatus, the hinge portion of the door is desirably located opposite a joint portion of the flap element to the periphery of the exhaust hole. With this arrangement, when the airbag inflates in the retained mode of the flap element by the open/close controller, the outer circumference of the opening end of the door opposing the hinge portion is held down by a region of the flap element proximate the joint portion. Accordingly, the door is prevented from opening by the pressure of inflation gas.

In the above airbag apparatus, it is desired that:

the apparatus includes more than one inner flaps;

portions connecting the inner flaps to the airbag and a portion connecting the flap element to the airbag are arranged offset from one another to enclose the exhaust hole thoroughly; and at least one of the inner flaps has a slit through which another inner flap is inserted from inside to outside, or from outside to inside such that the inner flaps are piled up partially alternately in an in-out relationship.

With this arrangement, when closing the exhaust hole, the inner flaps overlap with one another while being partially counterchanged in the in-out relationship. If the inner flaps are pushed by the inflation gas when the airbag inflates with the flap element retained by the open/close controller, the overlap of the inner flaps is not easily dissolved because of a friction occurring on planes of the alternately piled up inner flaps. Accordingly, the inner flaps are prevented from floating up due to the pressure of inflation gas and thereby preventing gas leakage from the exhaust hole when the airbag inflates with the flap element retained by the open/close controller. On the other hand, when the airbag inflates with the flap element released from the open/close controller, the overlap of inner flaps is easily dissolved by the pressure of inflation gas, because the inner flaps are foldable together with the airbag and are merely mutually engaged by the slits formed on themselves. Accordingly, the exhaust hole opens smoothly.

The object of the present invention is also achieved by an airbag apparatus including:

an airbag inflatable with inflation gas from a folded and housed state, the airbag including an exhaust hole for emitting part of inflation gas;

an open/close controller for controlling opening and closing operations of the exhaust hole;

a flap element foldable together with the airbag, the flap element being releasably joined to the open/close controller and being joined to a periphery of the exhaust hole in an inner side of the airbag which periphery is in a side facing away from the open/close controller, upon airbag inflation if the flap element is retained by the open/close controller, the flap element holding down a circumference of the exhaust hole to close the exhaust hole, and if the flap element is released from the open/close controller, the flap element opening by a pressure of inflation gas to open the exhaust hole; wherein:

the exhaust hole is formed through a circumferential wall of the airbag in such a manner as to be opened at any time;

the flap element includes:

a main body joined to the periphery of the exhaust hole in the inner side of the airbag for closing the exhaust hole, the main body being openable around a hinge portion when the exhaust hole opens, the hinge portion being a straight joint portion joining the main body to the airbag; and a belt disposed at an end region of the main body facing away from the hinge portion, the belt being put through a vicinity area of the exhaust hole and connected to the open/close controller;

the main body has a size capable of preventing gas leakage when closing the exhaust hole and capable of passing through the exhaust hole from the hinge portion to project to outside the airbag when the exhaust hole is opened; and the belt is put through the vicinity area of the exhaust hole so that at least a region of the belt proximate the main body passes through the exhaust hole to project to outside the airbag when the exhaust hole is opened.

In the airbag apparatus having above structure, the main body of the flap element is located inside the airbag and has a size capable of preventing gas leakage when closing the exhaust hole. That is, when the airbag expands and inflates with the flap element retained by the open/close controller, the main body closes the exhaust hole tightly thereby preventing gas leakage therefrom. In this airbag apparatus, moreover, the main body of flap element and the open/close controller is located apart from each other, and the belt joined to the leading end region of the main body is put through the vicinity area of the exhaust hole. In other words, the belt located inside the airbag in the vicinity of the main body is put through the vicinity area of the exhaust hole to be located outside the airbag. Therefore, when the belt is retained by the open/close controller, a leading end region of the belt put through the airbag in the vicinity of the exhaust hole is held by the circumferential wall of airbag. As a result, when the airbag inflates with the belt of the flap element retained by the open/close controller, the belt is prevented from floating up from the exhaust hole, so that the main body seals the hole tightly and gas leakage therefrom is suppressed.

Moreover, the main body of the flap element has a size capable of passing through the exhaust hole from its hinge portion and projecting to the outside the airbag when the exhaust hole is opened. With this construction, when the airbag expands and inflates with the flap element released from the open/close controller, the main body is pushed by inflation gas and opens around its hinge portion in such a manner as to project outside the airbag from the exhaust hole, thereby opening the exhaust hole. At this time, the region of the belt located proximate the main body moves to the outside of the airbag along with the movement of the main body, which allows the main body to move to the outside smoothly. That is, with this airbag, too, when the flap element is released from the open/close controller, the main body opens automatically due to the pressure of inflation gas in such a manner as to expand the opening area of the exhaust hole. Hence, a great deal of inflation gas is emitted from the exhaust hole. Accordingly, emission of inflation gas from the exhaust hole and the internal pressure of the completely inflated airbag is controlled depending on whether or not the flap element is retained by the open/close controller.

Furthermore, in this airbag apparatus, too, the flap element is capable of being folded up together with the airbag, and thus can be housed together with the airbag, which contributes to keep the apparatus compact and simple.

Therefore, this airbag apparatus is also capable of controlling the opening and closing operations of the exhaust hole securely with a simple structure.

It is further desired in the above airbag apparatus that:
the flap element includes:
a leading end portion arranged at an end region of the main body facing away from the hinge portion, the leading end portion extending orthogonally to the belt in opposite directions and being arranged outside of the belt; and a flexible, sheet-shaped holding portion covering a region of an inner side of the main body proximate a hinge portion of the leading end portion, the holding portion being joined to the inner side of the airbag at opposite ends of an orthogonal direction to the belt, and including a recess, in an edge thereof, through which recess the region of the belt proximate the main body passes; and in the folded and housed state of the airbag, the leading end portion of the main body is folded back on the inner side of the holding portion whereas the belt is placed on the inner side of the folded-back leading end portion.

With this arrangement, the airbag is housed in a condition where a leading end or rear end region of the flap element facing away from the hinge portion of the main body is closed by the folded-back leading end portion. With this arrangement the folded-back leading end portion is disposed between the belt and the holding portion, and accordingly, when the airbag expands and inflates with the flap element retained by the open/close controller, the leading end portion is held down by the belt to stay in the folded-back state. Accordingly, lateral edges of the main body which extend from the leading end portion toward the hinge portion are prevented from partially curling up toward the exhaust hole. Consequently, the exhaust hole is sealed by the sheet-shaped main body in a stable manner, and gas leakage is further suppressed.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

FIGS. 1 to 4 illustrate an airbag apparatus M1 for a steering wheel which is a first embodiment of the present invention.

Unless otherwise specified, the front-rear, up-down, and left-right directions in this specification are based on a steering wheel W mounted on a vehicle being steered straight forward. Specifically, the up-down is defined by the up-down direction extending along the axial direction of a steering shaft SS (refer to phantom lines in FIGS. 3 and 4) on which the steering wheel W is to be mounted. The front-rear is defined by the vehicle's longitudinal direction running perpendicularly to the axial direction of the steering shaft SS, and the left-right is defined by the vehicle's lateral direction running perpendicular to the axial direction of the steering shaft SS.

Figure 2:
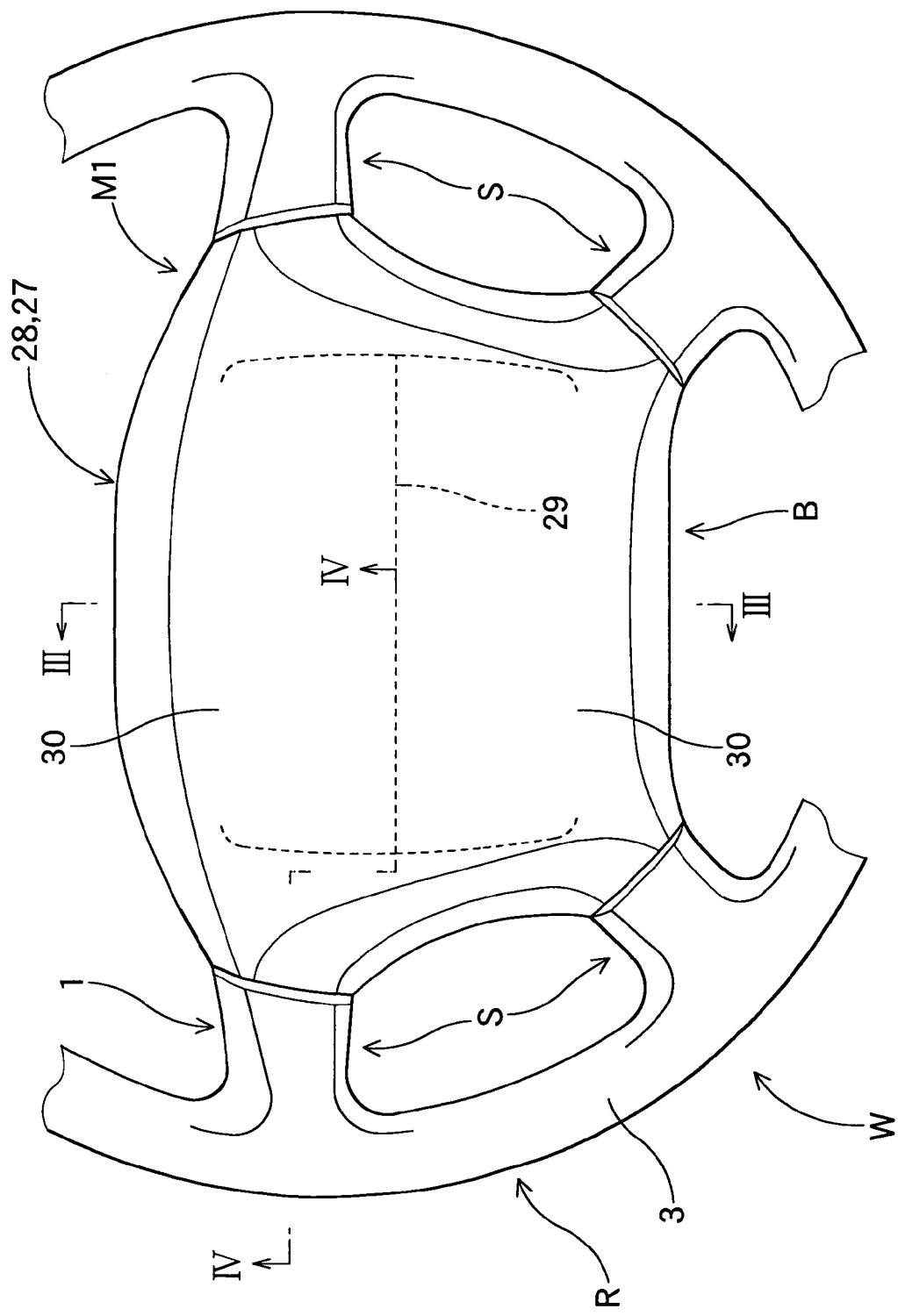
FIG. 2 is a plan view of a steering wheel of FIG. 1.
Figure 3:
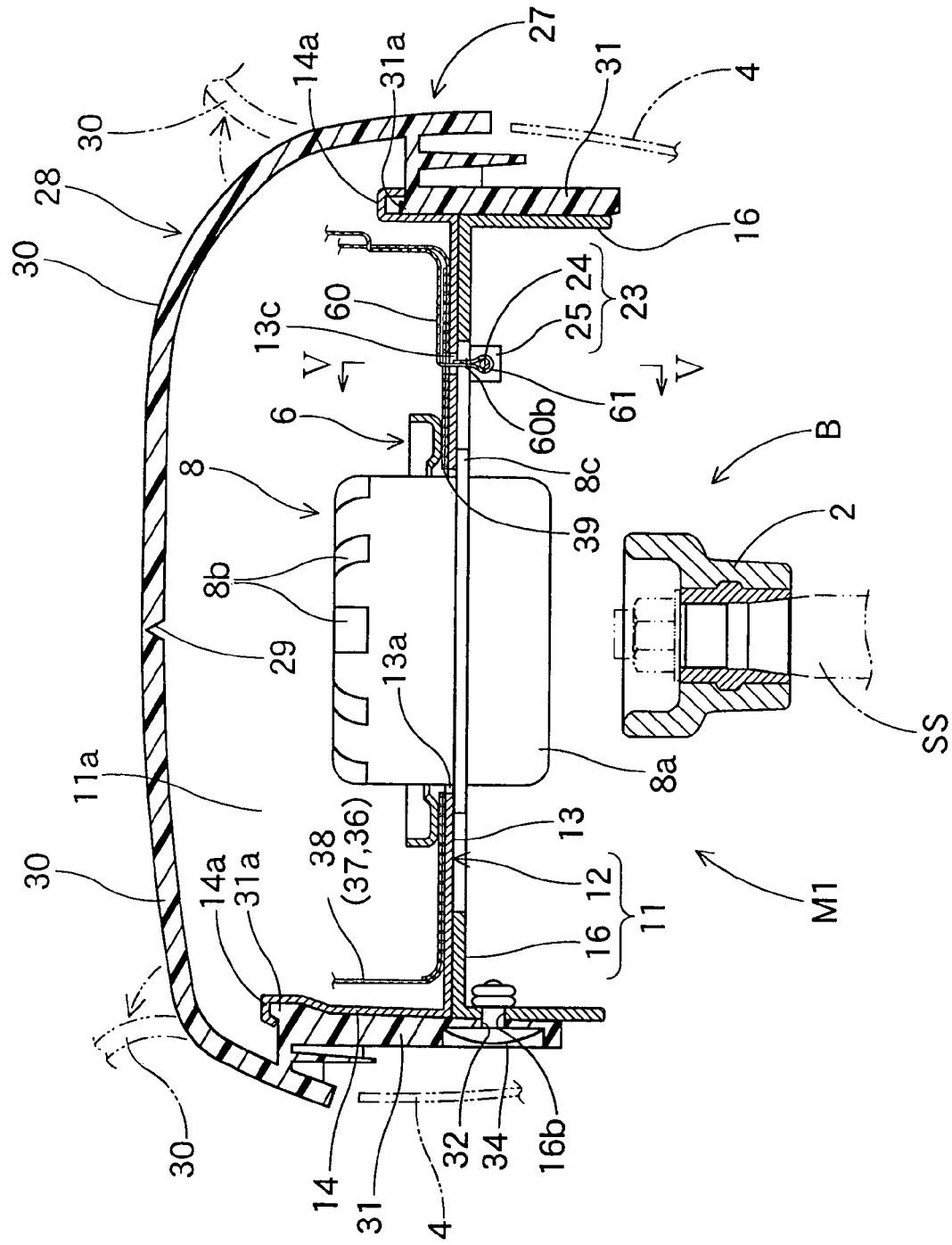
FIG. 3 is a schematic section of the steering wheel of FIG. 1, taken along line III-III of FIG. 2.
Figure 4:
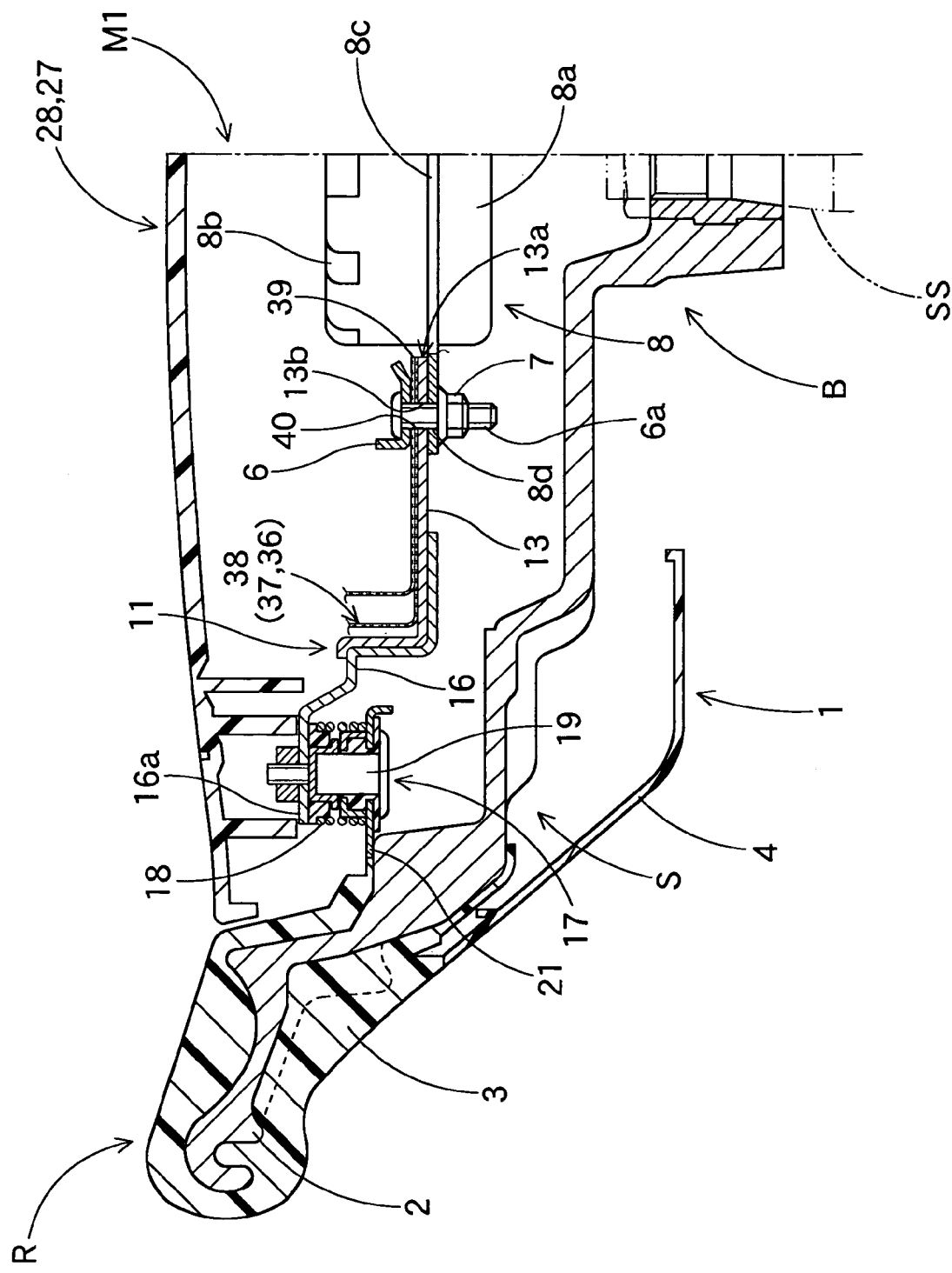
FIG. 4 is a schematic section of the steering wheel of FIG. 1, taken along line IV-IV of FIG. 2.

As shown in FIGS. 2 to 4, the airbag device M1 is arranged on top of boss B at the center of the steering wheel W. The steering wheel W includes a ring R, a boss B and four spokes S. Ring R is for holding at the time of steering operation. Boss B is disposed at the center of the steering wheel W and is joined with the steering shaft SS. Spokes S connect ring R and boss B. The steering wheel W includes, as components, an airbag device M1 and a steering wheel body 1.

Steering wheel body 1 includes a wheel core 2, a coating layer 3 and a lower cover 4. The core 2 is made of aluminum alloy or the like and is configured to connect the ring R, the boss B and the spokes S. The coating layer 3 is made of synthetic resin for covering the core 2 of the ring R and regions of the spokes S in the vicinity of the ring R. The lower cover 4 is made of synthetic resin and is disposed below the boss B.

As shown in FIGS. 3 and 4, the airbag apparatus M1 includes a folded airbag 36, an inflator 8 for supplying the airbag 36 with inflation gas, a case or bag holder 11 for housing and holding the airbag 36 and the inflator 8, a pad 27 serving as an airbag cover to cover an opening 11a of the bag holder 11, two joining plates 21 coupled to the bag holder 11 for mounting the airbag apparatus M1 on the steering wheel body 1, while having a horn switch interposed between the joining plate 21 and the bag holder 11, a retaining mechanism 23 serving as open/close controller that controls opening and closing operations of a later-described exhaust hole 41 of the airbag 36, a flap element 55 joined to a periphery of the exhaust hole 41 and to retaining mechanism 23, and an inner flap 63 serving as open/close means disposed at the periphery of the exhaust hole 41. The inflator 8 and the retaining mechanism 23 are controlled by a control device 68.

Figure 1:
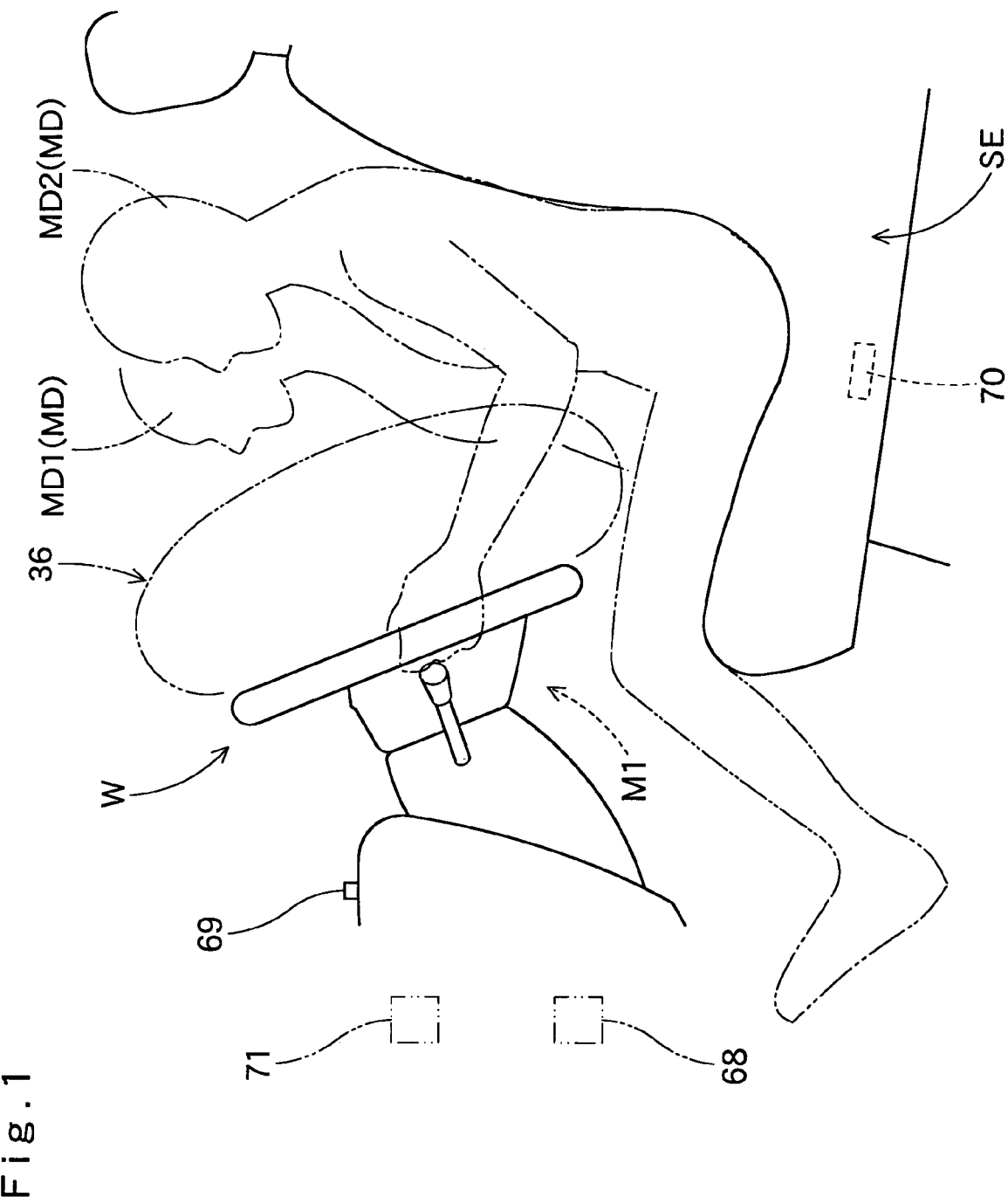
FIG. 1 is a schematic view of the vicinity of a steering wheel of a vehicle equipped with an airbag apparatus for a steering wheel according to a first embodiment of the present invention.

As shown in FIG. 1, control device 68 is electrically communicated with a position sensor 69, which is a kind of occupant sensor, for detecting the size of an occupant or driver MD seated in a seat SE and a clearance between steering wheel W and occupant MD, a weight sensor 70 which is also a kind of occupant sensor for detecting the weight of occupant MD, and a collision sensor 71 for detecting the acceleration of vehicle and direction of acceleration. In response to electric signals from position sensor 69, weight sensor 70, and collision sensor 71, control device 68 activates inflator 8 and retaining mechanism 23 so the airbag 36 inflates adequately according to the circumstances.

The inflator 8 includes a body 8a and a flange 8c. The body 8a is substantially columnar in shape, and is provided on its top with gas discharge ports 8b for discharging inflation gas. The flange 8c has a generally square plate shape and projects from the outer circumference of the body 8a. The flange 8c has insert holes 8d for receiving bolts 6a protruded from the later-described retainer 6.

The retainer 6 is made of a sheet metal of generally square annular shape, and has bolts 6a protruded downward from its four corners. The bolts 6a are inserted through the periphery of a gas inlet port 39 and the bag holder 11 from the interior of the airbag 36 to project from the flange 8c of the inflator 8. The retainer 6 attaches the airbag 36 and the inflator 8 to the bag holder 11 by fastening the bolts 6a with nuts 7.

As shown in FIGS. 3 and 4, the bag holder 11 includes a holder body 12 and two holder plates 16. The holder body 12 and holder plates 16 are both made of sheet metal. The two holder plates 16 are fixed to the lower side of the holder body 12 in the front and rear regions.

The holder body 12 includes a bottom wall 13 having a generally square plate shape and a side wall 14 extending upward from the outer edge of the bottom wall 13 and opened upward. The bottom wall 13 has a round insert hole 13a through which the body 8a of the inflator 8 is inserted upward from lower side. Around the insert hole 13a are four apertures 13b for receiving bolts 6a of the retainer 6. In the front side of the through hole 13a of the bottom wall 13 is a through hole 13c for receiving loop 61 formed at the leading end 60b of a later-described belt 60 of the airbag 36.

Figure 5:
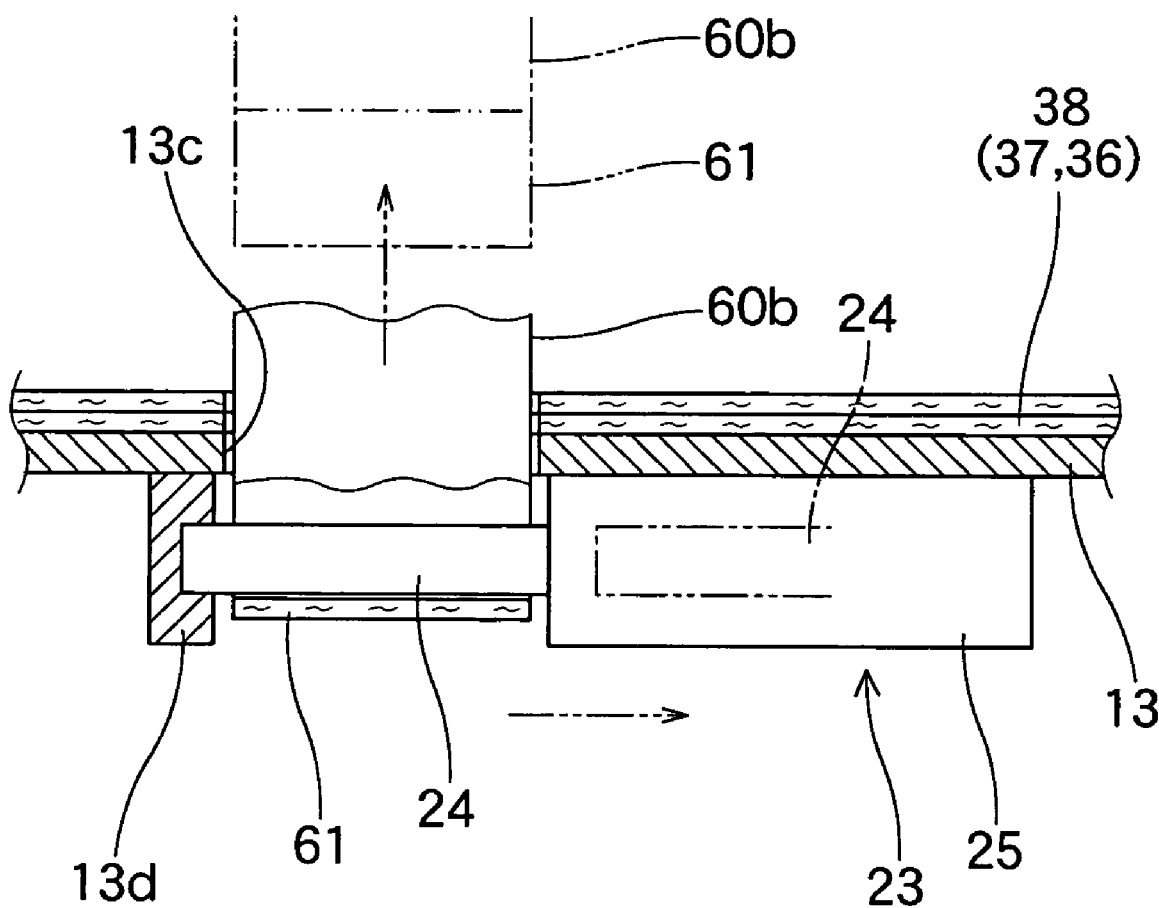
FIG. 5 is a partial enlarged schematic section taken along line V-V of FIG. 3, which illustrates the vicinity of a retaining mechanism of the first embodiment of the airbag apparatus.

As best shown in FIG. 5, the bottom wall 13 is provided in its lower side and proximate to the through hole 13c with a retaining mechanism or open/close controller 23 for retaining the leading end 60b of the belt 60 formed in a later-described flap element 55. The retaining mechanism 23 includes a retaining pin 24 to be put through a loop 61 formed at the leading end 60b of the belt 60, and an actuator 25 secured to the lower side of the bottom wall 13 for retracting the pin 24. If the actuator 25 retracts the pin 24, the retaining pin 24 stops retaining the loop 61 and moves to a release mode. The actuator 25 can be any of piston cylinder utilizing fluid pressure such as hydraulic pressure, water pressure, air pressure, or gas pressure which is generated by inflation gas discharged from the inflator, motor utilizing the fluid pressure mentioned above or electricity, electromagnetic solenoid, spring which exerts biasing force when restoring, or the like, provided that it can move the retaining pin 24 in response to an electric signal from the control device 68. As shown in FIG. 5, in the opposite periphery of the through hole 13c with respect to the actuator 25 and on the lower side of the bottom wall 13 is a support 13d for supporting the leading end of the pin 24 of the retaining mechanism 23 and preventing the same from coming off from the loop 61 in the retaining mode.

Referring to FIG. 3, the side wall 14 of the holder body 12 is provided in its front and rear upper ends with pawls 14a. These pawls 14a are retained by stepped regions 31a formed in the front and rear areas of later-described side wall 31a of the pad 27.

As shown in FIGS. 3 and 4, the two holder plates 16 secured to the holder body 12 at the front and rear each has a holding portion 16a extending up to the vicinity of the coating layer 3 or proximate to the ring R of the spoke S in the left and right regions. A horn switch 17 is attached to each of the holding portions 16a. The holding portions 16a each has an aperture 16b for receiving a rivet 34.

Two joining plates 21 are disposed in the lateral lower sides of the airbag apparatus M1 along the longitudinal direction each in a band shape, and secured respectively to the core 2 of the steering wheel body 1 at their generally longitudinally middle area. Longitudinal ends of each of the joining plates 21 are disposed below the holding portions 16a located at lateral ends of the holder plates 16 while being supported by the core 2 of the spokes S. The airbag apparatus M1 and the holding portions 16a are supported by the left and right joining plates 21 respectively while the horn switches 17 are located therebetween. The airbag apparatus M1 is mounted on top of the boss B of the steering wheel 1 by securing the joining plates 21 to the core 2.

The pad 27 serving as airbag cover is made from synthetic resin such as thermo-plastic elastomer of olefin, and as shown in FIGS. 2 to 4, includes a ceiling wall 28 covering the upper side of the boss B, and a side wall 31 extending downward from the outer edge region of the ceiling wall 28 in a generally square cylindrical shape. An area of the ceiling wall 28 inside the side wall 31 covers the folded airbag 36. This area is provided with a plurality of doors 30 openable upon airbag inflation and each of which doors 30 has a breakable portion 29 therearound. In the illustrated embodiment, as shown in FIG. 2, there are two doors 30 disposed side by side along the longitudinal direction with a generally H-shaped breakable portion 29. The doors 30 are openable toward the front and rear directions when pushed by the airbag 36 charged with inflation gas while breaking the breakable portion 29. The side wall 31 includes a plurality of mounting holes 32 running through the wall 31 horizontally for receiving rivets 34 serving as fixing means to attach the pad 27 to the bag holder 11.

Figure 6:
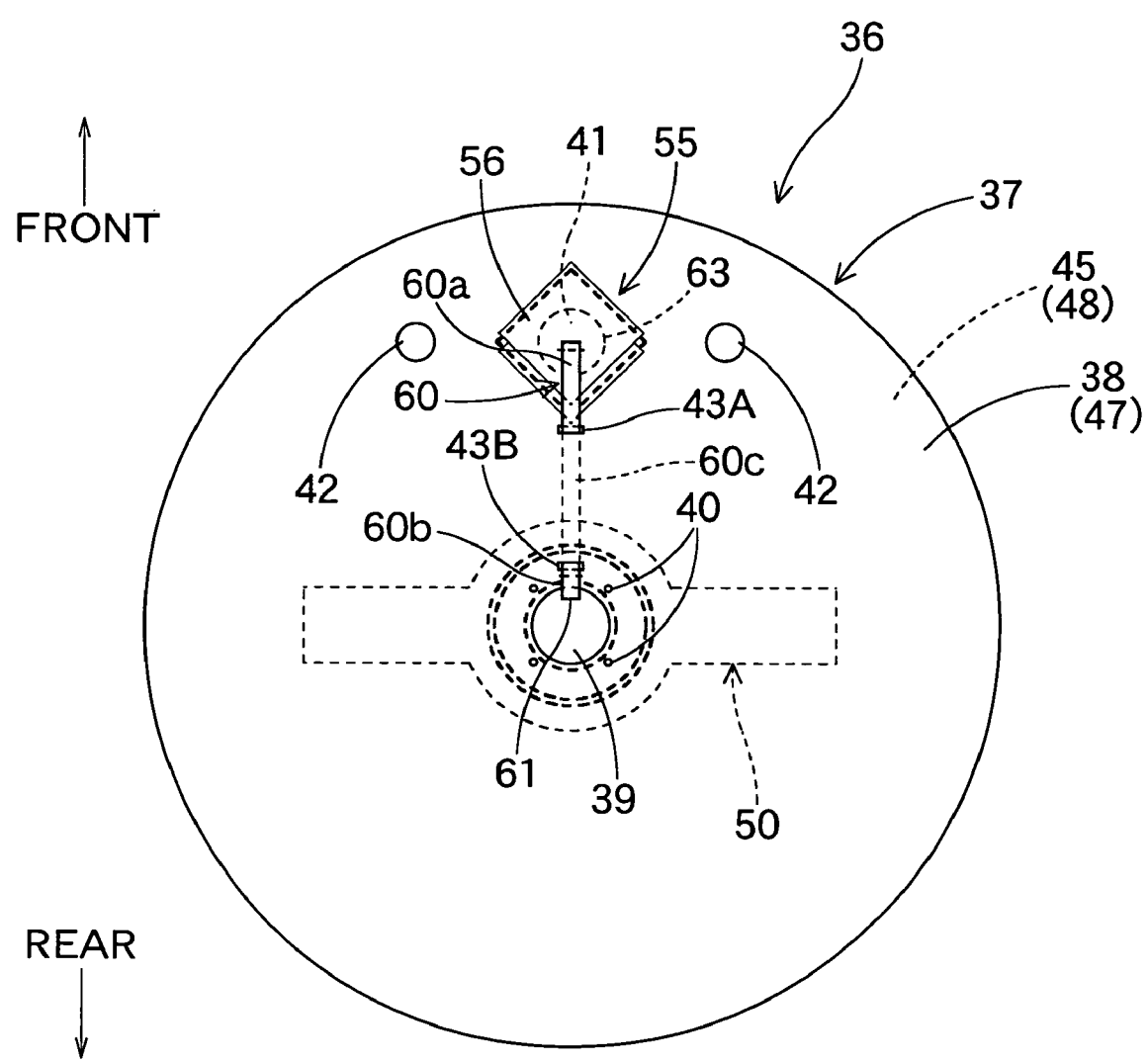
FIG. 6 is a bottom view of an airbag used in the first embodiment of the airbag apparatus.
Figure 10:
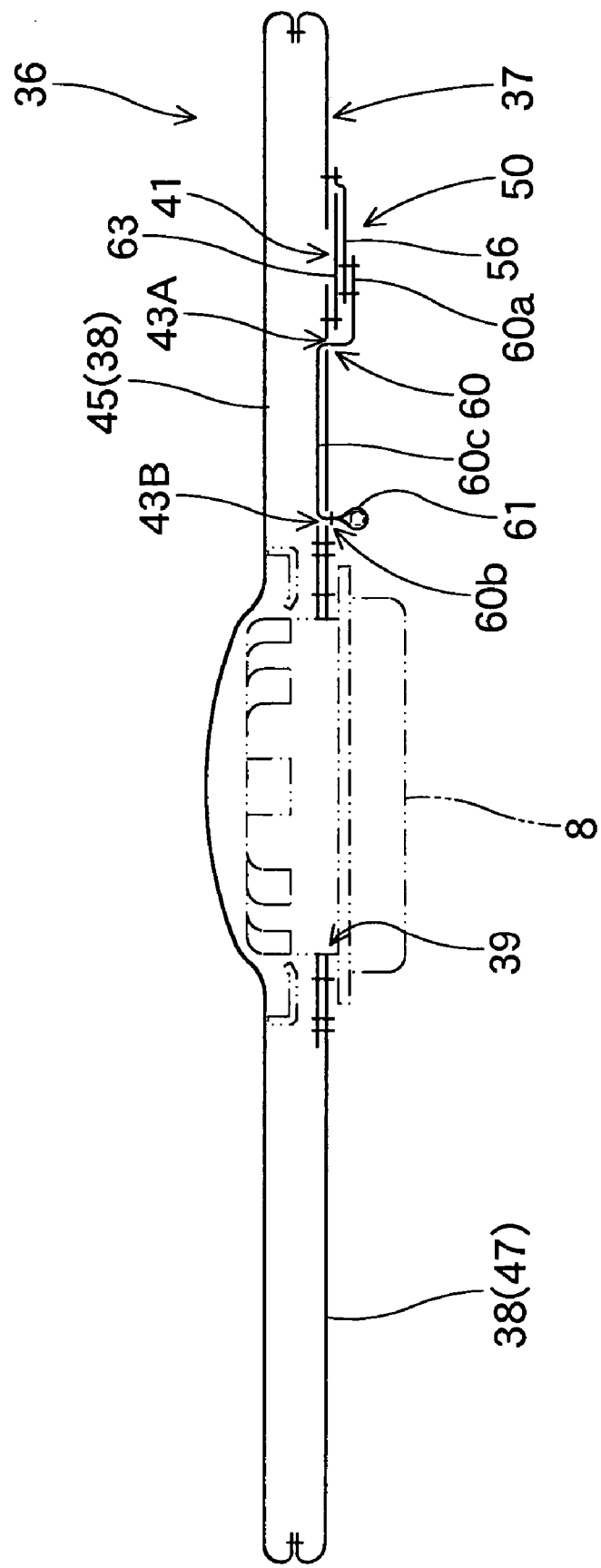
FIG. 10 is a schematic section of the airbag of FIG. 6.

As shown in FIGS. 6 and 10, the airbag 36 includes a bag-shaped airbag body 37 inflatable with inflation gas, and a tether 50 for regulating the contour of the airbag body 37 at complete inflation.

The airbag body 37 is formed of flexible fabric woven by polyamide, polyester yarn or the like. The outer circumferential wall of the airbag body 37 is composed of a vehicle body side wall 38 and an occupant side wall 45. The vehicle body side wall 38 is deployed toward the steering wheel W upon airbag deployment and includes an inlet port 39 for admitting inflation gas. The occupant sidewall 45 is deployed toward an occupant or driver and opposite the inlet port 39 upon airbag deployment.

The inlet port 39 is to set in the inflator body 8a from the lower side and for introducing inflation gas discharged from the gas discharge ports 8b of the inflator 8 into the airbag body 37. In the periphery of the gas inlet port 39 are four mounting holes 40 for receiving bolts 6a of the retainer 6. The vehicle body side wall 38 is also provided in the front of the inlet port 39 with a round exhaust hole 41 running through the wall 38 and opened at any time. In the left and right sides of the exhaust hole 41 are round vent holes 42 each having a smaller area than the exhaust hole 41. Between the exhaust hole 41 and the inlet port 39 is an insert hole 43A in the rear of and proximate the exhaust hole 41, and an insert hole 43B in the front of and proximate the inlet port 39, each of which holes 43A and 43B has a slit-like shape extending along the lateral direction for receiving the belt 60 of the flap element 55 (FIG. 6).

Figure 9:
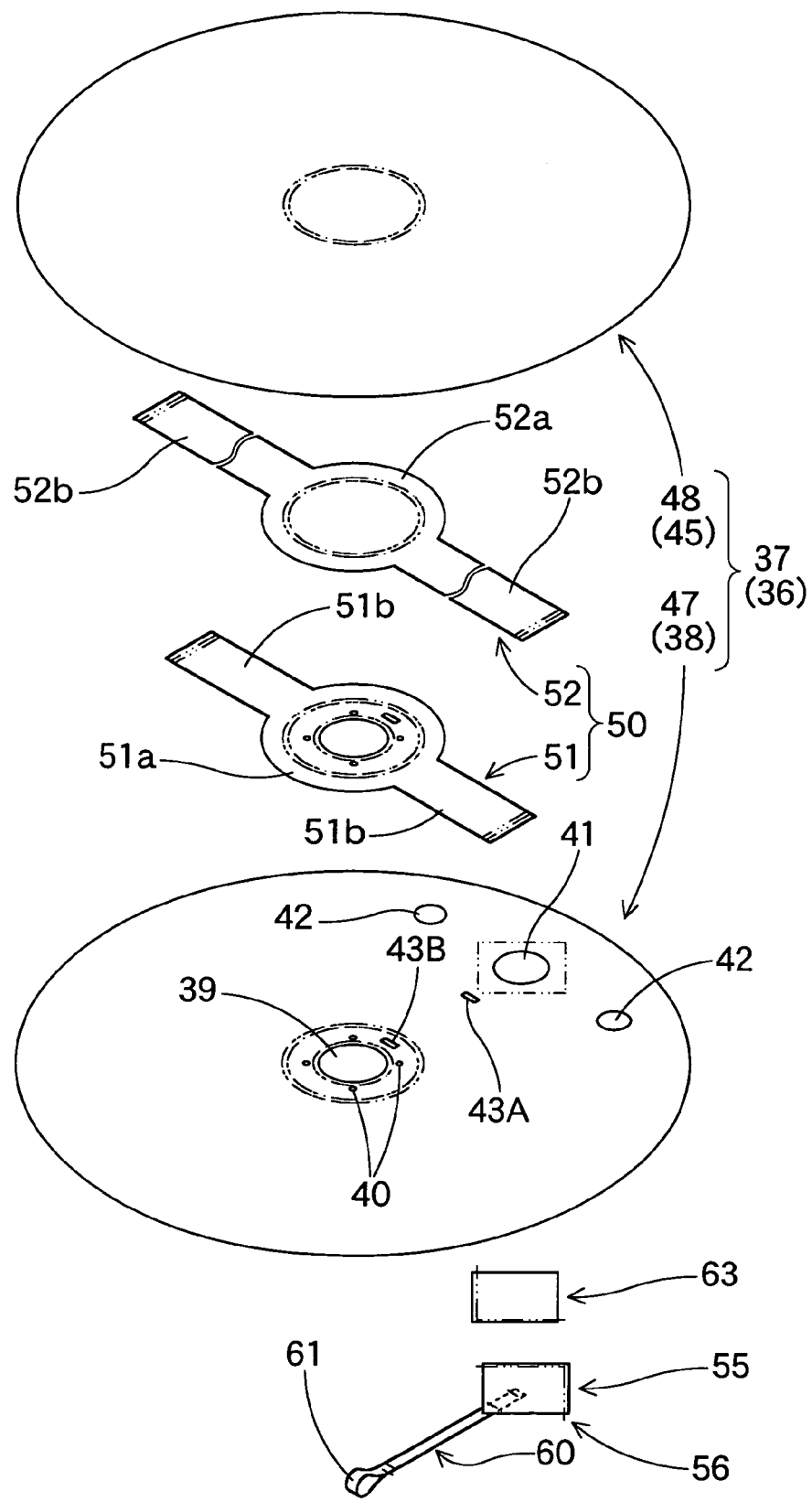
FIG. 9 is a schematic exploded perspective view of components of the airbag of FIG. 6.

As shown in FIG. 9, the airbag body 37 is composed of a circular vehicle body side base cloth 47 for forming the vehicle body side wall 38 and a circular occupant side base cloth 48 for forming the occupant side wall 45. The inlet port 39 is formed at the center of the vehicle body side base cloth 47 whereas mounting holes 40, exhaust hole 41, vent holes 42, and insert holes 43A and 43B are formed at predetermined positions of the vehicle body side base cloth 47.

Figure 11A:
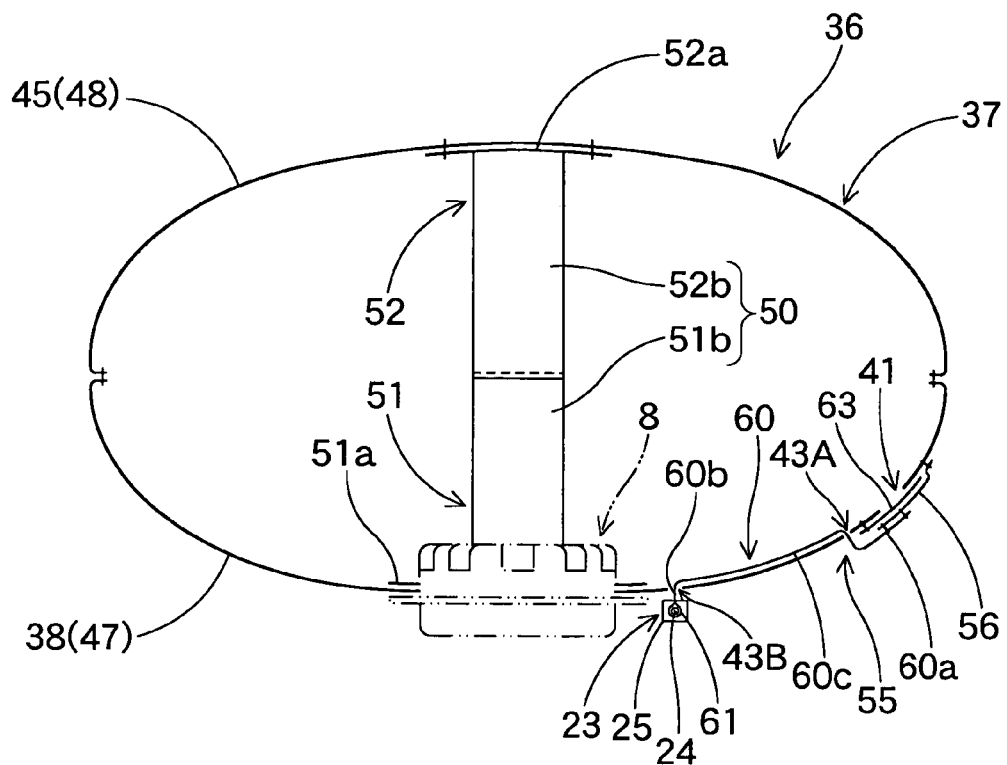
FIG. 11A is a schematic section of the completely inflated airbag of FIG. 6, which shows a closed state of an exhaust hole.
Figure 11B:
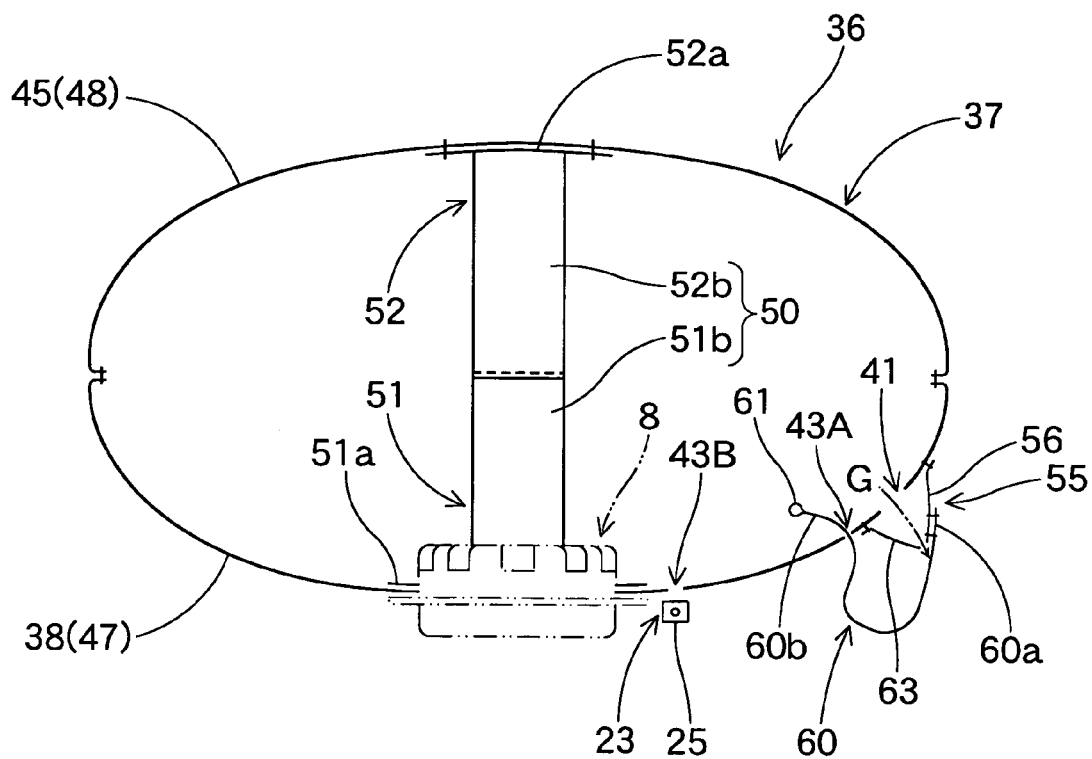
FIG. 11B is a schematic section of the completely inflated airbag of FIG. 6, which shows an open state of an exhaust hole.

Tether 50 is formed of flexible fabric woven by polyamide, polyester yarn or the like as well as the airbag body 37. As shown in FIGS. 9, 11A and 11B, tether 50 is adapted to regulate a distance between the vehicle body side wall 38 and occupant side wall 45, and thereby to control the completely inflated shape of the airbag body 37. Tether 50 is composed of two cloth members 51 and 52 respectively disposed toward the vehicle body sidewall 38 and occupant sidewall 45. Each of two cloth members 51 and 52 has a generally circular joint portion 51a/52a joined to the vehicle body side wall 38/occupant side wall 45, and a band-shaped extended portion 51b/52b extending from left and right edges of the joint portion 51a/52a. The joint portion 51a of the cloth member 51 has openings (reference numerals omitted) corresponding to the inlet port 39, mounting holes 40, and insert hole 43B.

Figure 7:
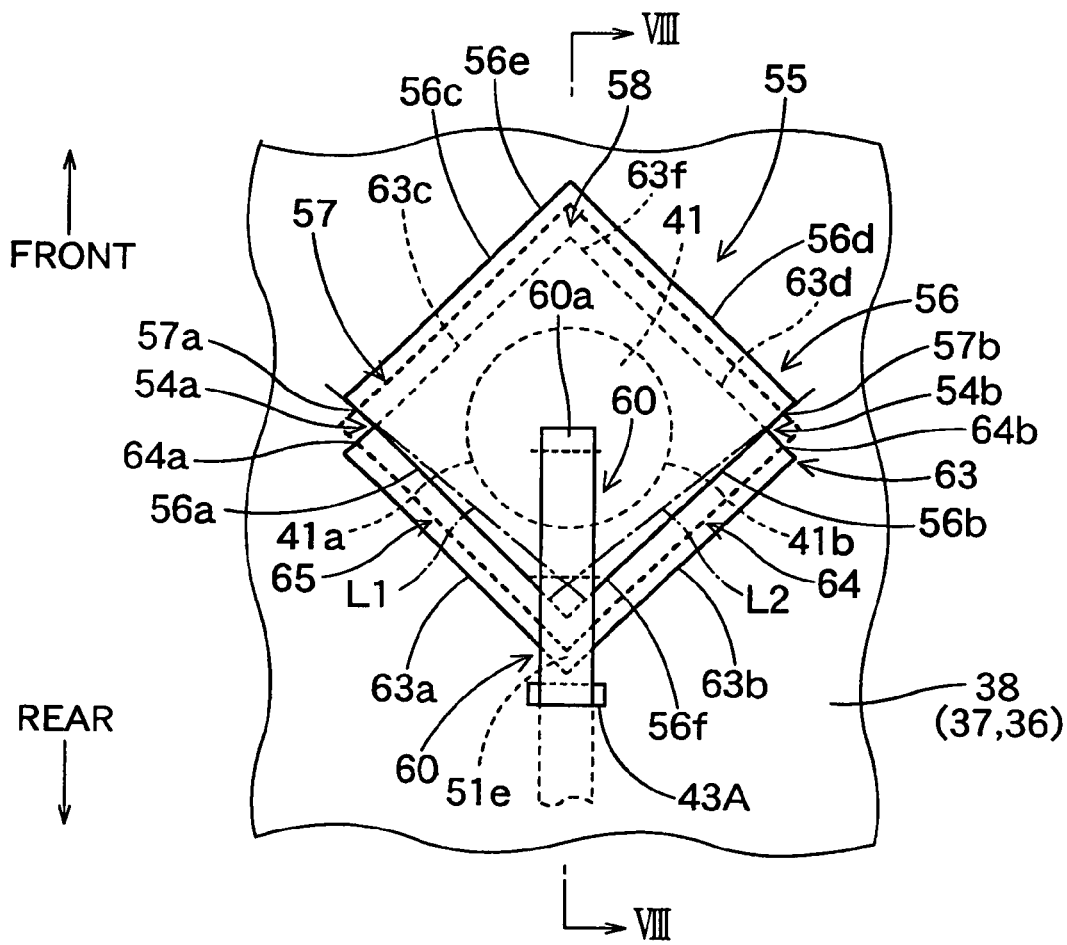
FIG. 7 is a partial enlarged bottom view of the airbag of FIG. 6 showing the vicinity of a flap element.
Figure 8:
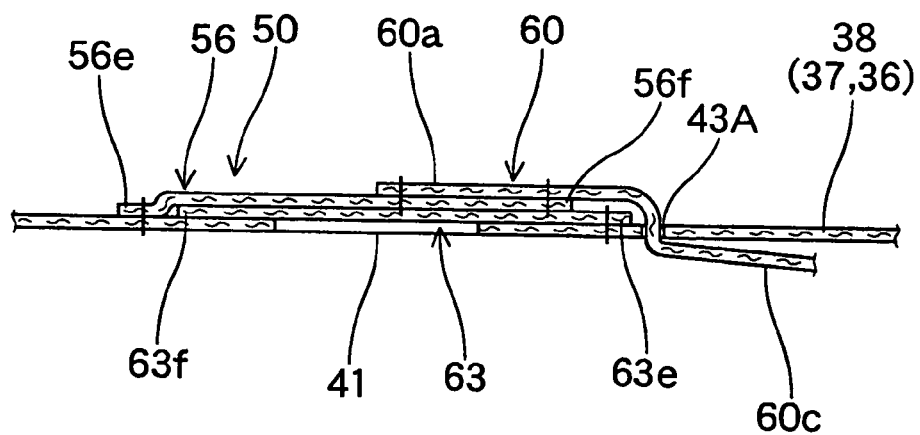
FIG. 8 is a sectional view taken along line VIII-VIII of FIG. 7.

As shown in FIGS. 7 and 8, flap element 55 includes an outer flap or flap body 56 arranged outside the airbag body 37 (vehicle body side wall 38) for closing the exhaust hole 41, and a belt 60 joined to the leading end 56f of the outer flap 56 and also coupled to the retaining mechanism 23. Moreover, an inner flap or open/close means 63 is joined to the periphery of the exhaust hole 41 to be disposed between the outer flap 56 and the airbag body 37 (vehicle body side wall 38) and outside the vehicle body side wall 38. In other words, in the airbag apparatus M1 of the first embodiment, the exhaust hole 41 running through the airbag body 37 (vehicle body side wall 38) and opening at any time is opened and closed by the inner flap 63 and the outer flap 56 of the flap element 55.

In the foregoing embodiment, inner flap 63 and outer flap 56 are formed by flexible fabric woven by polyamide, polyester yarn as well as the airbag body 37. Inner flap 63 and outer flap 56 has the same generally square contour each of which is large enough to close the exhaust hole 41, and are so arranged obliquely as to locate their diagonal lines along the longitudinal direction.

Inner flap 63 and outer flap 56 are joined to the vehicle body side wall 38 in such a manner that the inner flap 63 is so placed over the outer surface of vehicle body side wall 38 as to cover the exhaust hole 41, and then the outer flap 56 is overlaid on the inner flap 63 offset slightly forward by seam allowance, and then stitching is applied to the entire circumference to form a square in one continuous stitching work (FIG. 7).

That is, the outer flap 56 is sewn to the periphery of the exhaust hole 41 of the vehicle body side wall 38 in a generally inverse V-shape at its area by its root region 56e or at two front sides 56c and 56d facing away from the retaining mechanism 23, which area serves as a joint portion (second joint portion) 57 to the wall 38, whereas two rear sides 56a and 56b of the outer flap 56 closer to the retaining mechanism 23 serve as a leading end side 56f. The belt 60 is sewn to a region of the outer side of the outer flap 56 proximate the leading end 56f so it holds down the leading end 56f onto the airbag 36. A portion of the outer flap 56 proximate the joint portion 57 serves as a hinge portion 58 bendable upon opening of the flap 56. The inner flap 63 is sewn to the periphery of the exhaust hole 41 of the vehicle body side wall 38 in a generally V-shape at its area by its root region 63e or at two rear sides 63a and 63b closer to the retaining mechanism 23, which area serve as a joint portion (first joint portion) 64 to the wall 38, whereas two front sides 63c and 63d of the inner flap 63 apart from the inlet port 39 serve as an openable leading end side 63f. A portion of the inner flap 63 proximate the joint portion 64 serves as a hinge portion 65 bendable upon opening of the flap 63.

That is, the joint portion (second joint portion) 57 for joining the outer flap 56 to the vehicle body side wall 38 and the joint portion (first joint portion) 64 for joining the inner flap 63 to the wall 38 respectively have a generally bent shape or V-shape, and ends 57a, 57b of the joint portions 57 and ends 64a and 64b of the joint portion 64 are located proximate to each other. The joint portions 57 and 64 encircle the exhaust hole 41 thoroughly.

In the foregoing embodiment, the joint portion 57 joining the outer flap 56 to the vehicle body side wall 38 is arranged in an inverse V-shape along the lateral direction which extends generally orthogonally with respect to the length direction of the belt 60 i.e., longitudinal direction of vehicle. As shown in FIG. 7, straight lines L1 and L2 linking the ends 57a, 57b of the joint portion 57 and the leading end 56f are located outside the lateral edges 41a and 41b of the exhaust hole 41. In other words, the exhaust hole 41 is located within a generally square area defined by the straight lines L1, L2 and the joint portion 57.

The leading end 56f of the outer flap 56, which is on the side closer to the retaining mechanism 23, and the root region 56e on the side apart from the retaining mechanism 23 are located on a line extending radially from the center of the inlet port 39 which line equals to a longitudinal line running through the center of the inlet port 39, in the illustrated embodiment. That is, the outer flap 56 is adapted to open toward the direction extending radially through the inlet port 39, i.e. toward the expanding direction of the airbag 36.

The inner flap 63 and outer flap 56 are overlaid one on the other on the outer surface of the vehicle body side wall 38 so that each of them closes the exhaust hole 41. If the airbag body 37 inflates in a condition where the belt 60 joined to the leading end 56f of the outer flap 56 is anchored at the retaining mechanism 23, the inner flap 63 is pressed by the outer flap 56 and closes the exhaust hole 41 all over, thereby keeps the exhaust hole 41 in the closed state.

Belt 60 joined to the leading end 56f of the outer flap 56 is made of a band-shaped cloth member having flexibility. In the foregoing embodiment, the belt 60 has a smaller width than that of the hinge portion 58 of the outer flap 56, and is arranged along the longitudinal direction, i.e. the opening direction of the flap 56. Belt 60 is joined at its root portion 60a to the outer surface of and in the vicinity of the leading end 56f of the outer flap 56. In the embodiment, belt 60 is disposed on a line extending radially from the center of the inlet port 39 of the airbag body 37 which line equals to the longitudinal line running through the center of the inlet port 39. At the leading end 60b of the belt 60 is a loop 61 formed by stitching up the end region in a ring shape. Loop 61 is adapted to insert the retaining pin 24 of the retaining mechanism 23 therein. As shown in FIGS. 3 and 5, when the airbag 36 is folded and housed, the retaining pin 24 is put through the loop 61 so the retaining mechanism 23 retains the loop 61.

Belt 60 is inserted through the insert holes 43A and 43B of the vehicle body side wall 38. In the condition where the inner flap 63 and outer flap 56 are so overlaid one on the other as to close the exhaust hole 41, belt 60 is put through the insert hole 43A located proximate to the exhaust hole 41 so that its middle region 60c is disposed inside the airbag body 37, and then put through the insert hole 43B located proximate to the inlet port 39 so that leading end 60b with the loop 61 projects to the outside the airbag body 37 (FIGS. 6 and 10). To summarize, when the airbag 36 is folded and housed, the root portion 60a and the leading end 60b of the belt 60 are disposed outside the airbag body 37 while the middle region 60c disposed inside the airbag body 37, and the pin 24 of the retaining mechanism 23 is inserted through the loop 61 of the leading end 60b projected from the insert hole 43B. In the embodiment, the length of the belt 60 is so set as to allow the airbag 36 to inflate smoothly in a condition where the loop 61 is retained by the retaining pin 24.

Now is described how to mount the airbag apparatus M1 of the first embodiment on the vehicle. Firstly, the airbag 36 is manufactured. The vehicle body side base cloth 47 is provided with the inlet port 39, exhaust hole 41, vent holes 42, and the insert hole 43A in advance. The cloth member 51 for tether is provided with an opening (reference numeral omitted) corresponding to the inlet port 39 in the joint portion 51a.

Firstly, the inner flap 63 is arranged on the outer surface of the vehicle body side base cloth 47 to close the exhaust hole 41, and then the outer flap 56 is superposed on the inner flap 63 slightly offset forward by seam allowance. Then the entire peripheral edges of the inner flap 63 and outer flap 56 are sewn to the vehicle body side wall 38. Thereafter, the belt 60 preliminarily provided with the loop 61 is sewn at the root portion 60a to the vicinity of the leading end 56f of the outer flap 56. Thus the flap element 55 is completed. The joint portion 51a of the tether cloth member 51 is arranged on the inner surface of the vehicle body side base cloth 47 so that its opening matches the inlet port 39, and then sewn up at the periphery of the inlet port 39. The joint portion 52a of the tether base cloth 52 is sewn at its edge to the inner surface of the occupant side base cloth 48.

Thereafter, punching work is applied to the vehicle body side base cloth 47 and the joint portion 51a of the tether cloth member 51 to form mounting holes 40 and insert hole 43B. The inlet port 39 may be formed at this time instead of forming the port 39 before the above-described sewing work.

Subsequently, the vehicle body side base cloth 47 and occupant side base cloth 48 are overlaid one on the other so that their outer surfaces oppose each other, and are sewn up at the outer edge. After the sewing work of the outer edge, the airbag body 37 is reversed inside out utilizing the inlet port 39 so the seam allowance may not be exposed outside. Then the leading ends of extended portions 51b and 52b of the tether cloth members 51 and 52 are taken out of the inlet port 39 and sewn up together. Thus the airbag body 37 is manufactured, that is, the airbag 36 having the flap element 55 and the inner flap 63 is completed.

The airbag apparatus M1 is assembled using the airbag 36 manufactured as described above. Firstly, belt 60 of the flap element 55 is put, from the loop 61 side, through the insert hole 43A located proximate to the exhaust hole 41 so that the middle region 60c is disposed inside the airbag body 37, and then put through the insert hole 43B so that the loop 61 projects to the outside the airbag body 37. At this time, the exhaust hole 41 is closed by the inner flap 63 and the outer flap 56 of the flap element 55 overlaid one on the other.

Thereafter, the retainer 6 is set in the airbag 36 from the inlet port 39, so that the bolts 6a are protruded from the mounting holes 40. While keeping the loop 61 projected from the insert hole 43B, the airbag 36 is so folded up as to be housed in the bag holder 11 together with the flap element 55 and the inner flap 63.

Subsequently, the folded-up airbag 36 is housed within the bag holder 11 preliminarily provided with the retaining mechanism 23, horn switches 17, and joining plates 21 so that bolts 6a are projected from apertures 13b of the bottom wall 13 and the loop 61 is protruded from the through hole 13c. Then the pin 24 of the retaining mechanism 23 is put through the loop 61 until the leading end of the pin 24 abuts against the support 13d, and thus the retaining mechanism 23 retains the loop 61. Thereafter, the body 8a of the inflator 8 is put into the insert hole 13a of the bottom wall 13 from lower side, and the bolts 6a are protruded from the insert holes 8d of the flange 8c. If the nuts 7 are fastened with the bolts 6a, the airbag 36 and the inflator 8 are held by the bag holder 11.

Thereafter, the pad 27 is placed over the airbag 36 so that the pawls 14a of the bag holder 11 retain the stepped regions 31a of the side wall 31, while the bag holder 11 and the side wall 31 are fastened together by rivets 34. Thus the airbag apparatus M1 is assembled.

The airbag apparatus M1 thus assembled is mounted on the steering wheel body 1 by joining the joining plates 21 to an unillustrated mounting seat of the steering wheel body 1 mounted on the vehicle with bolts. At this time, assembling of the steering wheel W and mounting of the steering wheel W on the vehicle are completed. When the airbag apparatus M1 is mounted on the vehicle, lead wires leading from the control device 68 are connected with the inflator 8 and the retaining mechanism or open/close controller 23 for supplying actuating signals.

If a moving car equipped with the airbag apparatus M1 cracks up, the control device 68 outputs signals to the inflator 8, and then the inflator 8 discharges inflation gas from the gas discharge ports 8b to inflate the airbag 36, so that the airbag 36 opens doors 30 of the pad 27 toward the front and rear, and projects toward occupant MD, and then completes inflation.

In the airbag apparatus M1 of the first embodiment, if the control device 68 detects, for example a small-sized occupant MD1 being seated or an occupant MD seated proximate the steering wheel W by signals supplied from predetermined sensors 69, 70 and 71, the control device 68 acts to disengage the retaining mechanism or open/close controller 23 from the flap element 55 after the airbag 36 almost completes inflation with inflation gas from the inflator 8. In other words, when predetermined time lapses from the initiation of discharge of inflation gas, the control device 68 outputs signals to the actuator 25 to retract the retaining pin 24, so that the airbag 36 completes inflation in a condition where the loop 61 at the leading end 60b of the belt 60 as part of the flap element 55 is out of engagement with the pin 24. In this instance the exhaust hole 41 opens to discharge extra inflation gas G as shown in FIG. 11B, while the airbag 36 completes inflation. To the contrary, if the control device 68 detects a large-sized occupant MD2 being seated or an occupant MD seated away from the steering wheel W, the actuator 25 is not actuated so that the airbag 36 completes inflation while the retaining mechanism 23 holds the flap element 55 i.e. the loop 61 is retained by the retaining pin 24. In this instance, as shown in FIG. 11A, the airbag 36 completes inflation with the exhaust hole 41 kept closed.

To summarize the structure and operation of the airbag apparatus M1 of the first embodiment, the airbag 36 or airbag body 37 is provided in the periphery of the exhaust hole 41 with the inner flap 63 serving as open/close means for opening and closing the exhaust hole 41. If the airbag 36 inflates while the belt 60 of the flap element 55 is held by the retaining mechanism 23, the inner flap 63 is pressed by the outer flap 56 of the flap element 55 from outside while closing the exhaust hole 41. On the contrary, if the airbag 36 inflates with the belt 60 released from the retaining mechanism 23, the inner flap 63 is allowed to open in such a manner as to expand the opening area of the exhaust hole 41.

That is, if the airbag 36 inflates while the belt 60 of the flap element 55 is held by the retaining mechanism 23, since the outer flap 56 presses the inner flap 63 from outside, the inner flap 63 is prevented from floating up due to the pressure of inflation gas, and thereby keeps closing the exhaust hole 41. Accordingly, inflation gas is prevented from being emitted from the exhaust hole 41.

More specifically, in the airbag apparatus M1, the joint portion 57 joining the outer flap 56 to the airbag 36 or vehicle body side wall 38 is located by the leading end or forward of the inner flap 63 such that the straight lines L1 and L2 linking the ends 57a, 57b of the joint portion 57 and the leading end 56f of the outer flap 56 are located outside the lateral edges 41a and 41b of the exhaust hole 41 closed by the inner flap 63. With this construction, if the airbag 36 inflates while the belt 60 disposed at the leading end 56f of the outer flap 56 is held by the retaining mechanism 23, the belt 60 is pulled by the retaining mechanism 23. By this pulling, tension forces are generated on the two straight lines L1 and L2 linking the ends 57a, 57b of the joint portion 57 and the leading end 56f of the outer flap 56. Especially in the foregoing embodiment, the belt 60 and the outer flap 56 are disposed on the line extending radially from the center of the inlet port 39. In other words, the belt 60 is pulled along the expanding direction of the airbag 36, which causes great tension forces on the straight lines L1 and L2. For this reason, an area encircled by the joint portion 57 of the outer flap 56 and the straight lines L1 and L2 is pressed onto the airbag 36 or vehicle body side wall 38 so that the outer f lap 56 securely holds the inner f lap 63 which would otherwise open up and leak inflation gas from the exhaust hole 41.

Figure 12A:
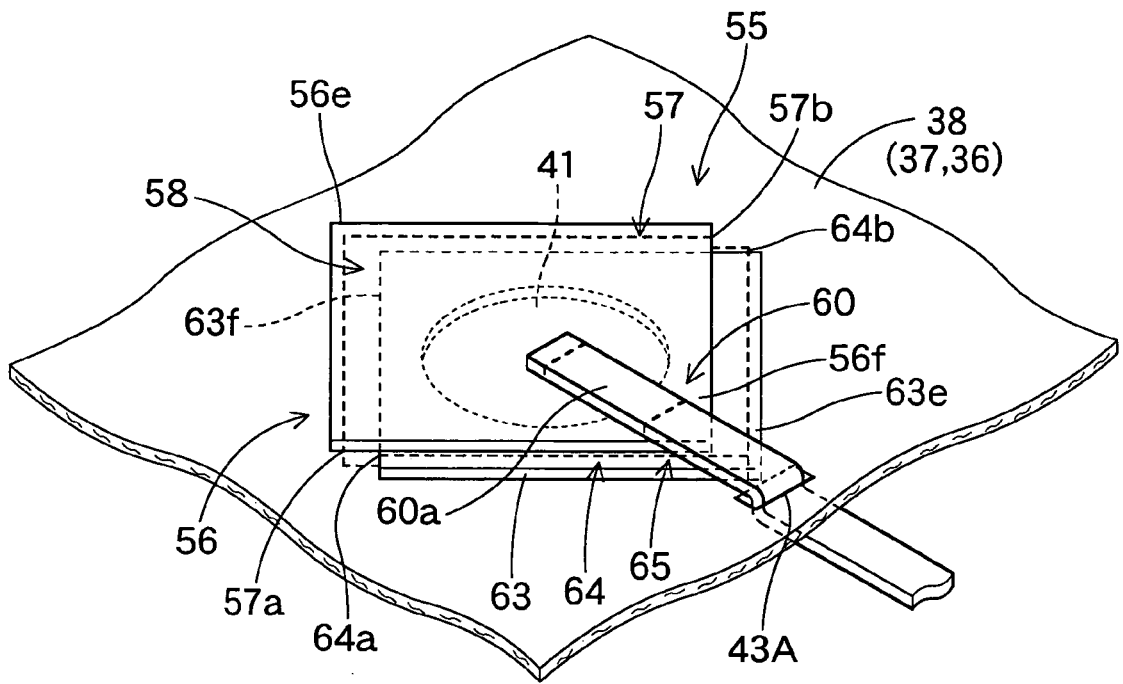
FIGS. 12A and 12B are partial enlarged perspective views showing the flap element of FIG. 7 opening to expose the exhaust hole.
Figure 12B:
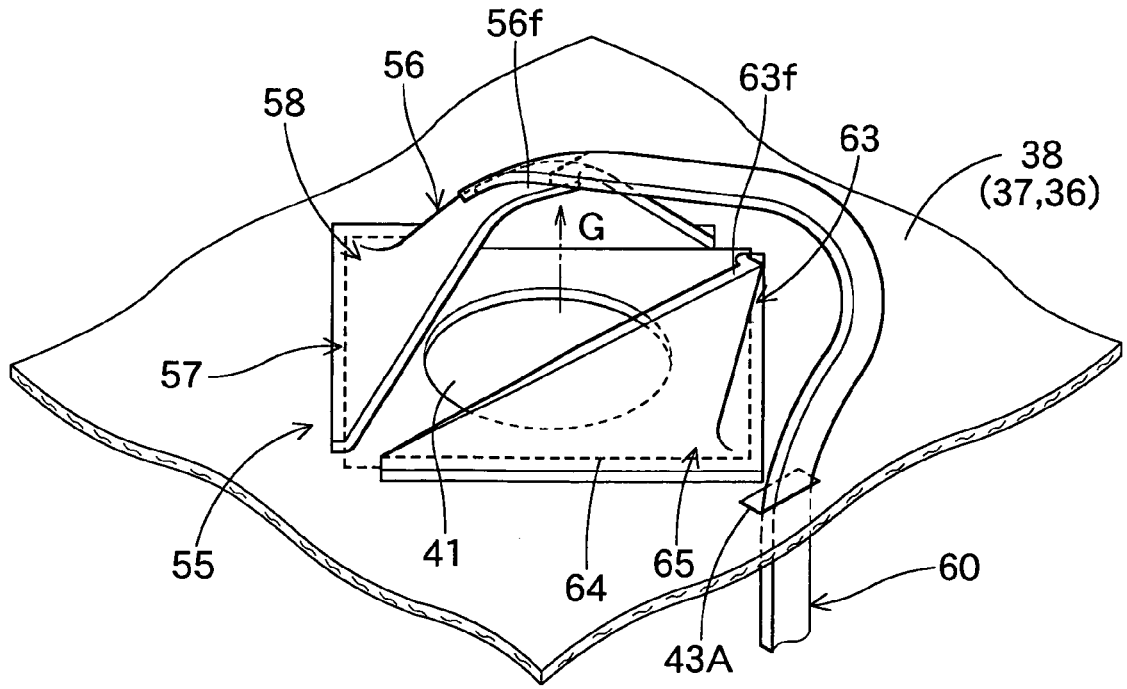

On the contrary, if the airbag 36 inflates with the belt 60 of the flap element 55 released from the retaining mechanism 23, the inner flap 63 is allowed to open in such a manner as to expand the opening area of the exhaust hole 41. Hence, a great deal of inflation gas is emitted from the exhaust hole 41. More specifically, in the airbag apparatus M1 of the first embodiment, the inner flap 63 and the outer flap 56 are arranged on the outer surface of the airbag 36. With this construction, if the airbag 36 inflates with the belt 60 of the flap element 55 released from the retaining mechanism 23, outer flap 56 stops holding the inner flap 63, which allows the outer flap 56 and inner flap 63 to be pushed by inflation gas G from the inside of the airbag 36, and open to opposite directions respectively about hinge portions 65 and 58, thereby exposing the exhaust hole 41. As shown in FIG. 12B, the inner flap 63 and the outer flap 56 open like a nib of a bird in this embodiment. That is, inner flap 63 and outer flap 56 automatically open due to the pressure from inflation gas if the belt 60 of the flap element 55 is released from the retaining mechanism 23, and thereby opening the exhaust hole 41 wide.

As a result, in the airbag apparatus M1, emission of inflation gas from the exhaust hole 41, that is, the internal pressure of the completely inflated airbag 36 is controlled depending on whether or not the flap element 55 is retained by the retaining mechanism or open/close controller 23.

Moreover, the flap element 55 and the inner flap 63 are capable of being folded up together with the airbag 36, and thus can be housed together with the airbag 36, which contributes to keep the apparatus compact and simple.

Therefore, the airbag apparatus M1 of the first embodiment is capable of controlling the opening and closing operations of the exhaust hole 41 securely with a simple structure.

The exhaust hole 41 in the first embodiment is so formed through the vehicle body side wall 38 of airbag 36 or airbag body 37 as to open at any time in a generally round shape. Accordingly, when the airbag 36 inflates with the belt 60 of the flap element 55 released from the retaining mechanism 23, emission of inflation gas from the airbag 36 is decided by the opening area of the exhaust hole 41, so that emission of inflation gas is stabilized.

Moreover, in the periphery of the exhaust hole 41, the joint portion 64 of the inner flap 63 to the vehicle body side wall 38, i.e. the hinge portion 65 of the inner flap 63 is disposed to oppose the joint portion 57 of the outer flap 56 to the wall 38. Accordingly, when the airbag 36 inflates with the belt 60 of the flap element 55 retained by the retaining mechanism 23, an outer circumference of the leading end or opening end 63f of the inner flap 63, which leading end 63f opposing the hinge portion 65, is held down by the root region 56e or an area around the joint portion 57 of the outer flap 56. Accordingly, the outer flap 56 securely prevents the inner flap 63 from opening due to the pressure of inflation gas.

With respect to the joint portion 57 of the outer flap 56 to the vehicle body side wall 38 and the joint portion 64 of the inner flap 63 to the wall 38, the ends 57a, 57b, 64a and 64b of the joint portions 57 and 64 are located proximate to each other. With this construction, when the airbag 36 inflates with the belt 60 of the flap element 55 retained by the retaining mechanism 23, an outer circumference of the vicinity of ends of the hinge portion 65 of the inner flap 63 is pressed by the vicinity area of ends of the hinge portion 58 of the outer flap 56, which further securely prevents the inner flap 63 from opening by the pressure of inflation gas. Especially, the root region 63e in the vicinity of the hinge portion 65 of the inner flap 63 is disposed proximate the two straight lines L1 and L2 linking ends 57a and 57b of the joint portion 57 of the outer flap 56 and leading end 56f of the outer flap 56. With this construction, the tension forces generated on the two straight lines L1 and L2 conduces to hold down lateral end regions of the hinge portion 65 of the inner flap 63 onto the vehicle body side wall 38, which enables the inner flap 63 to keep closing the exhaust hole 41 wholly, and prevents the inner flap 63 to slip from the vehicle body side wall 38 (allows the inner flap 63 to stay in place with respect to the vehicle body side wall 38). Consequently, sealing property by the inner flap 63 is further improved.

Moreover, in the airbag apparatus M1, the belt 60 of the flap element 55 is put through the insert hole 43A formed in the vicinity of the exhaust hole 41. In other words, the flap element 55 is disposed outside the airbag 36 and so is the root region 60a of the belt 60 fixed to the flap element 55. However, the middle region 60c of the belt 60 is disposed inside the airbag 36 and therefore, when the airbag 36 inflates with the belt 60 of the flap element 55 retained by the retaining mechanism 23, the middle region 60c of the belt 60 arranged inside the airbag 36 is pressed onto the circumferential wall i.e., the vehicle body side wall 38 of the airbag 36 (FIG. 1A). In other words, the belt 60 does not get loose in such a manner as to separate from the wall 38. Accordingly, the outer flap 56 is securely pressed onto the periphery of the exhaust hole 41 by the root region 60a of the belt 60, which suppresses gas leakage from the exhaust hole 41.

When the airbag 36 inflates with the belt 60 of the flap element 55 released from the retaining mechanism 23, the loop 61 is pulled out of the insert hole 43B in accordance with the opening of the outer flap 56, and is arranged inside the airbag body 37, with no affection to airbag inflation.

Figure 13A:
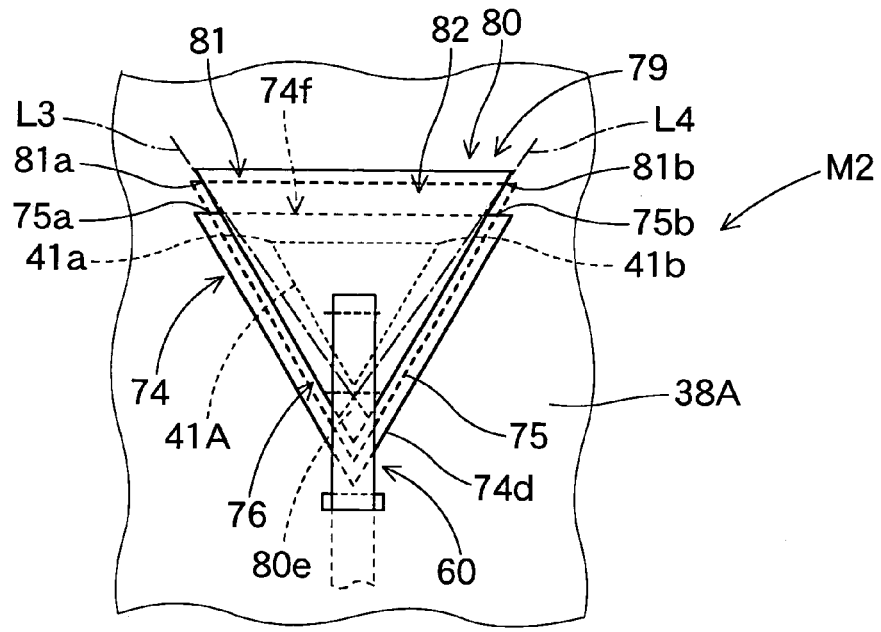
FIG. 13A is a partial enlarged bottom view of a flap element used in the second embodiment of the airbag apparatus.
Figure 13B:
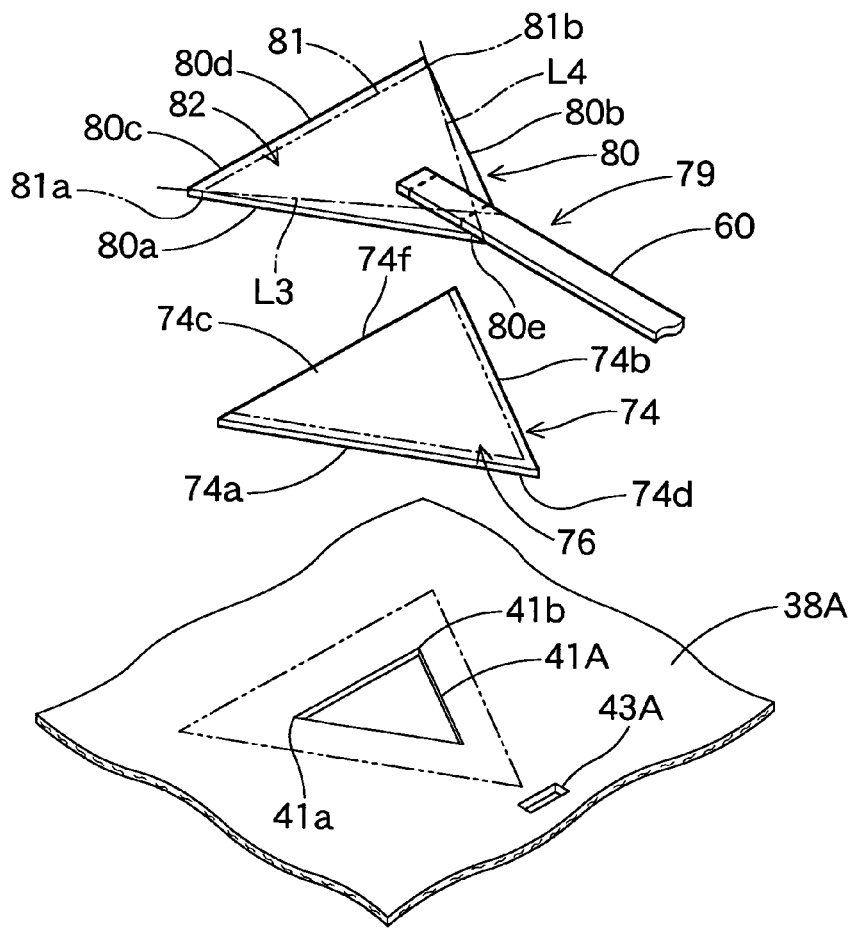
FIG. 13B is a partial enlarged perspective view of the flap element of FIG. 13A.
Figure 14:
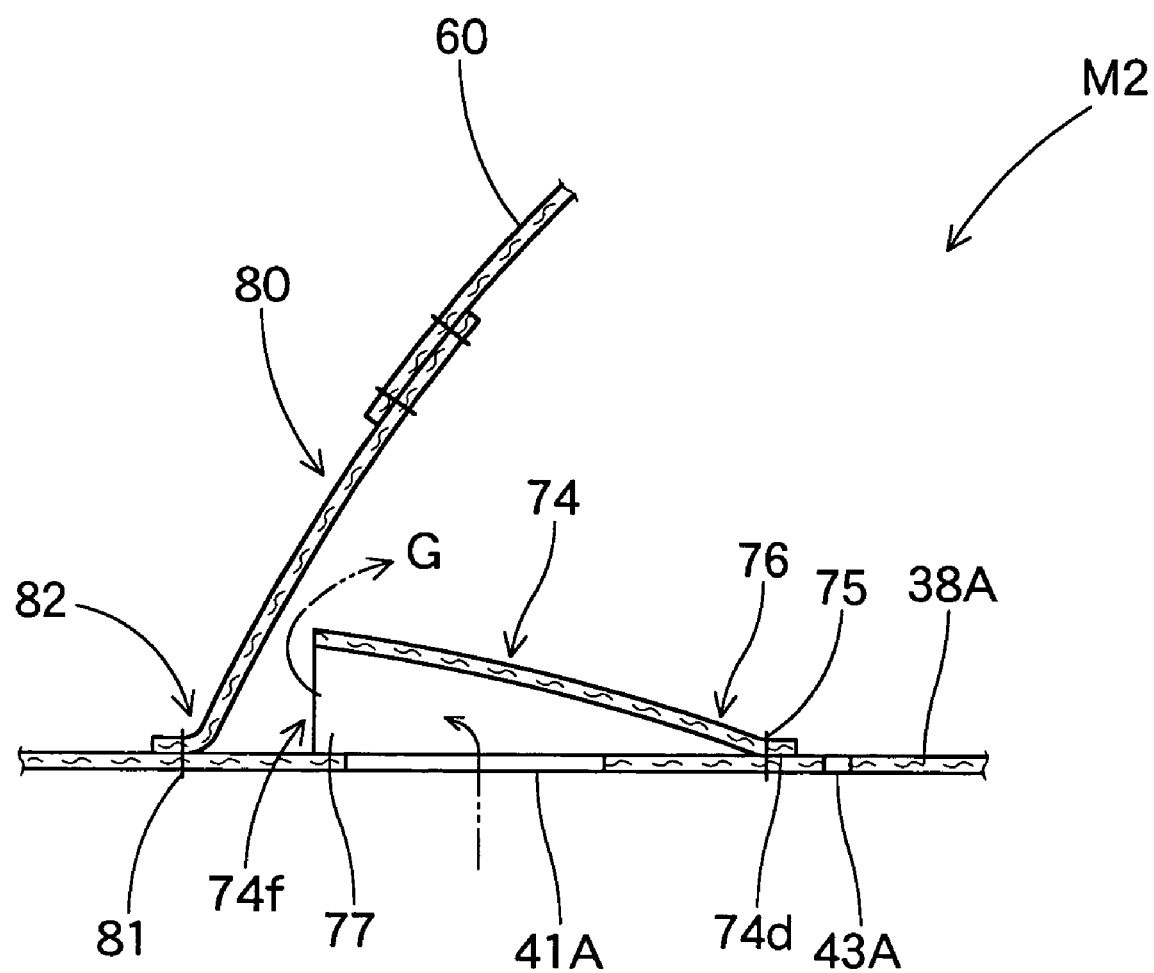
FIG. 14 is a sectional view of the flap element of FIG. 13A in its open state.
Figure 15A:
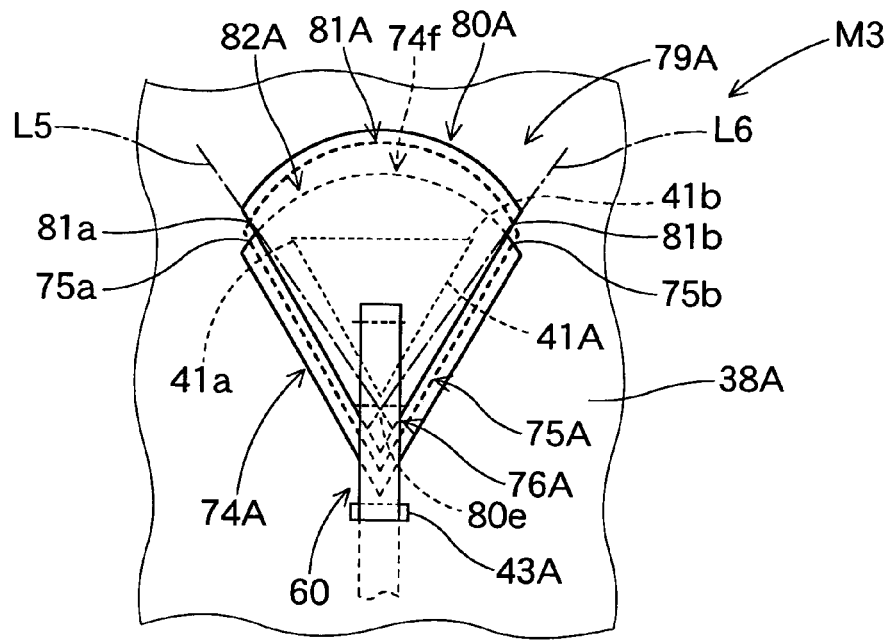
FIG. 15A is a partial enlarged bottom view of a flap element used in the third embodiment of the airbag apparatus.
Figure 15B:
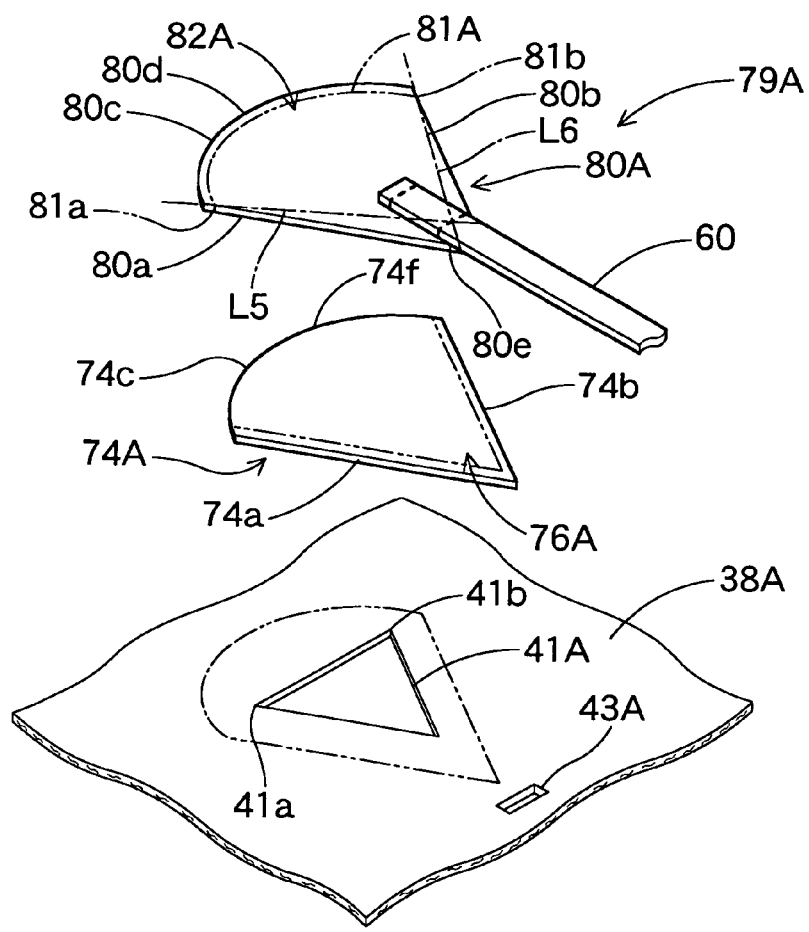
FIG. 15B is a partial enlarged perspective view of the flap element of FIG. 15A.

In the foregoing embodiment, the outer flap 56 as part of the flap element 55 and the inner flap 63 serving as open/close means both have generally square shapes, and are arranged to close the round exhaust hole 41 so that their diagonal lines extend along the longitudinal direction. However, the contours of the exhaust hole, inner flap and outer flap of the flap element should not be limited thereby. For example, the arrangements of the second embodiment will also be appreciated as illustrated in FIGS. 13A, 13B and 14. In the second embodiment, an airbag apparatus M2 employs a generally triangular inner flap 74 as the open/close means and a flap element 79 having an outer flap 80 with generally the same contour as the inner flap 74 for closing a generally triangular exhaust hole 41A in the vehicle body side wall 38A. Furthermore, the arrangements of the third embodiment will also be appreciated as shown in FIGS. 15A and 15B, where an airbag apparatus M3 employs a generally sectorial inner flap 74A as the open/close means and a flap element 79A having an outer flap 80A with generally the same contour as the inner flap 74A for closing the exhaust hole 41A.

Airbag apparatuses M2-M12 of the second to twelfth embodiments which will be described herein-after have basically identical structures as the airbag apparatus M1 of the first embodiment except in their flap member and open/close means, and therefore, descriptions of the same components will be omitted.

Outer flap 80 of the flap element 79 and inner flap 74 used in the airbag apparatus M2 of the second embodiment each have a generally triangular shape, as shown in FIGS. 13A and 13B. Each of them is arranged so that one side located forward extends generally along the lateral direction whereas a top opposite from the side is located at the rear end. The flap element 79 includes an outer flap 80 and a belt 60 having identical structure to that of the belt 60 of above-described flap element 55. In a similar way to the first embodiment, inner flap 74 and outer flap 80 are joined to the vehicle body side wall 38A in such a manner that the inner flap 74 is so placed on the outer surface of the vehicle body side wall 38A as to close the exhaust hole 41A, and then the outer flap 80 is overlaid on the inner flap 74 offset slightly forward by seam allowance, and then the entire circumference is sewn up to the vehicle body side wall 38A. The inner flap 74 is sewn to the vehicle body side wall 38A in a generally V-shape at its area by its root region 74d or at two rear sides 74a and 74b closer to the retaining mechanism, which area serve as a joint portion 75 to the wall 38, whereas its front side 74c serves as an openable leading end side 74f. A portion of the inner flap 74 proximate to the joint portion 75 serves as a hinge portion 76 about which the flap 74 turns when opening. When opening, the hinge portion 76 bends and provides a gap 77 between the leading end 74f and the wall 38A, thereby inflation gas escapes from the exhaust hole 41A (FIG. 14).

The outer flap 80 is sewn to the vehicle body side wall 38A at its area by its root region 80d or front side 80c, which area serves as a joint portion 81 to the wall 38A, whereas two rear sides 80a and 80b of the outer flap 56 serve as a leading end side 80e. A belt 60 is sewn to a region proximate to the leading end 80e. A portion of the outer flap 80 proximate to the joint portion 81 serves as a hinge portion 82 bendable upon opening of the flap 80.

In this flap element 79, too, ends 81a, 81b of the joint portion 81 joining the outer flap 80 to the wall 38A and ends 75a and 75b of the joint portion 75 joining the inner flap 74 to the wall 38A are located proximate to each other. In this flap element 79, too, straight lines L3 and L4 linking the ends 81a, 81b of the joint portion 81 and the leading end 80e of the outer flap 80 are located outside the lateral edges 41a and 41b of the exhaust hole 41A, as shown in FIG. 13A. In other words, the exhaust hole 41A is located within a generally triangular area defined by the straight lines L3, L4 and the joint portion 81. With this flap element 79, too, when the airbag inflates with the flap element 79 retained by the retaining mechanism, tension forces generated on the straight lines L3 and L4 linking the ends 81a, 81b of the joint portion 81 and leading end 80e of the outer flap 80 help the outer flap 80 to hold down the outer side of the inner flap 74 closing the exhaust hole 41A.

Flap element 79A and inner flap 74A used in the airbag apparatus M3 of the third embodiment have identical configurations to those of the flap element 79 and inner flap 74 shown in FIGS. 13A and 13B, except that the flap 74A and flap 80A each have a generally sectorial shape having one side of each of them arranged generally along the lateral direction in the front side being curved in a generally arcuate shape, as shown in FIGS. 15A and 15B. Therefore, detailed description will be omitted by adding numeral "A" to the reference numerals of components of the apparatus M2. In the third embodiment, too, ends 81a and 81b of a joint portion 81A joining the outer flap 80A to the wall 38A and ends 75a and 75b of a joint portion 75A joining the inner flap 74A to the wall 38A are located proximate to each other. In this flap element 79A, too, straight lines L5 and L6 linking the ends 81a, 81b of the joint portion 81A and a leading end 80e of the outer flap 80A are located outside the lateral edges 41a and 41b of the exhaust hole 41A (FIG. 15A). With this flap element 79A, too, when the airbag inflates with the flap element 79A retained by the retaining mechanism, tension forces generated on the straight lines L5 and L6 linking the ends 81a, 81b of the joint portion 81A and leading end 80e of the outer flap 80A help the outer flap 80A to hold down the outer surface of the inner flap 74A closing the exhaust hole 41A.

Figure 16A:
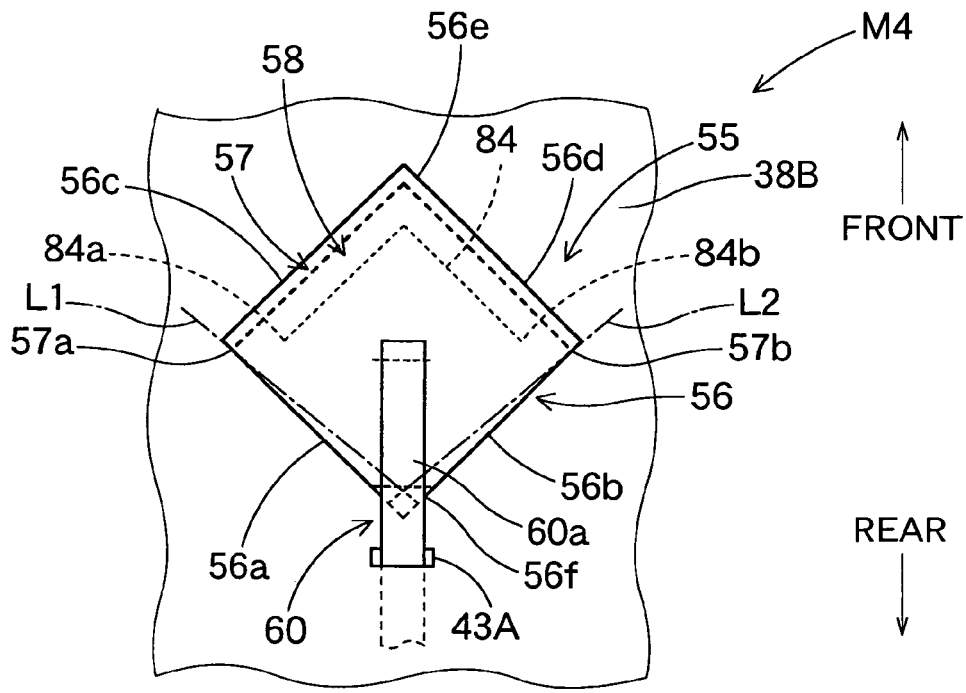
FIG. 16A is a partial enlarged bottom view of a flap element used in the fourth embodiment of the airbag apparatus.
Figure 16B:
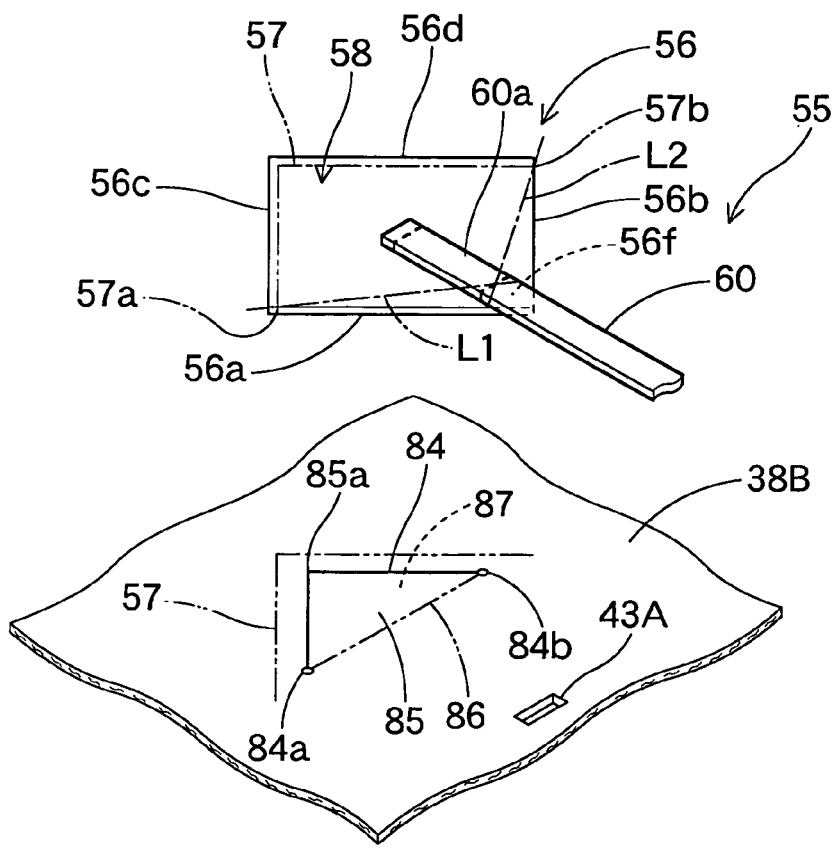
FIG. 16B is a partial enlarged perspective view of the flap element of FIG. 16A.

It will also be appreciated that an exhaust hole formed in a vehicle body side wall 38B is a slit 84 running through the wall 38B which slit is to be opened and closed by the above-described flap element 55, as in an airbag apparatus M4 of a fourth embodiment which will be described below and illustrated in FIGS. 16A and 16B.

Figure 17:
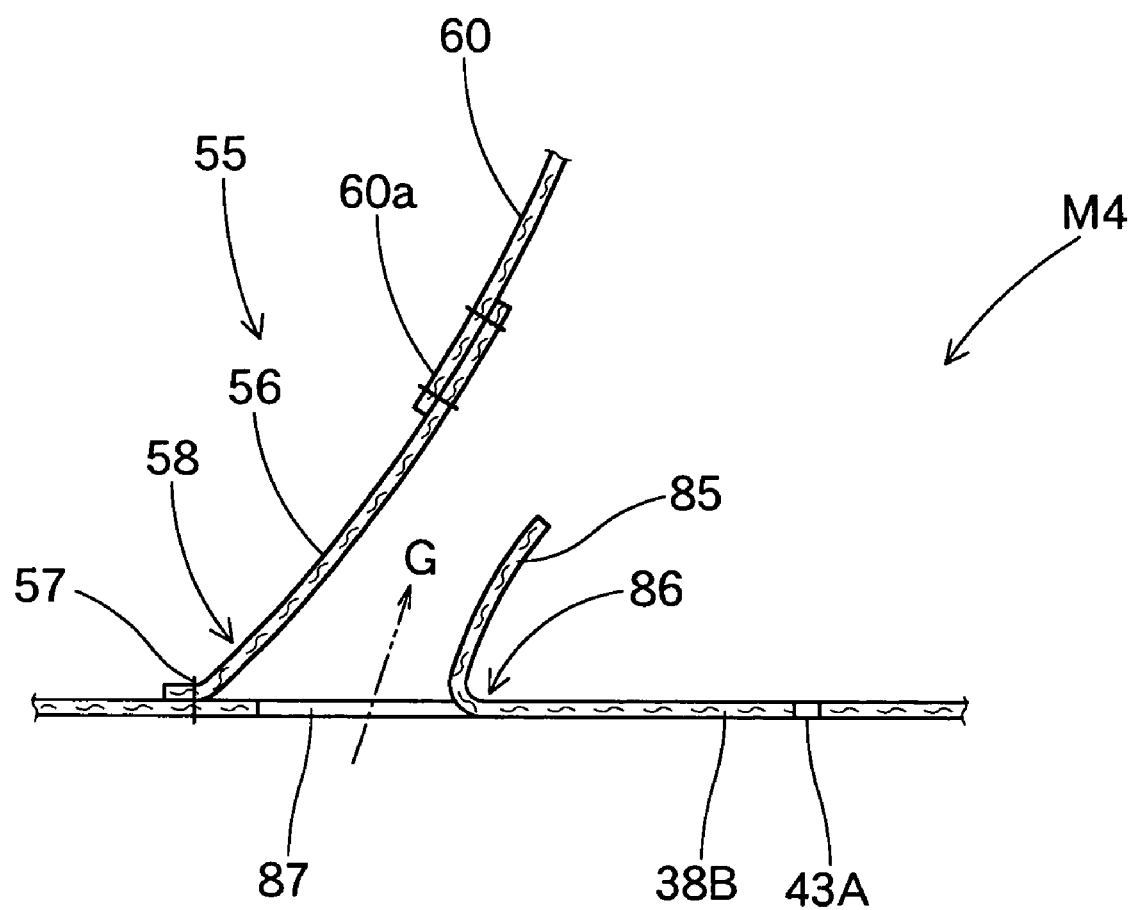
FIG. 17 is a sectional view of the flap element of FIG. 16A in its open state.

Slit 84 has a generally inverse V-shape approximate a U-shape as viewed from outside of the vehicle body side wall 38B, in such a manner that its central region projects forward i.e. in a direction away from a belt 60 of the flap element 55 or the retaining mechanism. In this instance, a peripheral region of the slit 84 serves as the open/close means. More specifically, an area of the vehicle body side wall 38B surrounded by the slit 84 serves as a door 85 opening around a region linking ends 84a and 84b of the slit 84 i.e. a hinge portion 86 (refer to phantom lines in FIG. 16B). This door 85 serves as the open/close means. If the door 85 opens, an exhaust hole 87 is provided in an area encircled by the slit 84 and opened door 85, i.e. an area encircled by the slit 84 and the hinge portion 86, through which inflation gas G is discharged (FIGS. 16B and 17). That is, the hinge portion 86 of the door 85 is located in the rear side in such a manner as to oppose a joint portion 57 of the outer flap 56 to the vehicle body side wall 38B disposed in the periphery of the opened exhaust hole 87.

Flap element 55 has an identical structure to that of the flap element 55 of the airbag apparatus M1 or first embodiment, and therefore, detailed description will be omitted by using common reference numerals. In this flap element 55, too, straight lines L1 and L2 linking ends 57a, 57b of the joint portion 57 joining the outer flap 56 to the wall 38B and a leading end 56f of the outer flap 56 are located outside the ends 84a and 84b of the slit 84, as shown in FIG. 16A. In other words, the slit 84 is located within a generally square area defined by the straight lines L1, L2 and the joint portion 57.

In the airbag apparatus M4 of the fourth embodiment, the door 85 serving as the open/close means is provided by simply forming the slit 84 in the vehicle body side wall 38B. This arrangement will reduce processes and cost for manufacturing an airbag apparatus.

In the fourth embodiment, the slit 84 has a bent contour, and the area of the vehicle body side wall 38B encircled by the slit 84 serves as the door 85 opening around the hinge portion 86 connecting the ends 84a and 84b of the slit 84 by the pressure of inflation gas. When the airbag inflates with the flap element 55 released from the retaining mechanism, this door 85 opens to provide the exhaust hole 87 in such a manner as to widen an opening area of the slit 84. This arrangement is more advantageous compared to a case where the slit is straight because the exhaust hole has a wider opening area.

In the fourth embodiment, moreover, the hinge portion 86 of the door 85 is so located as to oppose the joint portion 57 of the outer flap 56 to the wall 38B. When the airbag inflates in the retained mode of the flap element 55 by the retaining mechanism, the outer circumference of the door 85 in the opening end 85*a* opposing the hinge portion 86 is held down by a region of the outer flap 56 in the vicinity of the joint portion 57. Accordingly, the door 85 is prevented from opening by the pressure of inflation gas. Especially, with this arrangement, the slit 84 is located within the generally square area defined by the straight lines L1, L2 linking ends 57*a* and 57*b* of the joint portion 57 and the leading end 56*f* and the joint portion 57. Accordingly, when the airbag inflates with the flap element 55 retained by the retaining mechanism, tension forces generated on the straight lines L1 and L2 help the outer flap 56 to hold down the outer surface of the door 85 wholly, which prevents the door 85 from opening by the pressure of inflation gas.

Figure 18A:
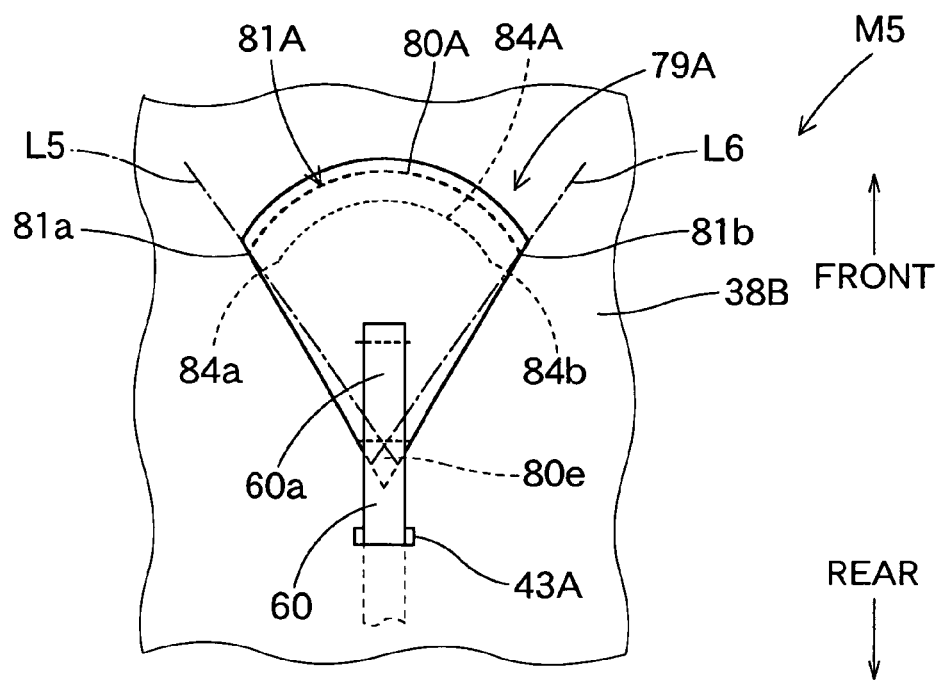
FIG. 18A is a partial enlarged bottom view of a flap element used in the fifth embodiment of the airbag apparatus.
Figure 18B:
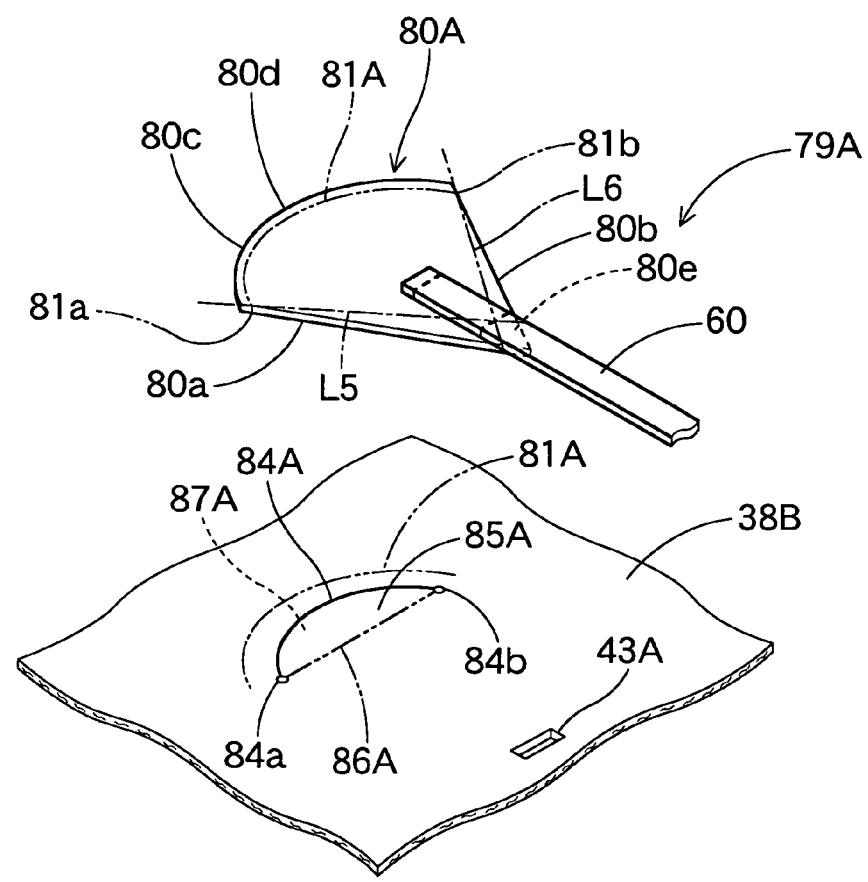
FIG. 18B is a partial enlarged perspective view of the flap element of FIG. 18A.

In such an embodiment as the fourth embodiment where a slit formed in the vehicle body side wall 38B provides the open/close means by its peripheral region, the shapes of the slit and flap element should not be limited to those described above. For example, the arrangement of an airbag apparatus M5 of the fifth embodiment shown in FIGS. 18A and 18B will also be appreciated. In the airbag apparatus M5, a slit 84A formed in the wall 38B has an arcuate shape approximate a U-shape as viewed from outside of the wall 38B, in such a manner that its central region projects forward i.e. in a direction away from a belt 60 of a flap element 79A or the retaining mechanism. The flap element 79A joined to the vehicle body side wall 38B has an outer flap 80A having a generally sectorial or fan-like shape to cover the periphery of the slit 84A. Flap element 79A of the airbag apparatus M5 has an identical structure to that of above-described flap element 79A shown in FIGS. 15A and 15B, and therefore, detailed description will be omitted by using common reference numerals. Slit 84A has an identical structure to above-described slit 84 except in its contour. Therefore, detailed description will be omitted by adding numeral "A" to the reference numerals of components of the apparatus M4. In this flap element 79A, too, straight lines L5 and L6 linking ends 81*a*, 81*b* of a joint portion 81A joining an outer flap 80A to the vehicle body side wall 38B and a leading end 80*e* of the outer flap 80A are located outside the lateral edges 84*a* and 84*b* of the slit 84A (FIG. 18A). With this arrangement, too, when the airbag inflates with the flap element 79A retained by the retaining mechanism, tension forces generated on the straight lines L5 and L6 help the outer flap 80A to hold down the entire outer periphery of a door 85A wholly. Consequently, the door 85A is prevented from opening due to the pressure of inflation gas.

Figure 19A:
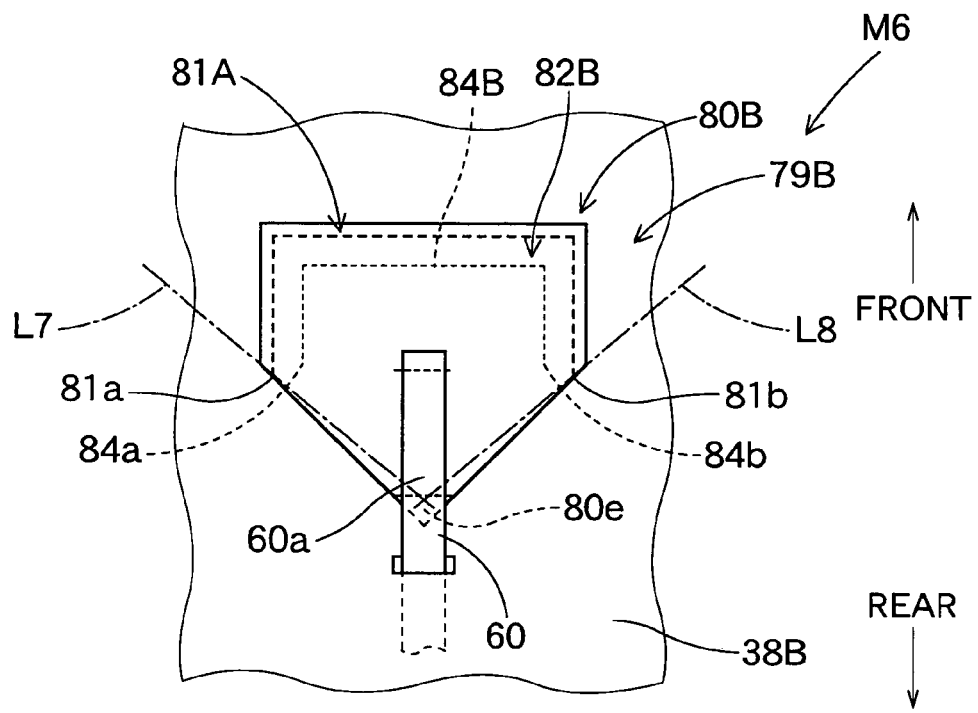
FIG. 19A is a partial enlarged bottom view of a flap element used in the sixth embodiment of the airbag apparatus.
Figure 19B:
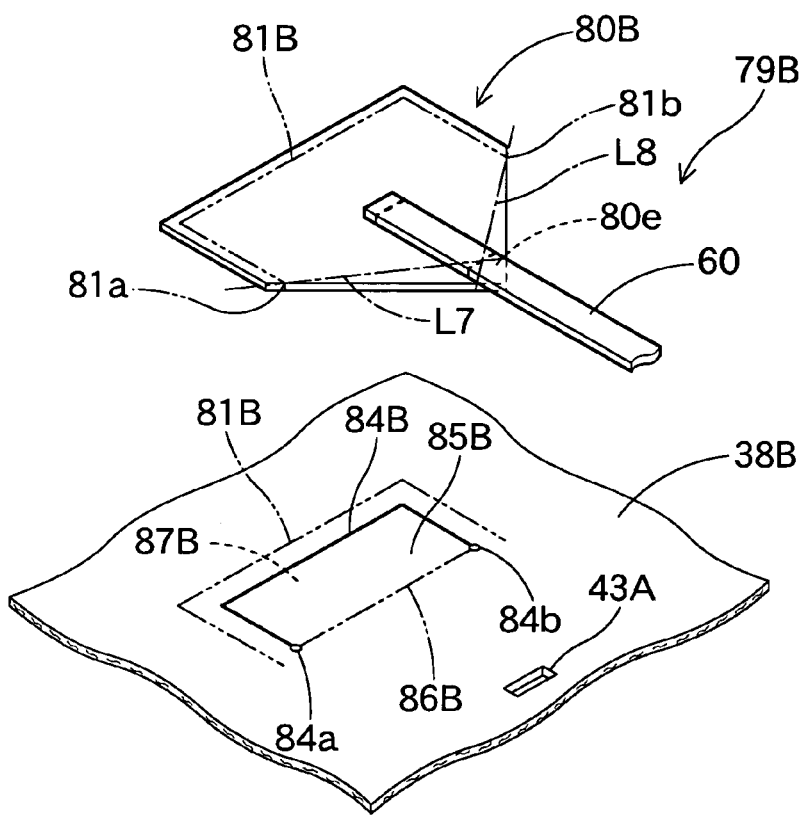
FIG. 19B is a partial enlarged perspective view of the flap element of FIG. 19A.

The sixth embodiment is now described referring to FIGS. 19A and 19B. In an airbag apparatus M6 of the sixth embodiment, a slit 84B formed in the wall 38B has an inverse U-shape as viewed from outside of the wall 38B, in such a manner that its central region projects forward i.e. in a direction away from a belt 60 of a flap element 79B or retaining mechanism. The flap element 79B joined to the vehicle body side wall 38B has an outer flap 80B configured like a home plate to cover the outer periphery of the slit 84B. Flap element 79B shown in FIGS. 19A and 19B has an identical structure to above-described flap element 79A except in that the outer flap 80B has a generally pentagon-shape and its three sides in the front side are joined to the vehicle body side wall 38B to provide a joint portion 81B. Slit 84B also has an identical structure to above-described slits 84 and 84A except in that it has an inverse U-shape similar to the joint portion 81B of the outer flap 80B. Therefore, detailed description will be omitted by adding numeral "B" to the reference numerals of components of the apparatus M4. In this flap element 79B, too, straight lines L7 and L8 linking ends 81*a*, 81*b* of the joint portion 81B joining the outer flap 80B to the vehicle body side wall 38B and a leading end 80*e* of the outer flap 80B are located outside of ends 84*a* and 84*b* of the slit 84B, that is, located to enclose the ends 84*a* and 84*b* of the slit 84B (FIG. 19A). With this arrangement, too, when the airbag inflates with the flap element 79B retained by the retaining mechanism, tension forces generated on the straight lines L7 and L8 help the outer flap 80B to hold down the entire outer periphery of a door 85B wholly. Consequently, the door 85B is prevented from opening due to the pressure of inflation gas.

Figure 20A:
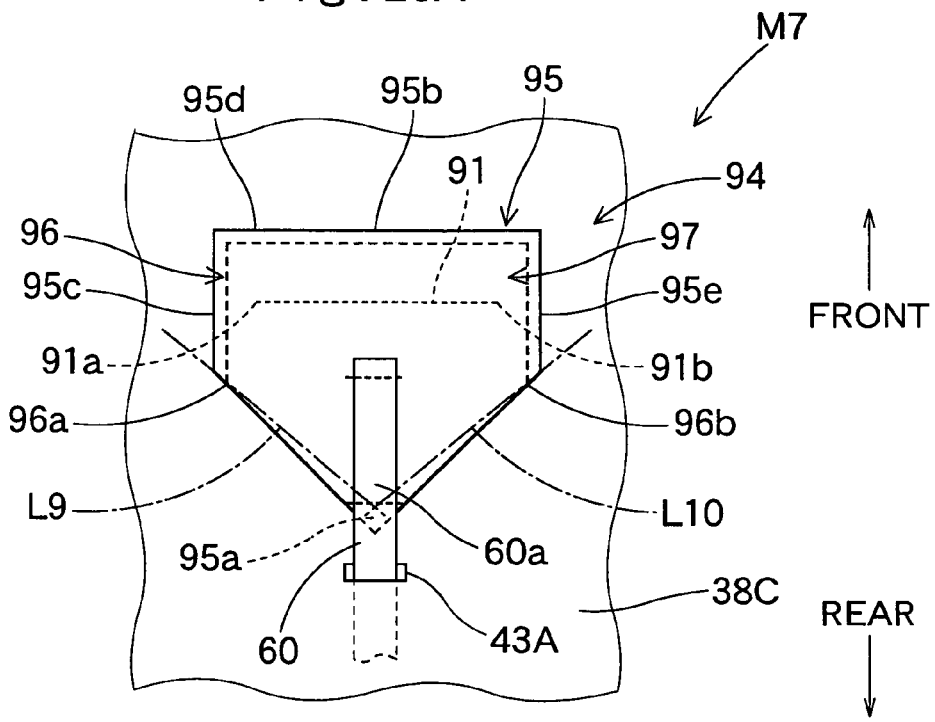
FIG. 20A is a partial enlarged bottom view of a flap element used in the seventh embodiment of the airbag apparatus.
Figure 20B:
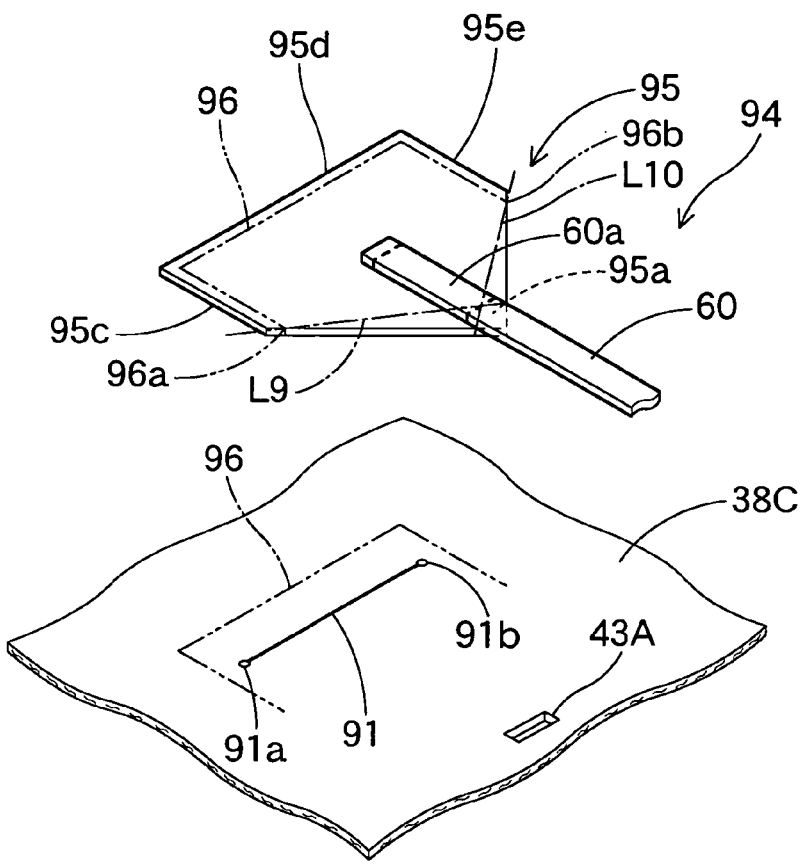
FIG. 20B is a partial enlarged perspective view of the flap element of FIG. 20A.
Figure 21:
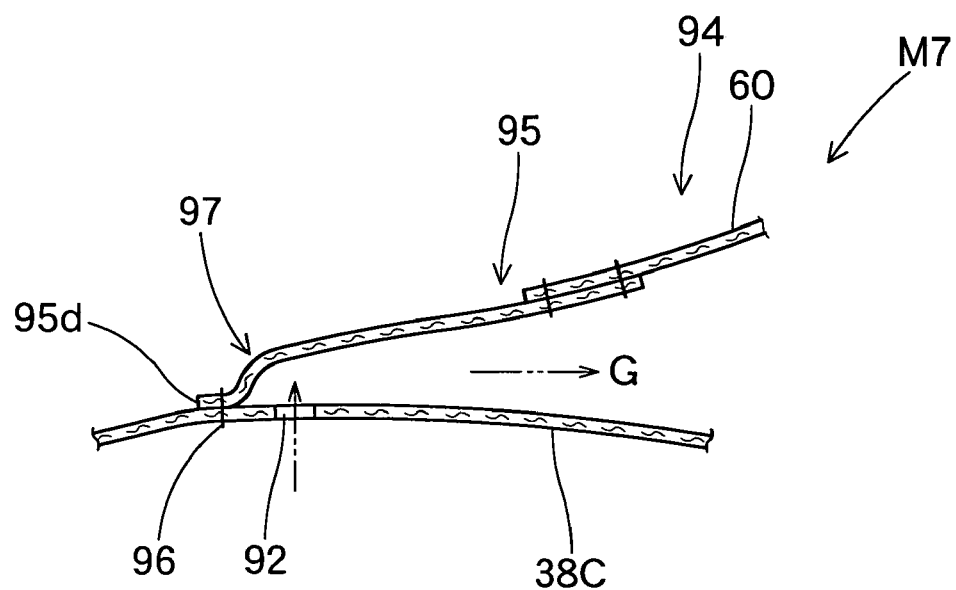
FIG. 21 is a sectional view of the flap element of FIG. 20A in its open state.
Figure 21:
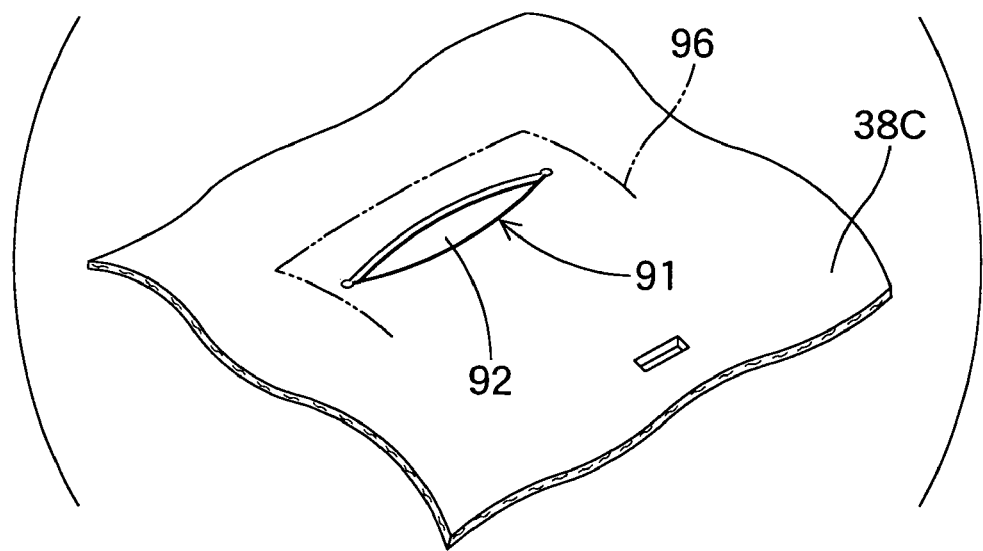

The seventh embodiment is now described referring to FIGS. 20A, 20B, and 21. In an airbag apparatus M7 of the seventh embodiment, a straight slit 91 is formed in a vehicle body side wall 38C to extend generally along the lateral direction. Joined to the vehicle body side wall 38C is a flap element 94 having a flap body 95 covering the outer periphery of the slit 91.

Slit 91 is arranged along the lateral direction, that is, generally orthogonally to the opening direction of the flap body 95 as will be described in detail below. A region of the vehicle body side wall 38C in the periphery of the slit 91 serves as an open/close means. When the airbag inflates with the flap element 94 released from the retaining mechanism, the slit 91 opens due to the pressure of inflation gas, in such a manner as to expand its opening area, thereby providing an exhaust hole 92 (FIG. 21).

Flap element 94 includes a flap body 95 having a generally pentagon contour like a home plate and disposed in the outer surface of the vehicle body side wall 38C, and a belt 60 joined to a leading end 95*a* of the flap body 95. Belt 60 has an identical structure to above-described belt 60 of the flap element 55, and therefore, description will be omitted by using common reference numerals.

Flap body 95 has its top disposed in the rear end side, which top is a leading end 95*a* when opening. Three sides 95*c*, 95*d* and 95*e* of the flap body 95 in its root 95*b* side or in the front side are entirely sewn to the vehicle body side wall 38C, which sides 95*c*, 95*d* and 95*e* serve as a joint portion 96. Flap body 95 is adapted to open in the longitudinal direction around an area in the vicinity of the joint portion 96, i.e. a hinge portion 97 bendable upon opening. The joint portion 96 is disposed to surround the slit 91. In this particular embodiment, the joint portion 96 surrounds the slit 91 on three sides, i.e. on the root 95*b* side of the flap element 95, and on sides of ends 91*a* and 91*b* of the slit 91, as shown in FIG. 20A. In other words, in this flap element 94, too, straight lines L9 and L10 linking ends 96*a*, 96*b* of the joint portion 96 joining the flap body 95 to the vehicle body side wall 38C and the leading end 95*a* of the flap body 95 are located outside of ends 91*a* and 91*b* of the slit 91, that is, located to enclose the ends 91*a* and 91*b* of the slit 91 (FIG. 20A).

In the airbag apparatus M7 of the seventh embodiment, slit 91 is arranged along the lateral direction to be generally orthogonal to the opening direction of the flap body 95. When the airbag inflates with the flap element 94 retained by the retaining mechanism, the periphery of the slit 91 serving as the open/close means is held down by the flap body 95, and is prevented from moving to open the slit 91 along the opening direction of the flap body 95. More specifically, when the airbag inflates with the flap element 94 retained by the retaining mechanism, tension forces are generated on the straight lines L9 and L10 linking ends 96a, 96b of the joint portion 96 joining the flap body 95 to the vehicle body side wall 38C and the leading end 95a of the flap body 95, by which forces an area encircled by the joint portion 96 and the straight lines L9 and L10 is held down onto the vehicle body side wall 38C. Consequently, the periphery of the slit 91 is held down by the flap body 95, and the slit 91 is prevented from opening.

In the airbag apparatus M7, moreover, the joint portion 96 of the flap body 95 is disposed in the periphery of the slit 91 to surround the slit 91 on three sides; on the root 95b side of the flap element 95 and on the sides of ends 91a and 91b of the slit 91. This arrangement allows the flap body 95 to seal the slit 91 tightly and prevents gas leakage therefrom.

When the airbag inflates with the flap element 94 released from the retaining mechanism, the flap body 95 opens about the hinge portion 97 due to the pressure of inflation gas flown into the airbag. Then as shown in FIG. 21, the slit 91 opens in the longitudinal direction to provide the exhaust hole 92, through which the gas is exhausted.

Although the flap element 55/79/79A/79B/94 in the foregoing embodiments includes the outer flap or flap body 56/80/80A/80B/95 and belt 60 as separate entities, the belt may be integral with the flap body or outer flap, in such a manner that the belt extends from the leading end of the flap body. Although the belt 60 is sewn to the vicinity of leading end 56f/80e/95a of the outer flap or flap body 56/80/80A/80B/95, the position to join the belt to the flap body should not be limited thereby. For example, the belt 60 may be sewn to any intermediate position on the opening direction of the outer flap or flap body 56/80/80A/80B/95, i.e., any intermediate position of the outer flap or flap body 56/80/80A/80B/95 in the longitudinal direction, on condition that the belt 60 is capable of holding the leading end 56f/80e/95a of the outer flap or flap body 56/80/80A/80B/95.

Figure 22:
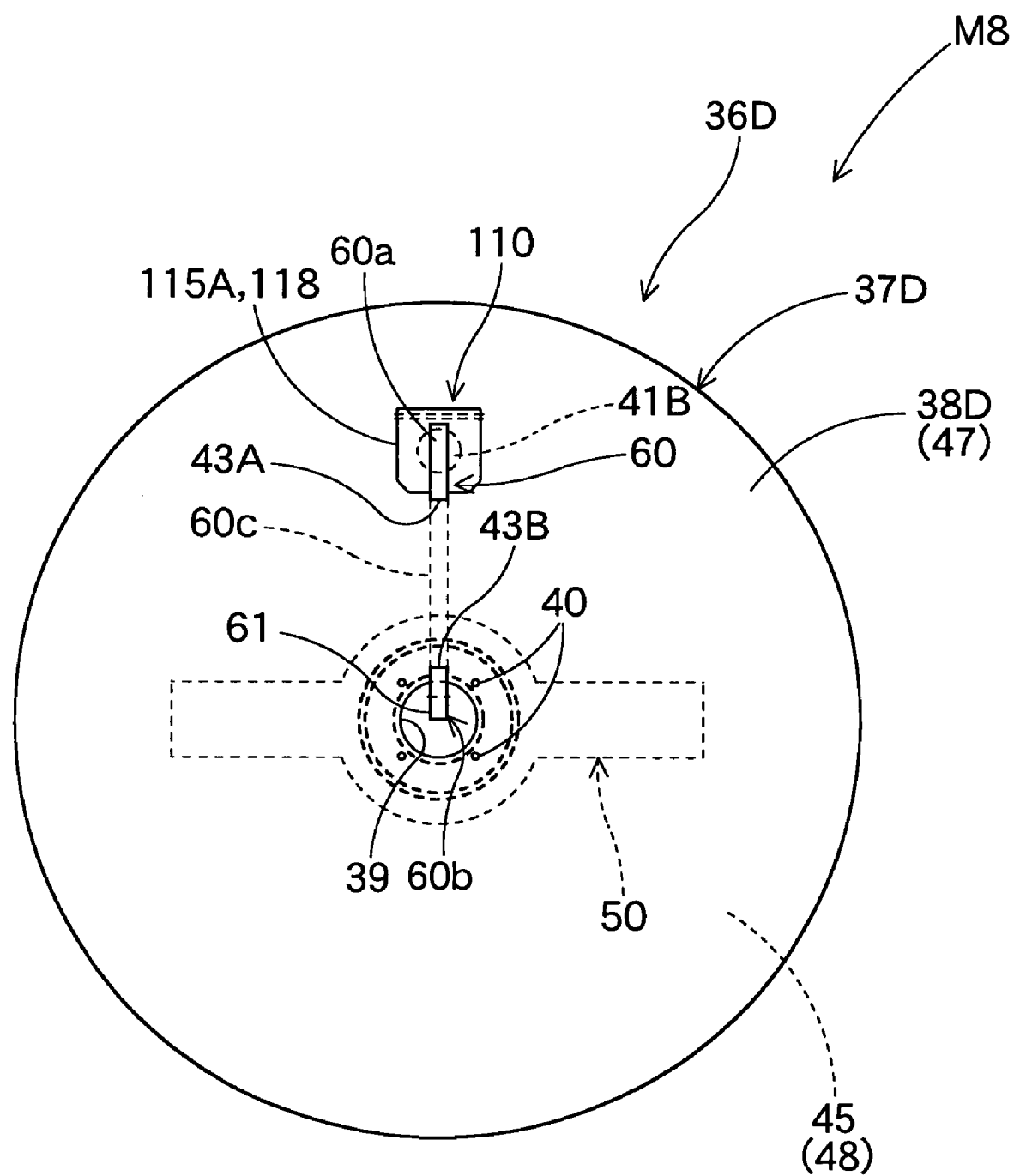
FIG. 22 is a bottom view of an airbag employing a flap element used in the eighth embodiment of the airbag apparatus.
Figure 23:
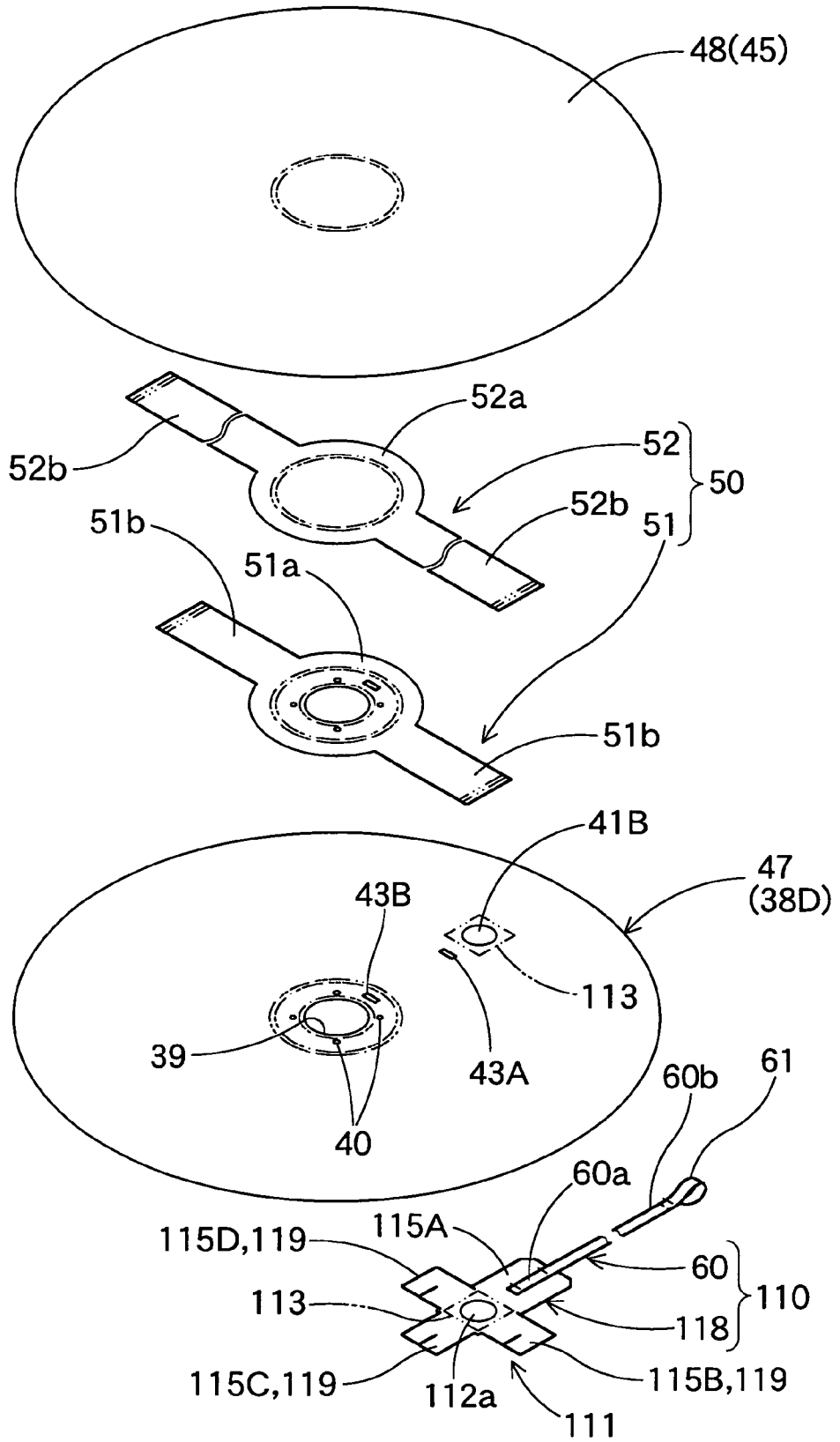
FIG. 23 is a schematic exploded perspective view of components of the airbag of FIG. 22.
Figure 24:
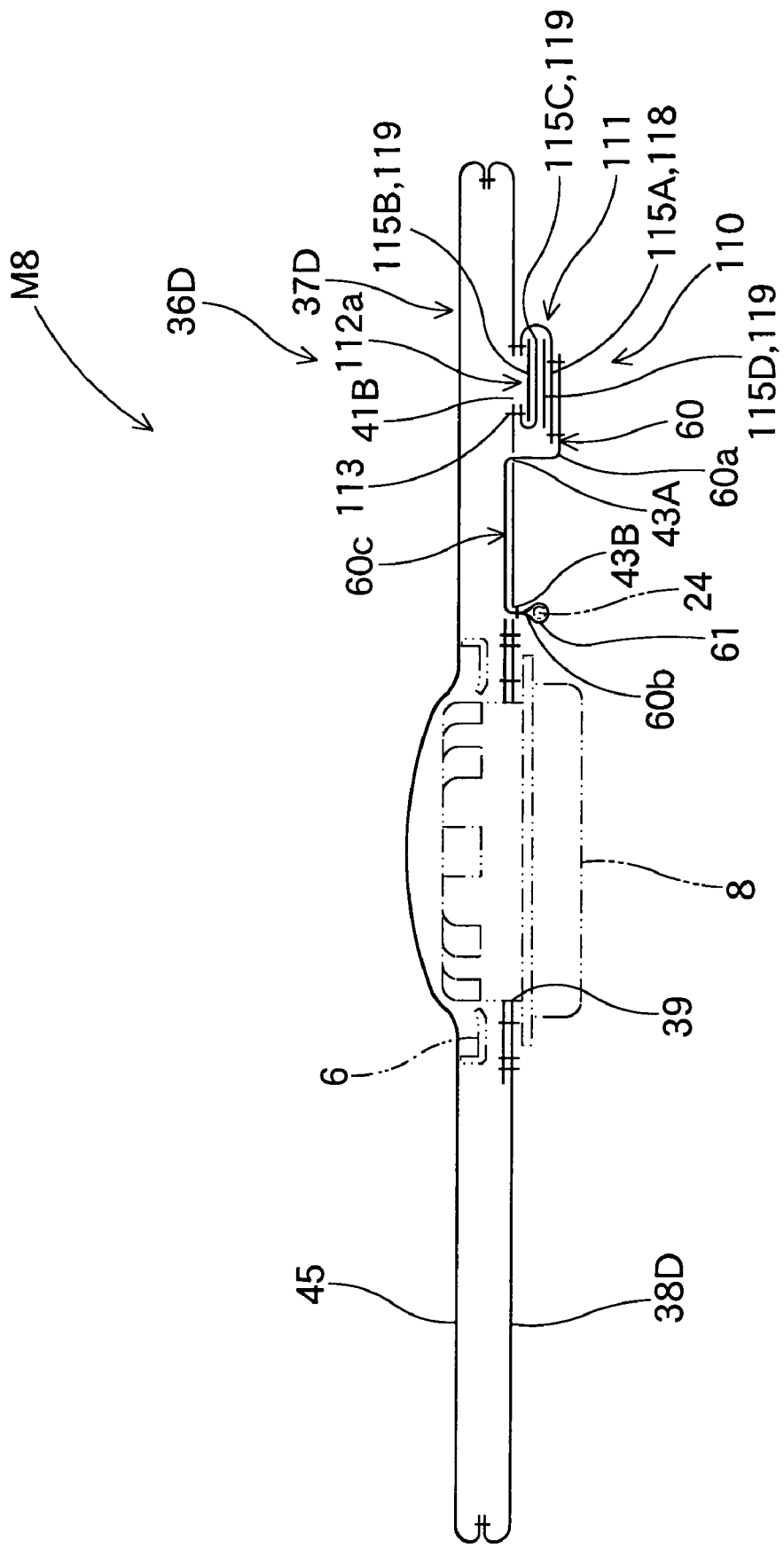
FIG. 24 is a schematic section of the airbag of FIG. 22.

An airbag apparatus M8 of the eighth embodiment is now described with reference to FIGS. 22 to 25. A flap element 110 of the eighth embodiment includes an outer flap 118 arranged outside the airbag body 37D (vehicle body side wall 38D) for closing an exhaust hole 41B, and a belt 60 joined to the leading end of the outer flap 118 as shown in FIGS. 22 to 24. Three inner flaps 119 serving as the open/close means are joined to the periphery of the exhaust hole 41B between the outer flap 118 and the airbag body 37D (vehicle body side wall 38D) and outside the vehicle body sidewall 38D. Belt 60 has an identical configuration to the belt 60 used in the flap element 55 of the first embodiment, and therefore, its description will be omitted by using common reference numerals.

Figure 25:
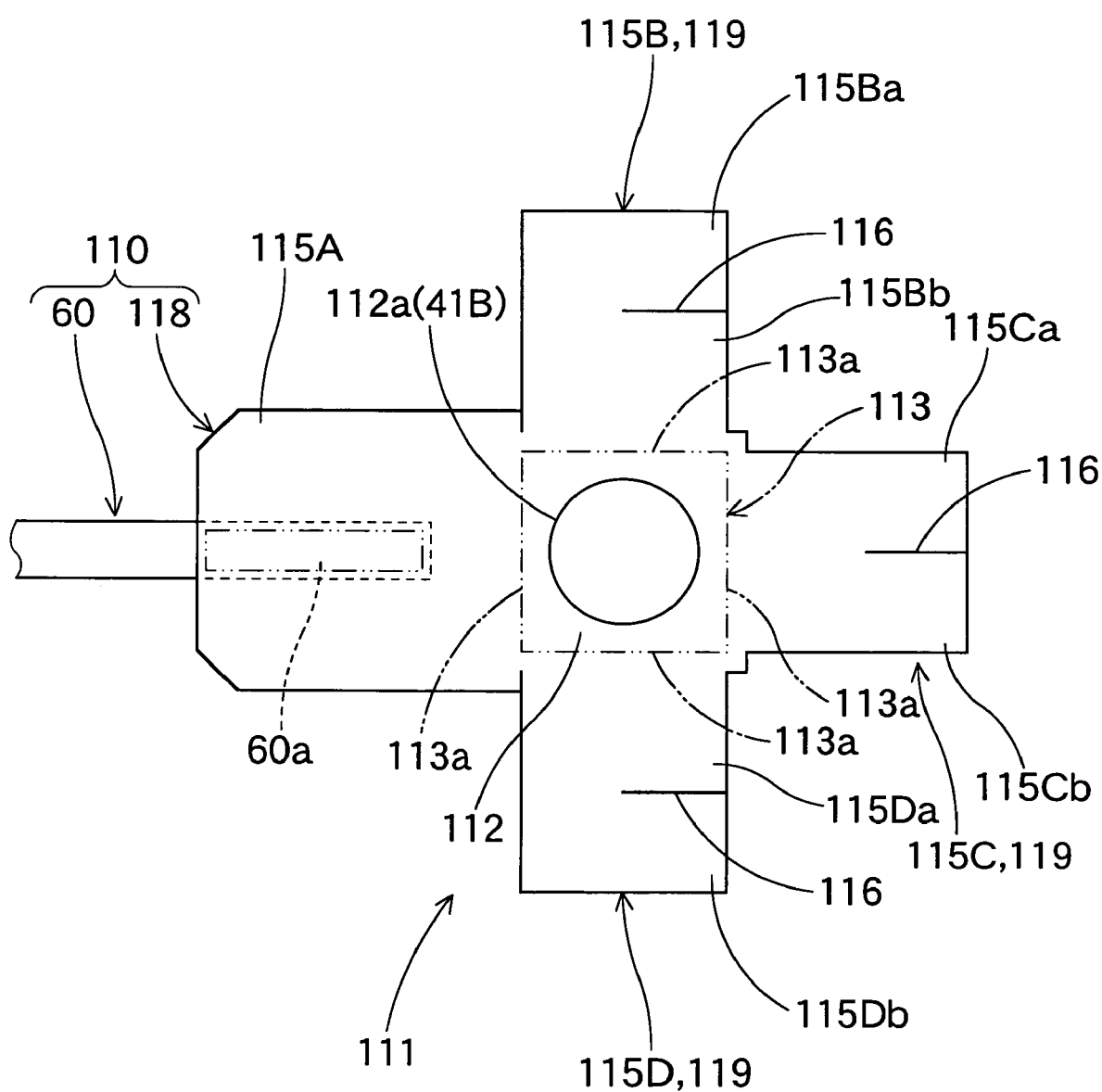
FIG. 25 is a development of the flap element used in the airbag of FIG. 22.

Outer flap 118 and inner flaps 119 are made of flexible fabric woven by polyamide or polyester yarn or the like, and are integrally manufactured as part of a cloth member 111 having a generally cross shape, as shown in FIG. 25. The cloth member 111 includes a generally quadrangular anchor region 112 located at the center and connected to the periphery of the exhaust hole 41B and four tabs 115 extending in four directions (in front, rear, left and right directions) from the anchor region 112, each of which tabs 115 having a generally quadrangular shape. The four tabs 115 constitute the outer flap 118 and three inner flaps 119.

Anchor region 112 has a generally square shape and is provided at its center with a through hole 112a having a round shape corresponding to the exhaust hole 41B. Anchor region 112 is sewn to the vehicle body side wall 38D in its entire periphery, thereby providing a joint portion 113. Joint portion 113 has a generally square shape surrounding the through hole 112a or exhaust hole 41B thoroughly. Each of its straight sides 113a serves as a hinge portion of the outer flap 118 or inner flaps 119 composed of the tabs 115.

Tabs 115 extend radially from the anchor region 112. More specifically, tabs 115 are disposed in the front, rear, left and right sides of the anchor region 112, and each of them has a generally rectangular shape large enough to close the exhaust hole 41B or through hole 112a. The length of each side or hinge portion 113a of the joint portion 113 is greater than the diameter of the exhaust hole 41B. In this particular embodiment, a tab 115A disposed in the front side of the anchor region 112 serves as the outer flap 118. Tabs 115B, 115C and 115D disposed in the rear, left and right sides of the anchor region 112 constitute the inner flaps 119. Each of tabs 115B, 115C and 115D or inner flaps 119 has the generally same contour as the anchor region 112, whereas tab 115A or outer flap 118 has a larger contour than the inner flaps 119 so it can cover up the inner flaps 119.

Each of tabs 115B, 115C and 115D forming inner flaps 119 has a slit 116 through which, when they are overlaid one on another to close the exhaust hole 41B, other tab 115B, 115C or 115D is inserted so that the tabs 115B, 115C and 115D are piled up partially alternately. In the foregoing embodiment, each slit 116 is formed to extend straightly along the longitudinal direction from the rear edge to longitudinal center of the tabs 115B, 115C and 115D, in the laterally intermediate region. When the tabs 115B, 115C and 115D are overlaid one on another to close the exhaust hole 41B, they are so piled up utilizing slits 116 so that left regions 115Bb, 115Cb, 115Db and right regions 115Ba, 115Ca, 115Da are counterchanged in the in-out relationship.

Figure 26A:
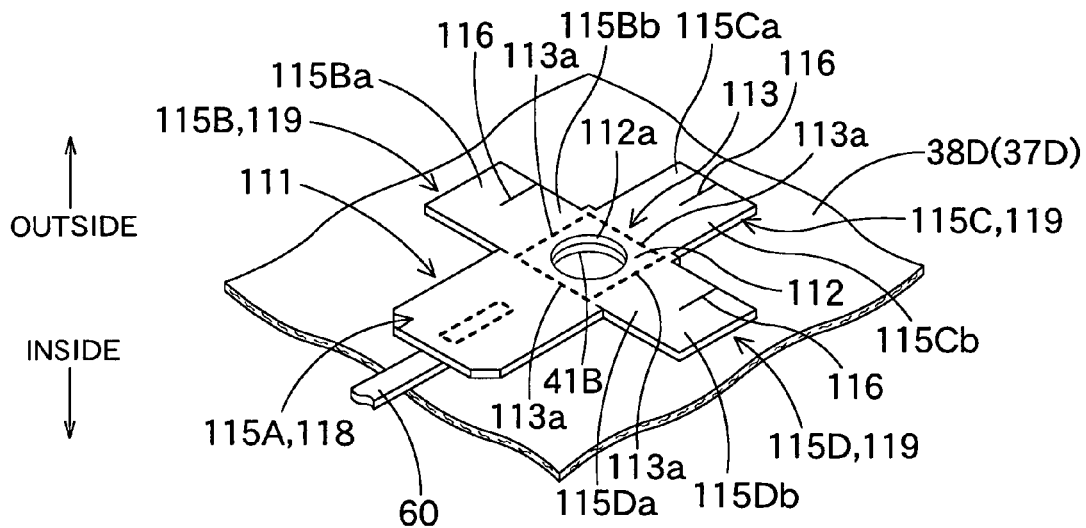
FIGS. 26A, 26B, 26C, 27A and 27B are schematic perspective views illustrating a process of shutting up an exhaust hole of the airbag of FIG. 22 with the flap element of FIG. 25, as viewed from outside of airbag.
Figure 26B:
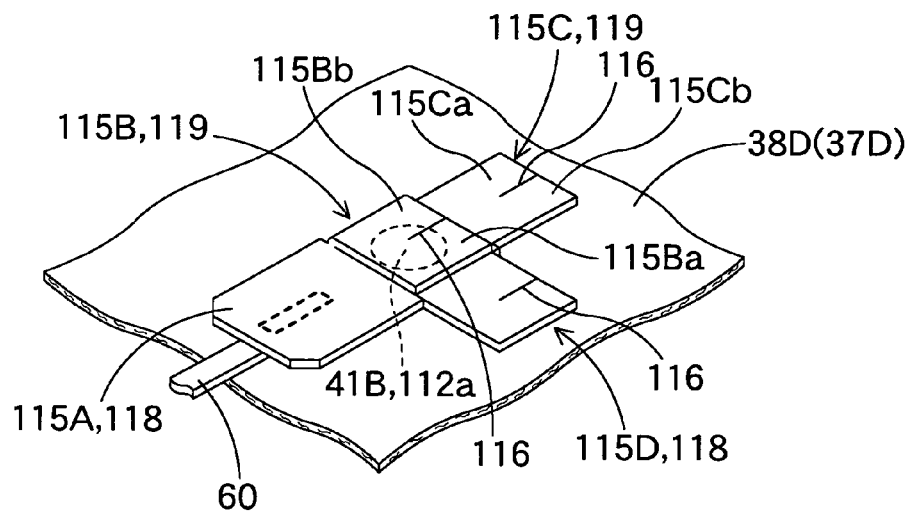
Figure 26C:
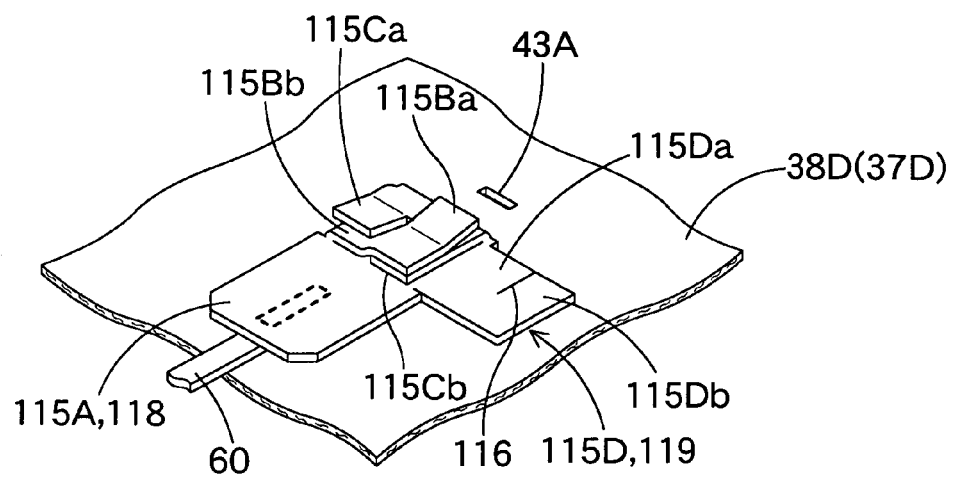
Figure 27A:
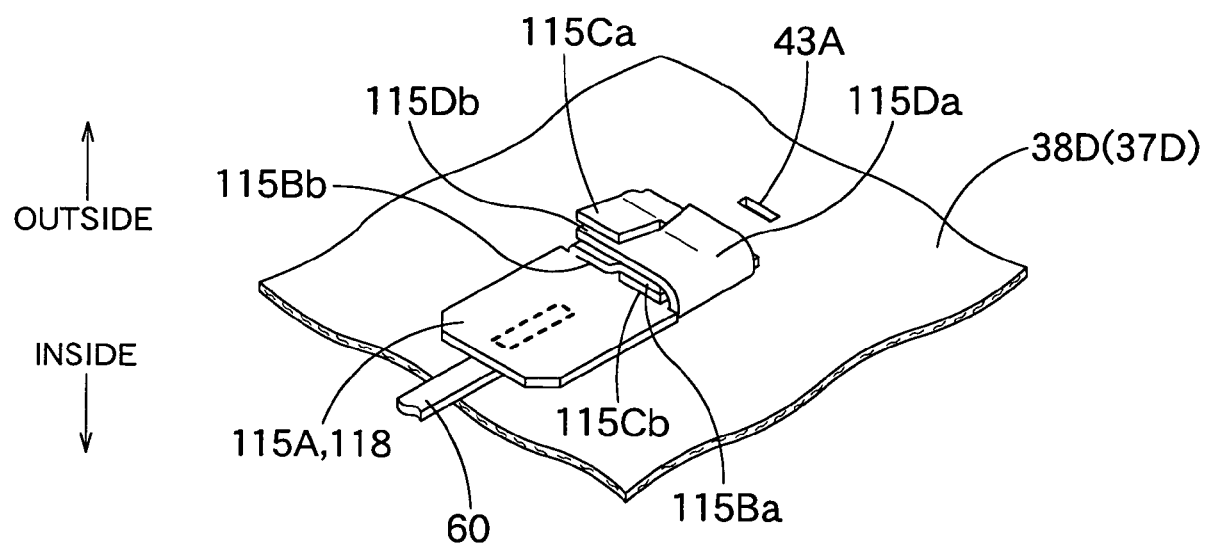
Figure 27B:
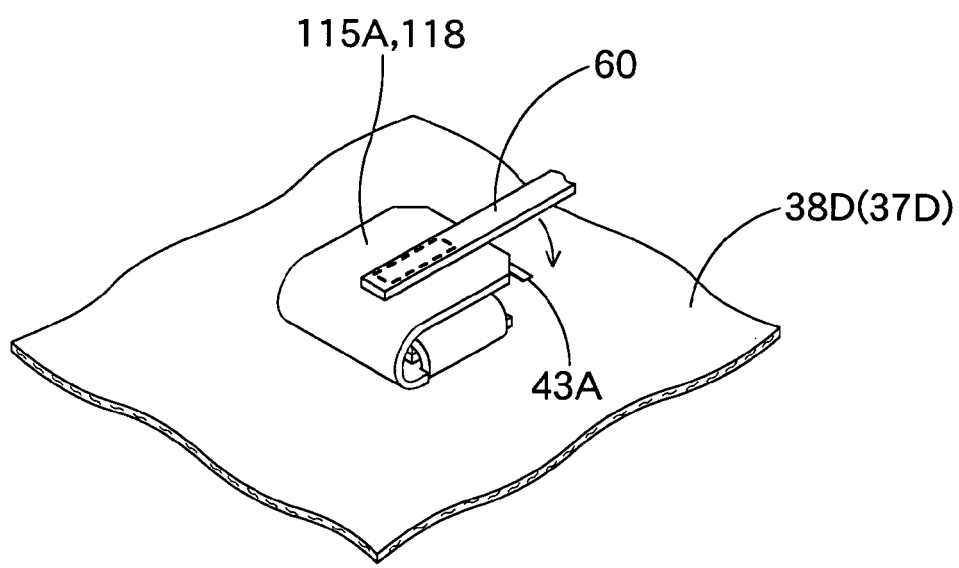

After the cloth member 111 is sewn to the outside of the vehicle body side wall 38D at the joint portion 113, flap element 110 is arranged to close the exhaust hole 41B at outside of airbag 37D as follows: From the developed state as shown in FIG. 26A, tab 115B or inner flap 119 disposed in the right side of the exhaust hole 41B is folded over the exhaust hole 41B on the hinge portion 113a (FIG. 26B). Subsequently, tab 115C or inner flap 119 disposed in the rear side of the exhaust hole 41B is folded over the exhaust hole 41B on the hinge portion 113a, and piled on tab 115B. At this time, slits 116 of tabs 115B and 115C are used to locate the left region 115Cb of tab 115C inside the right region 115Ba of tab 115B whereas the right region 115Ca of tab 115C outside the left region 115Bb of tab 115B (FIG. 26C). Then tab 115D or inner flap 119 disposed in the left of the exhaust hole 41B is folded over the exhaust hole 41B on the hinge portion 113a and piled on tabs 115B and 115C using slits 116 of tabs 115C and 115D in such a manner that the left region 115Db of tab 115D is located inside the right region 115Ca of tab 115C whereas the right region 115Da of tab 115D outside the left region 115Ba of tab 115B (FIG. 27A). Thereafter, as shown in FIG. 27B, tab 115A or outer flap 118 is folded over the exhaust hole 41B on the hinge portion 113a, and belt 60 is put through an insert hole 43A from a loop 61. Then the loop 61 of the belt 60 is so put through an insert hole 43B to project to the outside the airbag 36D. Thus the exhaust hole 41B is closed by the flap element 110.

Figure 28A:
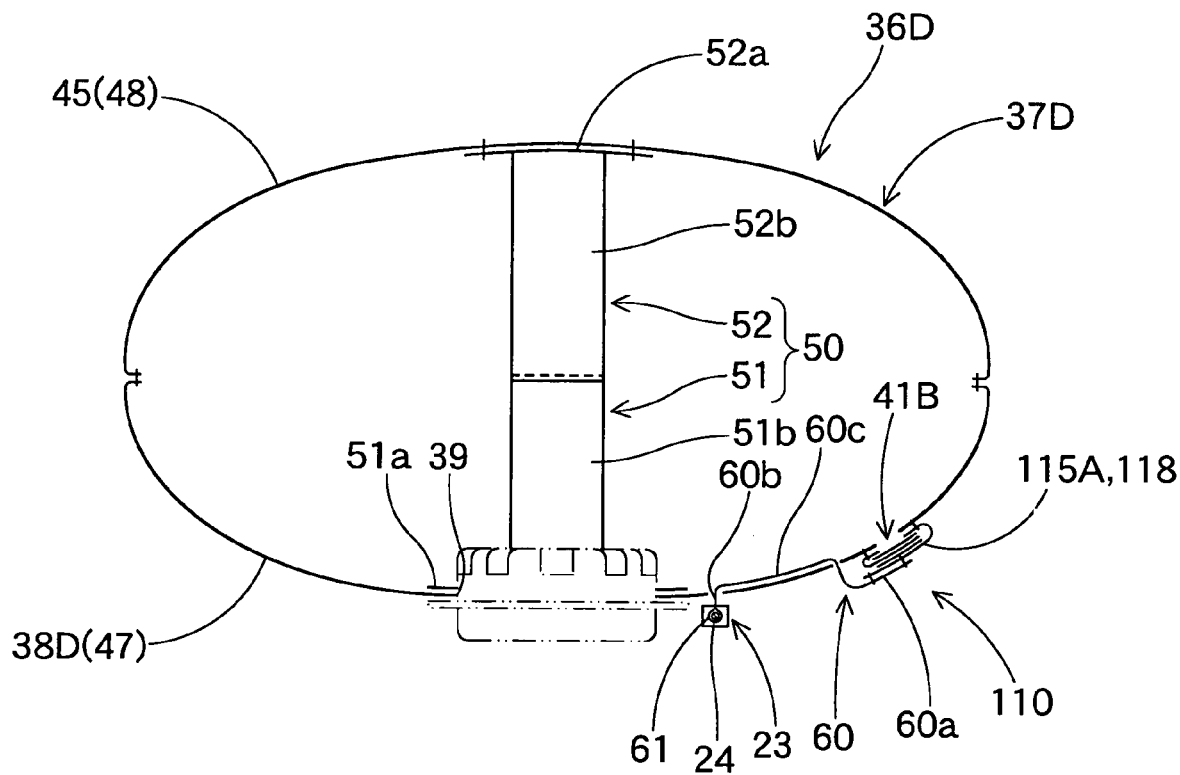
FIGS. 28A and 28B are schematic sections of the completely inflated airbag of FIG. 22.
Figure 28B:
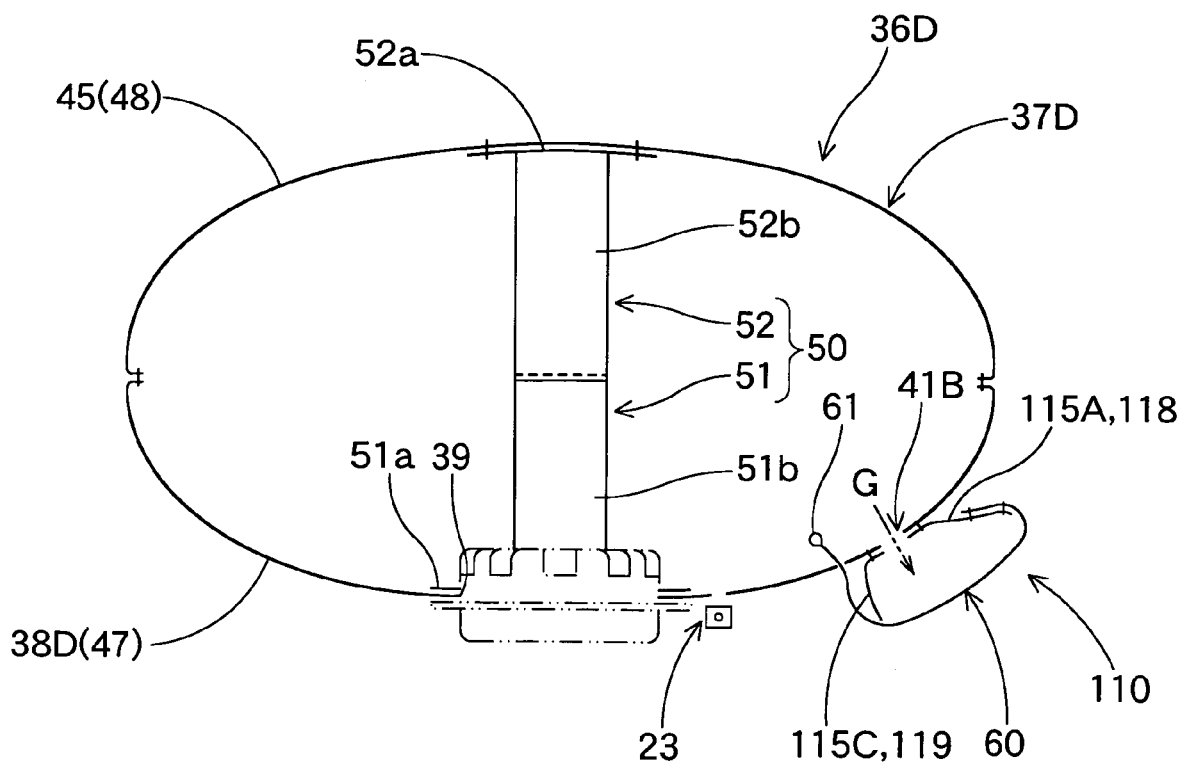

In the airbag apparatus M8 of the eighth embodiment, too, when the loop 61 is disengaged from a retaining pin 24, the exhaust hole 41B of the airbag 36D opens and emits extra inflation gas G while the airbag 36D completes inflation as shown in FIG. 28B. If the loop 61 is retained by the pin 24, the airbag 36D completes inflation while keeping the exhaust hole 41B closed as shown in FIG. 28A.

In the eighth embodiment, too, when the airbag 36D inflates with belt 60 of flap element 110 retained by a retaining mechanism 23, inner flaps 119 or tabs 115B, 115C and 115D serving as the open/close means are held down from outside by the outer flap 118 or tab 115A while closing the exhaust hole 41B. When the airbag 36D inflates with belt 60 released from the retaining mechanism 23, inner flaps 119 open and expand the opening area of the exhaust hole 41B.

In other words, when the airbag 36D inflates with belt 60 retained by the retaining mechanism 23, outer flap 118 or tab 115A of the flap element 110 holds down the inner flaps 119 and prevents the same from floating up due to the pressure of inflation gas, which suppresses emission of inflation gas from the exhaust hole 41B.

Especially in the eighth embodiment, outer flap 118 or tab 115A and inner flaps 119 or tabs 115B, 115C and 115D are arranged radially around the exhaust hole 41B, and hinge portions 113a of the outer flap 118 and inner flaps 119 surround the periphery of the exhaust hole 41B thoroughly. Outer flap 118 and inner flaps 119 close the exhaust hole 41B in a mutually piled-up manner. With this arrangement, when the airbag 36D inflates with the belt 60 of the flap element 110 retained by the retaining mechanism 23, inner flaps 119 arrested by the outer flap 118 seal the exhaust hole 41B tightly and prevents inflation gas from being emitted therefrom.

In the eighth embodiment, moreover, when the airbag 36D inflates with the belt 60 released from the retaining mechanism 23, outer flap 118 and inner flaps 119 open around the hinge portions 113a due to the pressure of inflation gas G, thereby opening the exhaust hole 41B. That is, since outer flap 118 and inner flaps 119 open automatically due to the pressure of inflation gas upon disengagement of belt 60 from the retaining mechanism 23, the exhaust hole 41B secures a wide opening area in a stable manner. In addition, since the straight hinge portions 113a of the outer flap 118 and inner flaps 119 are disposed offset from one another, the flaps open smoothly to expose the exhaust hole 41B.

Therefore, the airbag apparatus M8 of the eighth embodiment is also capable of controlling the opening and closing operations of the exhaust hole 41B securely with a simple structure.

In the eighth embodiment, too, the exhaust hole 41B is so formed through the vehicle body side wall 38D of airbag 36D or airbag body 37D as to open at any time in a generally round shape. Accordingly, when the airbag 36D inflates with the belt 60 of the flap element 110 released from the retaining mechanism 23, emission of inflation gas from the airbag 36D is decided by the opening area of the exhaust hole 41B, so that emission of inflation gas is stabilized.

In the eighth embodiment, furthermore, when closing the exhaust hole 41B, three inner flaps 119 (tabs 115B, 115C and 115D) overlap with one another partially alternately i.e. in such a manner that left regions 115Bb, 115Cb, 115Db and right regions 115Ba, 115Ca, 115Da are counterchanged in the in-out relationship. With this arrangement, if the inner flaps 119 are pushed by the inflation gas when the airbag 36D inflates with the belt 60 retained by the retaining mechanism 23, the overlap of the flaps 119 is not easily dissolved because of a friction occurring on planes of alternately piled up left regions 115Bb, 115Cb, 115Db and right regions 115Ba, 115Ca, 115Da of flaps 119. Accordingly, inner flaps 119 are prevented from floating up due to the pressure of inflation gas and thereby preventing gas leakage from the exhaust hole 41B when the airbag 36D inflates with the belt 60 retained by the retaining mechanism 23. On the other hand, when the airbag 36D inflates with the belt 60 released from the retaining mechanism 23, the overlap of flaps 119 is easily dissolved by the pressure of inflation gas, because flaps 119 are made of flexible woven fabric and are merely mutually engaged by slits 116. Accordingly, the exhaust hole 41B opens smoothly.

Figure 29A:
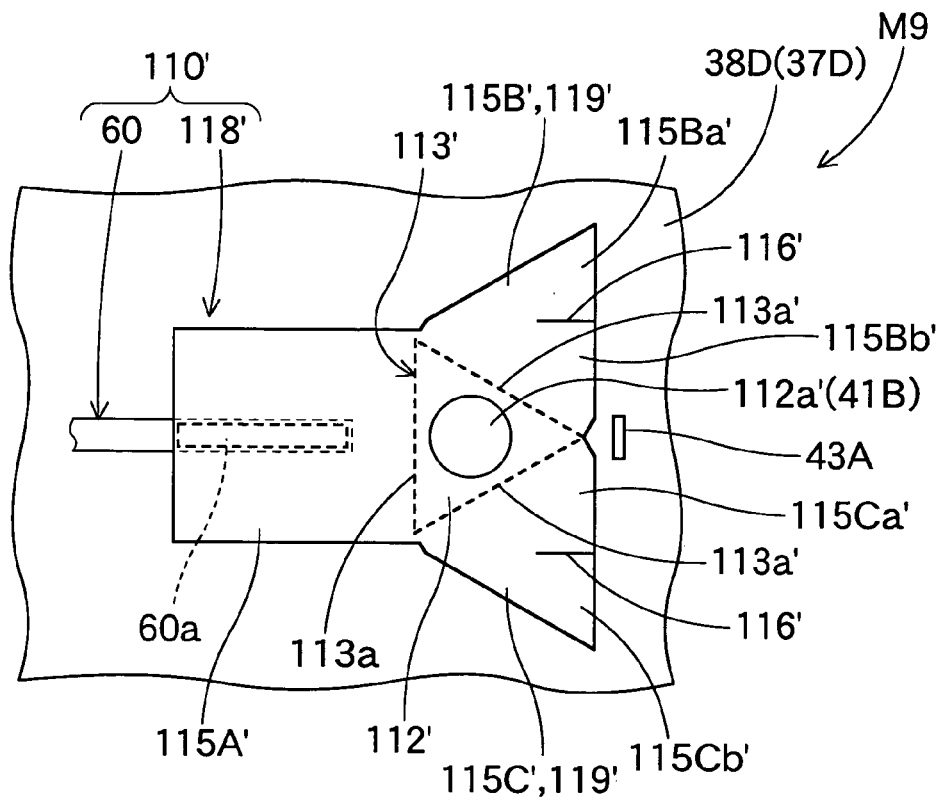
FIG. 29A schematically illustrates a flap element according to the ninth embodiment.
Figure 29B:
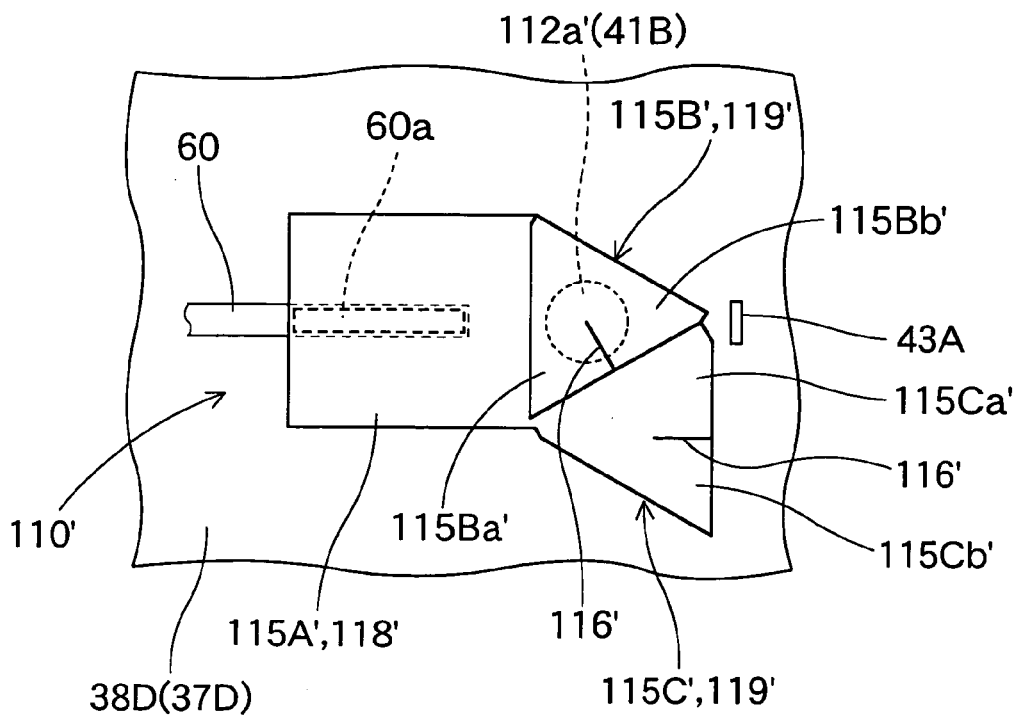
FIGS. 29B, 30A and 30B schematically illustrate a process of shutting up an exhaust hole with the flap element of FIG. 29A.

Although the eighth embodiment employs three inner flaps 119 as the open/close means, the number of inner flaps should not be limited thereby. For example, the arrangement of the ninth embodiment will also be appreciated as will be described and as shown in FIGS. 29A, 29B, 30A and 30B. An airbag apparatus M9 of the ninth embodiment includes two inner flaps 119' serving as the open/close means and a flap element 110' as shown in FIG. 29A. Similar to the eighth embodiment, outer flap 118' of the flap element 110' and two inner flaps 119' are manufactured as part of a cloth member 111' having three tabs 115A', 115B' and 115C'. A anchor region 112' positioned at the center of the cloth member 111' has a generally equilateral triangular shape one of whose sides is located in the front side. Tabs 115A', 115B' and 115C' extend from the anchor region 112' toward the front, left and right directions.

Similar to the above-described cloth member 111, anchor region 112' is provided at its center with a round through hole 112a' corresponding to the exhaust hole 41B. Anchor region 112' is sewn to the vehicle body side wall 38D in its entire periphery, thereby providing a generally equilateral triangular joint portion 113' enclosing the through hole 112a' all over. Each of straight sides 113a' of the joint portion 113' serves as a hinge portion of the tabs 115'. Of course, the length of each side or hinge portion 113a' of the joint portion 113' is greater than the diameter of the exhaust hole 41B.

Referring to FIG. 29A, out of tabs 115A', 115B' and 115C', the tab 115A' located in the front side has a generally quadrangular contour capable of covering other tabs 115B' and 115C', and serves as the outer flap 118'. A belt 60 is sewn to the leading end of the outer flap 118'. Tabs 115B' and 115C' located at lateral sides serve as inner flaps 119', and each has generally the same triangular contour as the anchor region 112'. Each of the inner flaps 119' or tabs 115B' and 115C' is provided with a slit 116' in the vicinity of lateral center in the rear side.

Figure 30A:
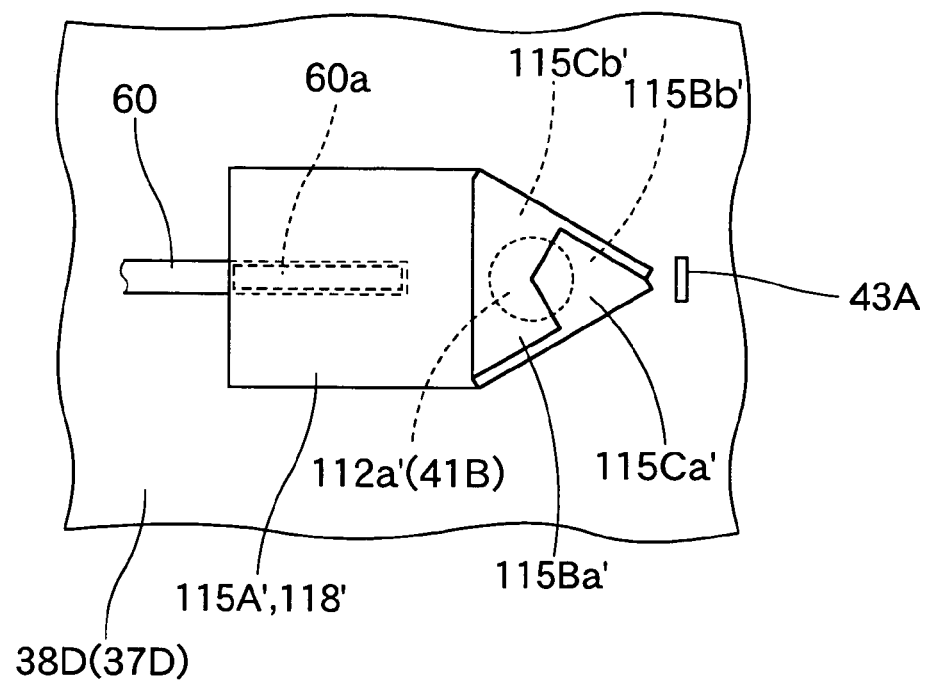
Figure 30B:
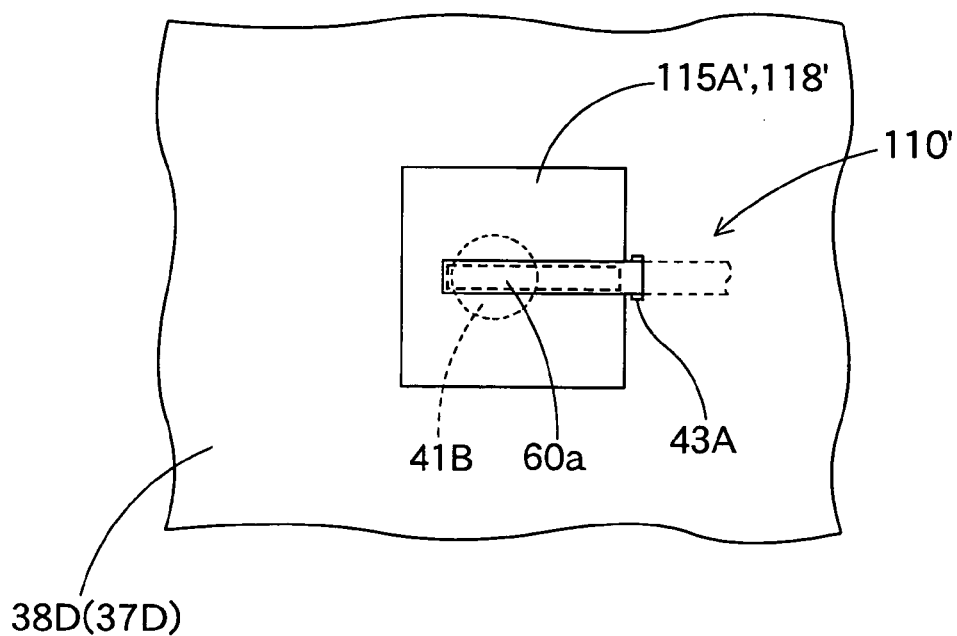

To arrange the flap element 110' to close the exhaust hole 41B, similarly to the above-described flap element 110, one of inner flaps 119' or tab 115B' is firstly folded over the exhaust hole 41B on the hinge portion 113a' (FIG. 29B), and then the other inner flap 119' or tab 115C' is folded over the tab 115B' around the hinge portion 113a'. At this time, slits 116' of tabs 115B' and 115C' are used to locate a right region 115Ca' of tab 115C' outside a left region 115Bb' of tab 115B' whereas a left region 115Cb' of tab 115C' inside a right region 115Ba' of tab 115B' (FIG. 30A). Thereafter, as shown in FIG. 30B, outer flap 118' or tab 115A' is folded over the exhaust hole 41B on the hinge portion 113a', and belt 60 is put through an insert hole 43A. Thus the exhaust hole 41B is sealed by the flap element 110'. With this flap element 110', too, outer flap 118' or tab 115A' and inner flaps 119' or tabs 115B' and 115C' are arranged radially around the exhaust hole 41B, and hinge portions 113a' of the outer flap 118' and inner flaps 119' surround the periphery of the exhaust hole 41B thoroughly. Accordingly, the exhaust hole 41B is sealed tightly and gas leakage therefrom is prevented.

The number of inner flaps 119 or 119' should not be limited thereby. Four or more inner flaps may be formed on condition that each of the inner flaps is constructed to cover the exhaust hole, and has a straight hinge portion which hinge portions in combination enclose the periphery of the exhaust hole all over. Although the outer flap 118/118' off lap element 110/110' and inner flaps 119/119' are both provided as part of the cloth member 111/111' as well as the anchor regions 112/112', the configuration of the outer flap and inner flaps should not be limited thereby. It will also be appreciated that separate members to form the outer flap and inner flaps are joined to the vehicle body sides wall 38D. However, if the tabs serving as the outer flap and inner flaps are integral via the anchor region just like the foregoing embodiments, the tabs are joined to the vehicle body side wall simply by sewing the anchor region to the vehicle body side wall at the periphery of the through hole. In comparison with an instance where the tabs are separately sewn to the vehicle body side wall, this arrangement will facilitate the sewing work and reduce the manufacturing processes of the airbag.

Figure 31:
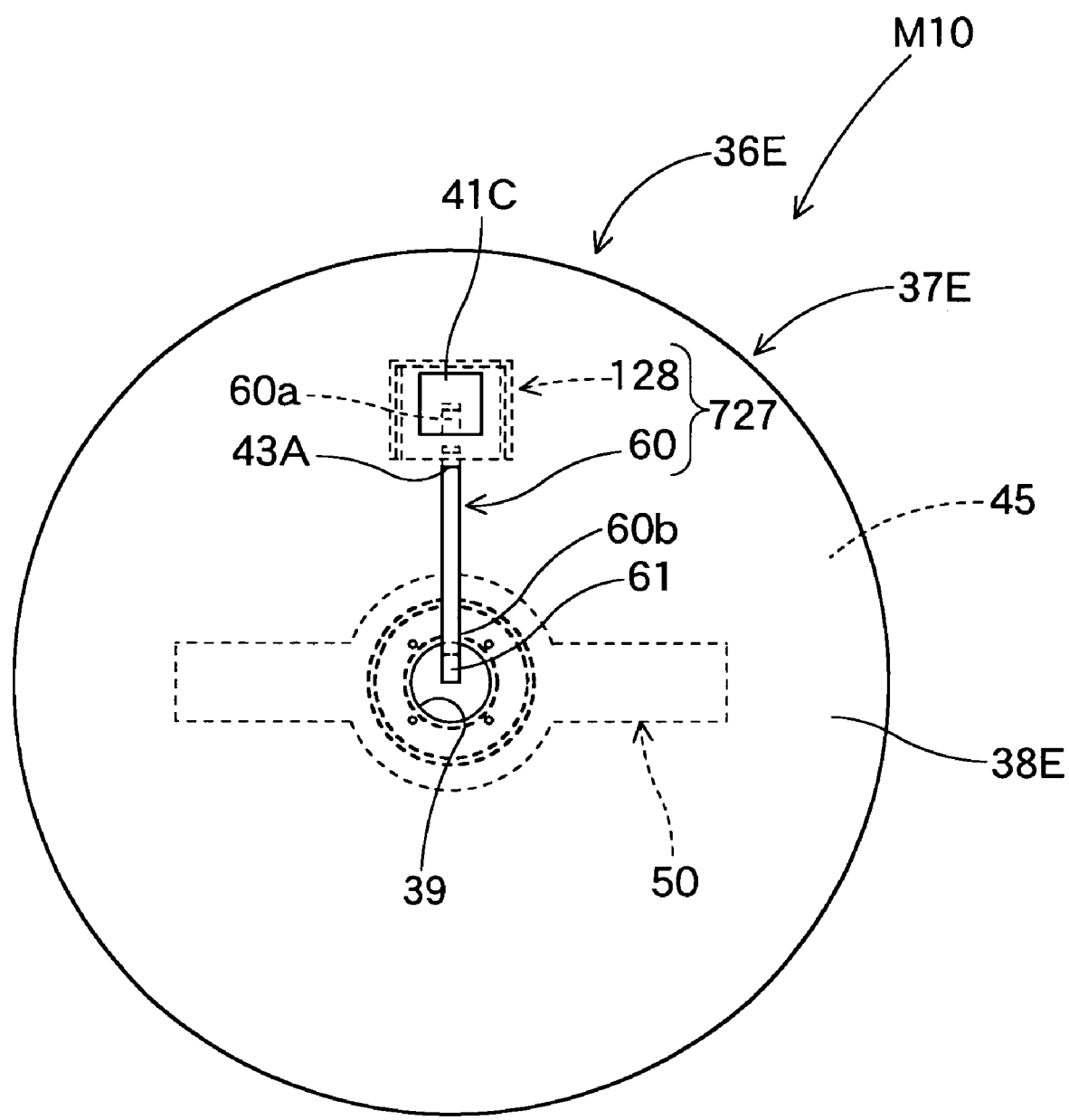
FIG. 31 is a bottom view of an airbag employing a flap element used in the tenth embodiment of the airbag apparatus.

An airbag apparatus M10 of the tenth embodiment is now described with reference to FIGS. 31 to 33. A flap element 127 is used for an airbag 36E as shown in FIG. 31. Airbag 36E includes only one insert hole 43A to insert a belt 60 of the flap element 127 in the vicinity of an exhaust hole 41C. Exhaust hole 41C of the airbag 36E has a generally quadrangular shape.

Figure 32:
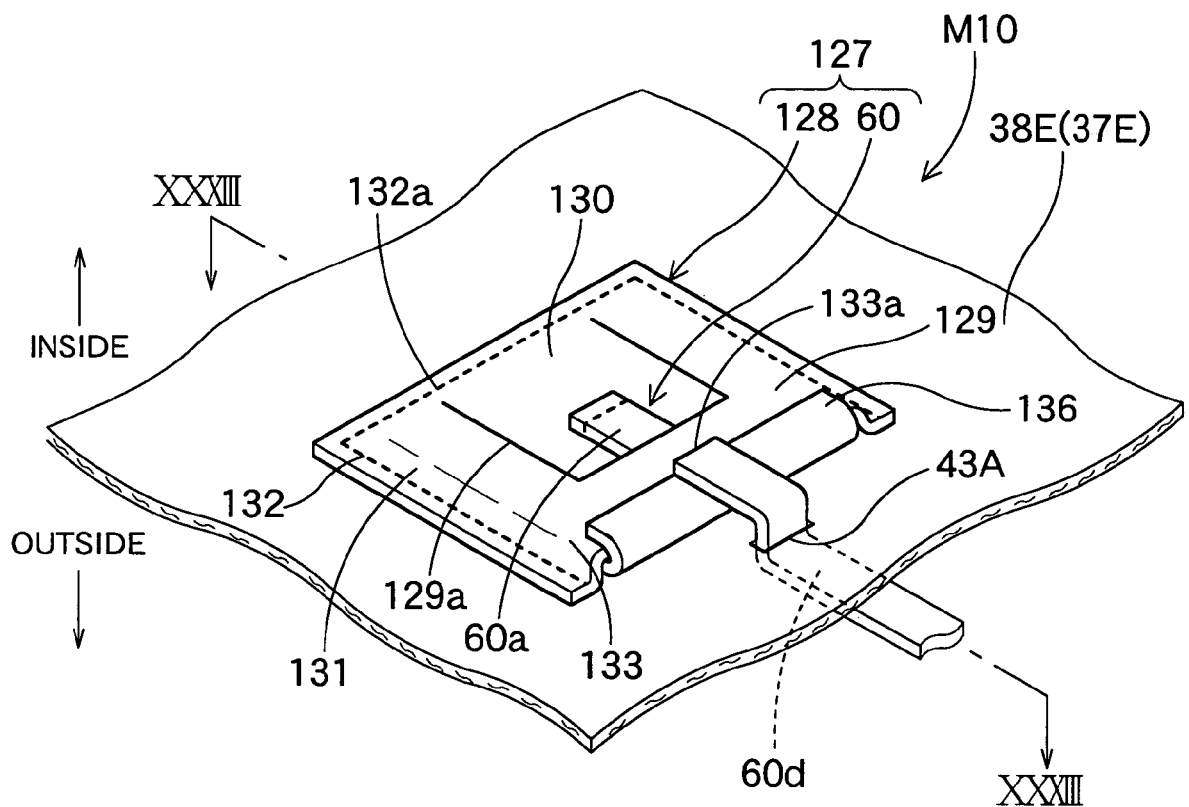
FIG. 32 is a schematic perspective view of the flap element of the tenth embodiment viewed from the interior of the airbag.
Figure 33:
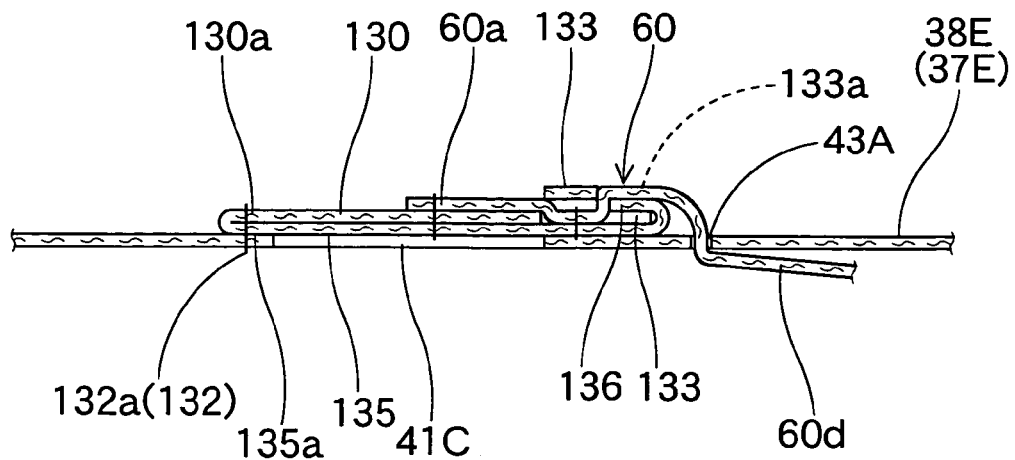
FIG. 33 is a schematic section of the flap element of FIG. 32 taken along line XXXIII-XXXIII of FIG. 32.

As shown in FIGS. 32 and 33, flap element 127 is formed by a cloth body portion 128 disposed on the inner surface of an airbag body 37E for closing the exhaust hole 41C and a belt 60 connected with the cloth body portion 128.

Figure 34:
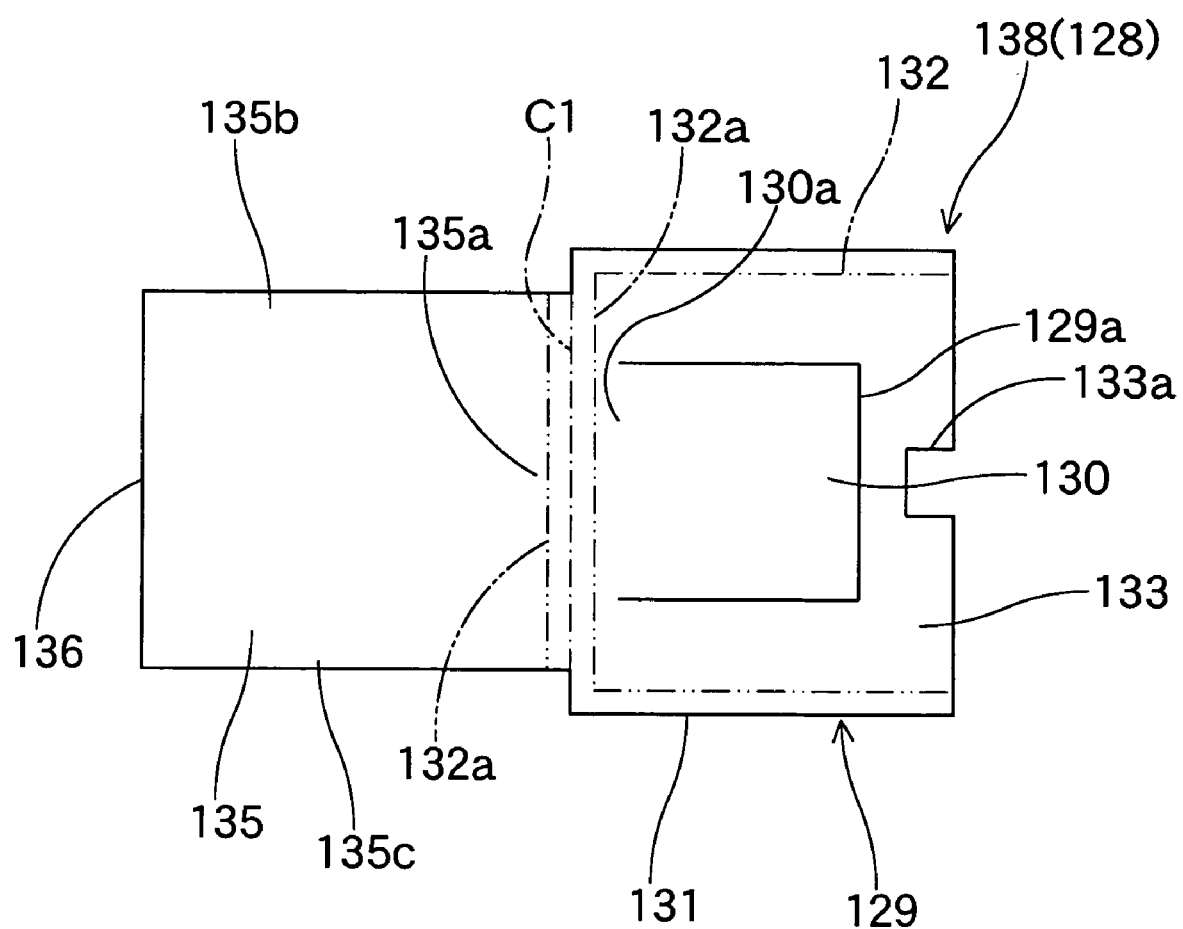
FIG. 34 is a development of a cloth body portion to form the flap element of FIG. 32.

Cloth body portion 128 is made of flexible fabric woven of polyamide, polyester yarn or the like as well as the airbag body 37E. As shown in FIGS. 32 to 34, cloth body portion 128 includes a anchor region 129 and a main body 135 disposed between the anchor region 129 and vehicle body side wall 38E for closing the exhaust hole 41C.

As shown in FIGS. 32, 34 and 35, anchor region 129 has a rectangular shape whose shorter sides are arranged along the generally longitudinal direction. Anchor region 129 is provided with a laid-down U-shaped slit 129a which extends continuously along the rear side and lateral sides, but not in the front side. A region inside the slit 129a is an auxiliary portion 130 joined to the main body 135 together with the belt 60. A region outside the slit 129a is a frame region 131 joined to the vehicle body side wall 38E. Auxiliary portion 130 is openable when the exhaust hole 41C opens as well as the main body 135 around its front end 130a positioned proximate a later-described hinge portion 132a of the main body 135. That is, the front end 130a serves as a hinge portion of the auxiliary portion 130. Belt 60 is sewn to the inner surface of auxiliary portion 130 at its root portion 60a, thus the auxiliary portion 130 reinforces an area around the root portion 60a of belt 60. In this embodiment, auxiliary portion 130 has the generally same contour as the exhaust hole 41C, and is disposed in the position corresponding to the exhaust hole 41C.

Frame region 131 is sewn to the vehicle body side wall 38E at its entire front, left and right edges but not at the rear edge, by which a joint portion 132 is provided. The main body 135 is also joined to the vehicle body side wall 38E at a front end region 132a of the joint portion 132 together with the frame region 131. The front end region 132a serves as a hinge portion of the main body 135.

A rear edge region of the frame region 131 serves as a holding portion 133. The holding portion 133 is joined to the vehicle body side wall 38E at its lateral edges by the joint portion 132, which lateral direction is orthogonal with the belt 60. The holding portion 133 is provided in the lateral center of rear edge with a generally rectangular cut-away recess 133a for receiving the belt 60.

Figure 35A:
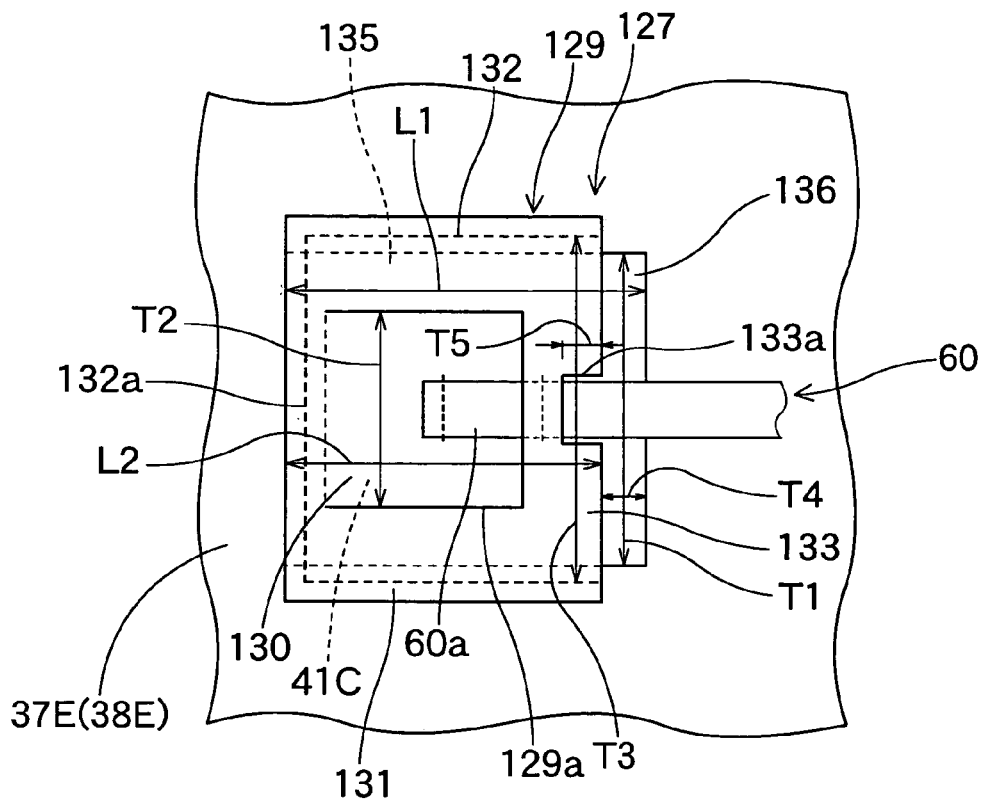
FIG. 35A is a plan view of the flap element of FIG. 32 before its leading end portion is folded back.

In this embodiment, main body 135 has a rectangular shape whose longer sides are arranged along the generally longitudinal direction. Main body 135 is sewn to the vehicle body side wall 38E at its front edge 135a by the joint portion 132 of the frame region 131, together with the frame region 131. The front end region 132a of the joint portion 132 located proximate the front edge 135a serves as a hinge portion of the main body 135. Main body 135 has a size capable of preventing gas leakage when closing the exhaust hole 41C and at the same time capable of passing through the exhaust hole 41C from the hinge portion 132a to project to the outside of airbag 36E when the exhaust hole 41C is opened. More specifically, the lateral width T1 of the main body 135 is greater than the lateral width T2 of the auxiliary portion 130 i.e. the exhaust hole 41C and smaller than the lateral width T3 of the joint portion 132 (FIG. 35A). The longitudinal length L1 of the main body 135 is, in a developed state, greater than the longitudinal length L2 of the frame region 131 so that the rear edge of the main body 135 facing away from the hinge portion 132a projects rearward from the holding portion 133 (FIG. 35A). To summarize, the main body 135 is disposed between the anchor region 129 and vehicle body side wall 38E, and is joined to the wall 38E only at the vicinity of its front edge 135a. Belt 60 sewn to the auxiliary portion 130 and to main body 135 is again sewn to the main body 135 at a rear end location facing away from the hinge portion 132a and overlapping with the holding portion 133.

Figure 35B:
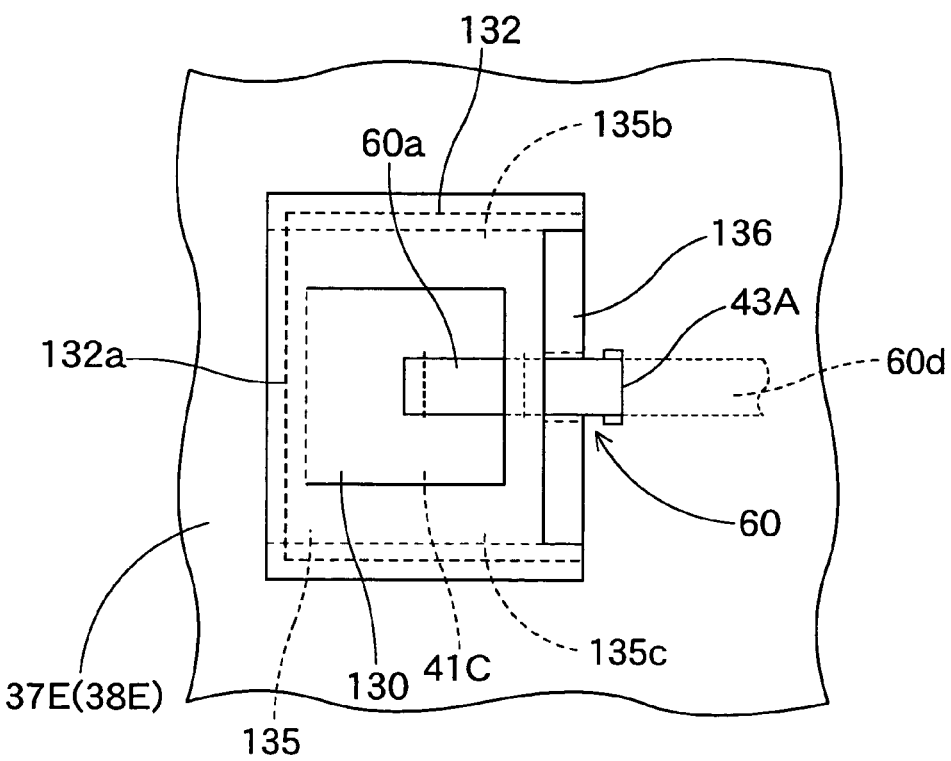
FIG. 35B is a plan view of the flap element of FIG. 32 after the leading end portion is folded back.

A leading end portion 136 of the main body 135 projecting rearward from the holding portion 133 (FIG. 35A) is folded back at the vicinity of the rear edge of the holding portion 133 and placed over the inner surface of the holding portion 133, and then the belt 60 is placed on the inner surface of the folded-back leading end portion 136 as shown in FIGS. 32, 33 and 35B. In this embodiment, the longitudinal dimension T4 of the leading end portion 136 is generally the same as the longitudinal dimension T5 of the recess 133a (FIG. 35A). With this arrangement, the leading end portion 136 is held down at its inner surface by the belt 60 projecting from the recess 133a. In other words, the main body 135 closes the rear periphery of the exhaust hole 41C by the leading end portion 136 located between the holding portion 133 and belt 60. Then the belt 60 is inserted through the insert hole 43A formed at the rear side of the holding portion 133 and in the periphery of the exhaust hole 41C, so that the leading end 60b or loop 61 of the belt 60 is located outside the airbag 36E (FIG. 31).

Figure 36:
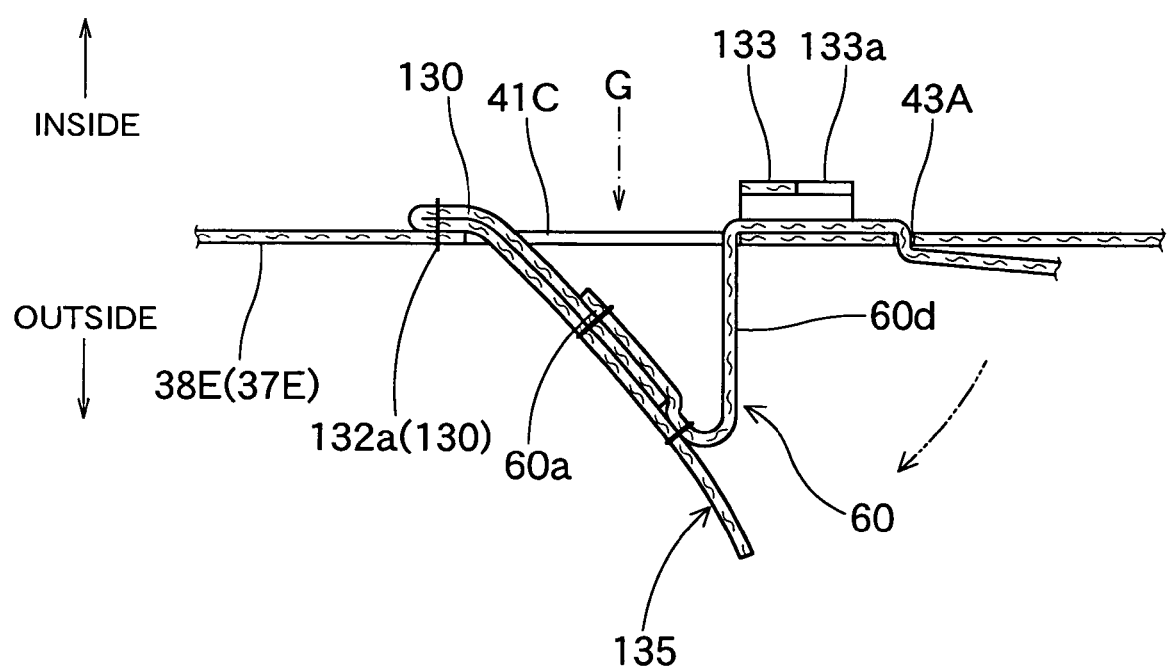
FIG. 36 is a partial enlarged section of the flap element of FIG. 32 released from the retaining mechanism, where the exhaust hole is opened.

In the airbag apparatus M10 of the tenth embodiment, too, the loop 61 formed at the leading end 60b of the belt 60 is adapted to be retained by a retaining mechanism 23 provided on a bottom wall 13 of a bag holder 11. The length of the belt 60 is so set as to allow the airbag 36E to inflate smoothly in a condition where the loop 61 is retained by a retaining pin 24 of the retaining mechanism 23. When the airbag 36E expands and inflates with the loop 61 released from the retaining mechanism 23, the main body 135 is pushed by inflation gas fed to the airbag 36E, and opens around the hinge portion 132a toward the outside the airbag 36E while passing through the exhaust hole 41C (FIG. 36). Along with the movement of the main body 135, a portion 60d of belt 60 located proximate the main body 135 moves to the outside of the airbag 36E.

As shown in FIG. 34, the cloth body portion 128 is formed of a cloth member 138 formed into such a contour that the anchor region 129 and main body 135 are disposed side by side and coupled at the front ends with their lateral centers matched with each other. The flap element 127 is manufactured in the following manner: The cloth member 138 preliminarily provided with the slit 129a in the anchor region 129 is folded back on a crease C1 extending in the lateral direction (FIG. 34) i.e., in the front edge of both the anchor region 129 and the main body 135. The belt 60 is sewn to the auxiliary portion 130 and the main body 135 at the root portion 60a. Then the cloth member 138 is placed on the inner surface of the vehicle body side wall 38E so that the anchor region 129 faces toward the interior of airbag 36E, and is sewn to the wall 38E at the joint portion 132 (FIG. 35A). Thereafter, the leading end portion 136 projecting from the holding portion 133 is folded back at the rear edge of the holding portion 133 and placed on the inner side of the holding portion 133 so that the leading end 136 is disposed between the holding portion 133 and belt 60. If then the belt 60 is inserted through the insert hole 43A in the vehicle body side wall 38E, the exhaust hole 41C is closed by the flap element 127.

In the tenth embodiment, the main body 135 of the flap element 127 is located on the inner surface of the airbag 36E and has a size capable of preventing gas leakage when closing the exhaust hole 41C. That is, when the airbag 36E expands and inflates with the flap element 127 retained by the retaining mechanism 23 serving as the open/close controller, main body 135 closes the exhaust hole 41C tightly thereby preventing gas leakage from the hole 41C. In the tenth embodiment, moreover, main body 135 of flap element 127 and retaining mechanism 23 is located apart from each other, and belt 60 joined to the main body 135 is inserted through the insert hole 43A located proximate to the exhaust hole 41C. In other words, belt 60 located inside the airbag 36E in the main body 135 is inserted through the wall 38E in the vicinity of the exhaust hole 41C to be located outside the airbag 36E. Therefore, when the belt 60 is retained by the retaining mechanism 23, it is held in the vicinity of the hole 41C by the vehicle body side wall 38E. To paraphrase, the portion 60d of the belt 60 closer to the end 60b than the exhaust hole 41C and located outside the airbag 36E is held by the vehicle body side wall 38E. As a result, if the airbag 36E inflates with the belt 60 retained by the retaining mechanism 23, the belt 60 is prevented from floating up from the exhaust hole 41C, so that the main body 135 closes the hole 41C tightly and gas leakage therefrom is suppressed.

In the tenth embodiment, main body 135 of the flap element 127 has such a size capable of passing through the exhaust hole 41C from the hinge portion 132a and projecting to the outside the airbag 36E when the hole 41C is opened. With this construction, when the airbag 36E expands and inflates with the belt 60 released from the retaining mechanism 23, the main body 135 is pushed by inflation gas G and opens around the hinge portion 132a in such a manner as to project outside the airbag 36E from the exhaust hole 41C, thereby opening the hole 41C. The portion 60d of belt 60 located proximate the main body 135 moves to the outside of the airbag 36E along with the movement of the main body 135, which helps move the main body 135 to the outside smoothly. That is, with the above airbag 36E, too, when disengaged from the retaining mechanism 23, main body 135 opens automatically due to the pressure of inflation gas in such a manner as to expand the opening area of the exhaust hole 41C. Hence, a great deal of inflation gas is emitted from the exhaust hole 41C. Accordingly, emission of inflation gas from the exhaust hole 41C and the internal pressure of the completely inflated airbag 36E vary depending on whether or not the flap element 127 is retained by the retaining mechanism 23.

In the tenth embodiment, too, the flap element 127 is capable of being folded up together with the airbag 36E, and thus can be housed together with the airbag 36E, which contributes to keep the apparatus compact and simple.

Therefore, the airbag apparatus M10 of the tenth embodiment is also capable of controlling the opening and closing operations of the exhaust hole 41C securely with a simple structure.

In addition, in the tenth embodiment, the airbag 36E is housed in a condition where the rear end region of the main body 135 of flap element 127 apart from the hinge portion 132a is closed by the leading end portion 136 folded back over the inner surface of the holding portion 133. With this arrangement the leading end portion 136 is disposed between the belt 60 and the holding portion 133, and accordingly, when the airbag 36E expands and inflates with the belt 60 retained by the retaining mechanism 23, the leading end portion 136 is held down by the belt 60 to stay in the folded-back state. Accordingly, lateral edges 135b and 135c of the main body 135 (FIGS. 34 and 35B), which edges extend from the leading end portion 136 toward the hinge portion 132a, are prevented from partially curling up toward the exhaust hole 41C. Consequently, the hole 41C is sealed by the sheet-shaped main body 135 in a stable manner, and gas leakage is further suppressed.

Figure 37A:
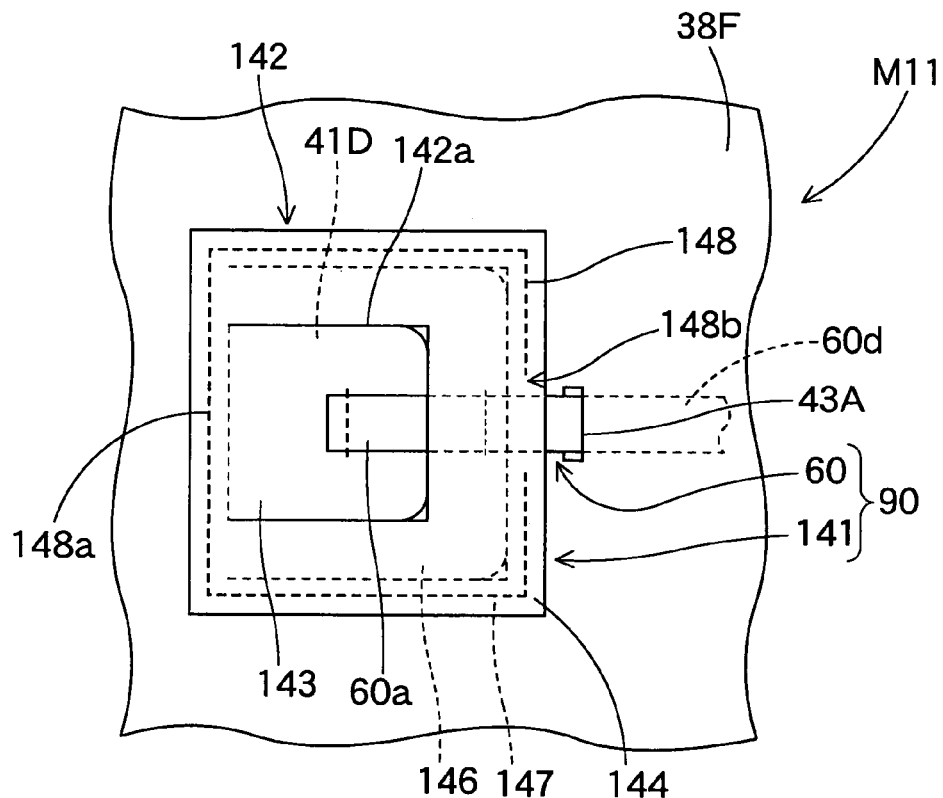
FIG. 37A is a plan view of a flap element used in the eleventh embodiment of the airbag apparatus.
Figure 37B:
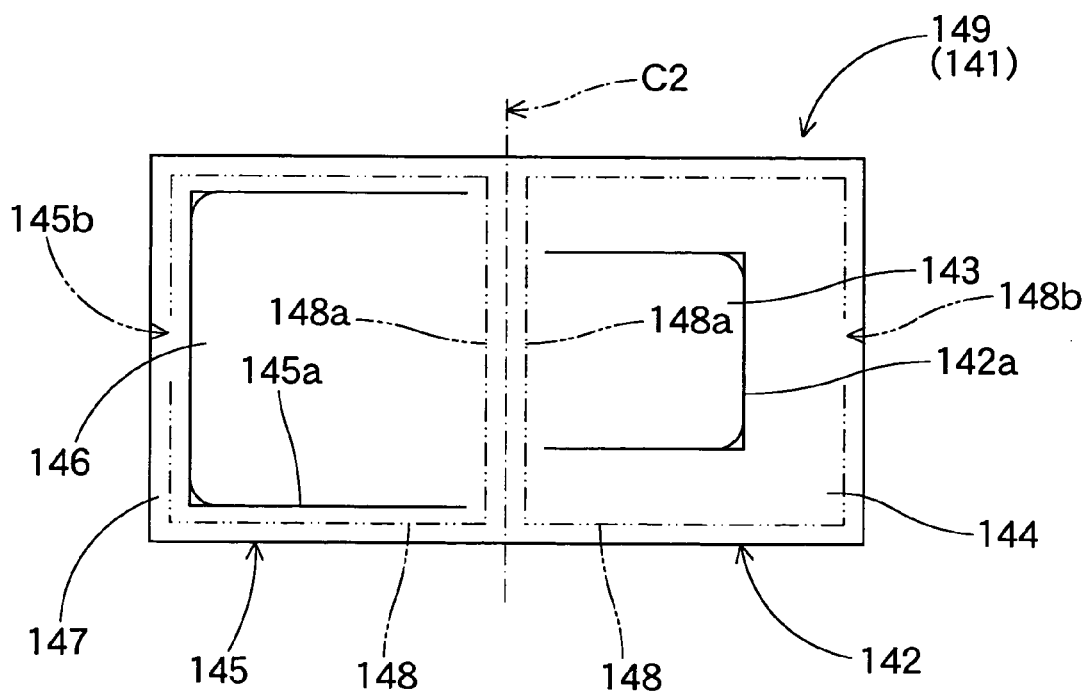
FIG. 37B is a development of a cloth member to form the flap element of FIG. 37A.
Figure 38:
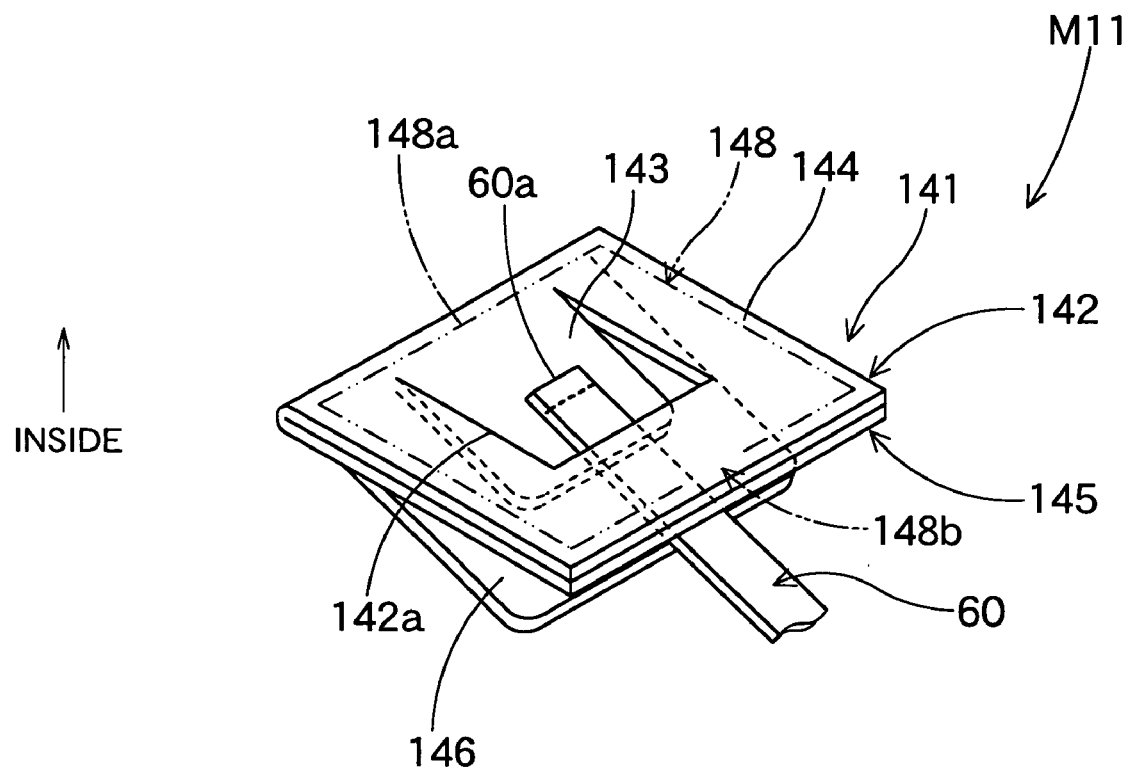
FIG. 38 is a schematic exploded perspective view of the flap element of FIG. 37A.
Figure 38:
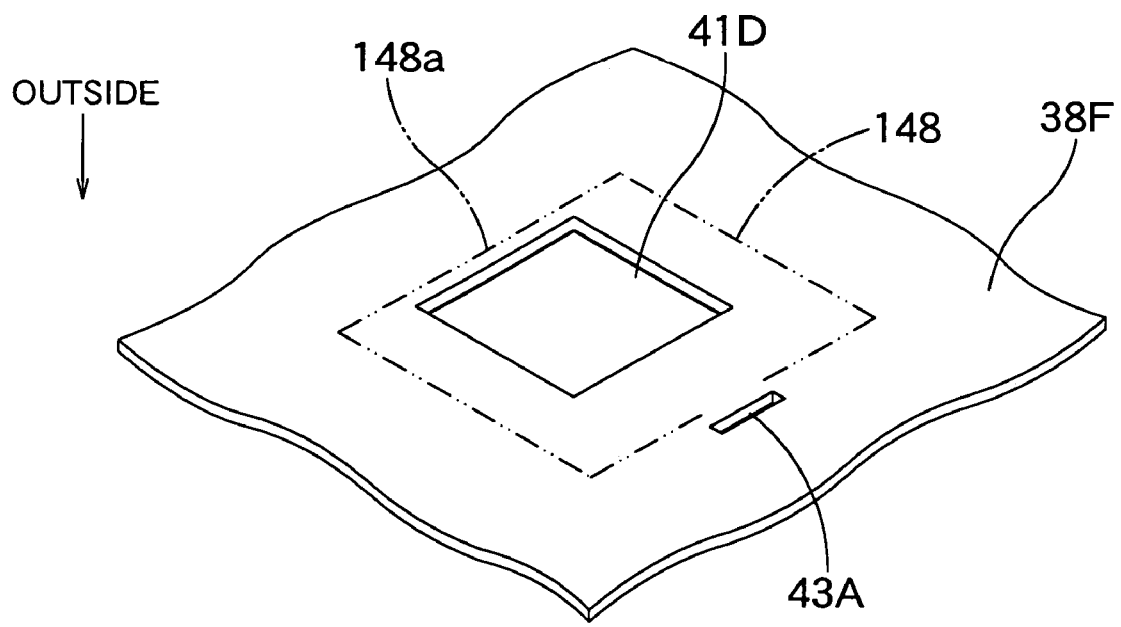

Without considering the above point, it will also be appreciated to employ a flap element 140 used for an airbag apparatus M11 of the eleventh embodiment as illustrated in FIGS. 37A, 37B and 38. Flap element 140 includes a cloth body portion 141 formed by a generally rectangular cloth member 149. As shown in FIG. 37B, cloth member 149 includes an anchor region 142 and a principal region 145 having identical contours. As shown in FIGS. 37A and 38, the cloth body portion 141 is disposed on the inner surface of the vehicle body side wall 38F in a condition where the anchor region 142 is located on the inner surface of the principal region 145.

Anchor region 142 is provided in its center with a laid-down U-shaped slit 142a which extends continuously along the rear side and lateral sides, but not in the front side. A region inside the slit 142a is an auxiliary portion 143 joined to a later-described main body 146 together with a belt 60. A region outside the slit 142a is a frame region 144 joined to the vehicle body side wall 38F. Auxiliary portion 143 has the same contour as an exhaust hole 41D in the vehicle body side wall 38F, and is disposed in the position corresponding to the exhaust hole 41D.

Principal region 145 is provided in its center with a laid-down U-shaped slit 145a which extends continuously along the rear side and lateral sides, but not in the front side. A region inside the slit 145a is a main body 146 whereas a region outside the slit 145a is a frame region 147 joined to the vehicle body side wall 38F. Main body 146 has a size capable of preventing gas leakage when closing the exhaust hole 41D and at the same time capable of passing through the exhaust hole 41D from a later-described hinge portion 148a to project to the outside of airbag when the exhaust hole 41D is opened. More specifically, longitudinal and lateral dimensions of the main body 146 are greater than those of the auxiliary portion 143 i.e. the exhaust hole 41D. In the same manner as the above-described cloth body portion 128, belt 60 is sewn to the auxiliary portion 143 and main body 146 at its root portion 60a, and again sewn to the main body 146 at an intermediate position apart from the root portion 60a.

The cloth member 149 of this embodiment is folded back on a crease C2 (FIG. 37B) i.e. the front edge of both the anchor region 142 and principal region 145, and is sewn to the vehicle body side wall 38F at the entire edges of the frame regions 142 and 147 in a state where the frame regions 142 and 147 overlap with each other, while leaving a region or gap 148b in the rear side unsewn for inserting the belt 60. This sewing work provides a joint portion 148, and a front end 148a of the joint portion 148 serves as a hinge portion of the main body 146.

With this flap element 140, a leading end or rear end region of the main body 146 facing away from the hinge portion 148a is not folded back and therefore not closed. However, since the main body 146 has a size capable of preventing gas leakage when closing the exhaust hole 41D, if the airbag expands and inflates with the belt 60 retained by a retaining mechanism 23, the exhaust hole 41D is securely closed by the main body 146, and gas leakage from the hole 41D is prevented. Of course, when the airbag expands and inflates with the belt 60 released from the retaining mechanism 23, main body 146 is pushed by inflation gas and opens around the hinge portion 148a, and then passes through the exhaust hole 41D to the outside of airbag. Hence, exhaust hole 41D is opened smoothly.

Figure 39A:
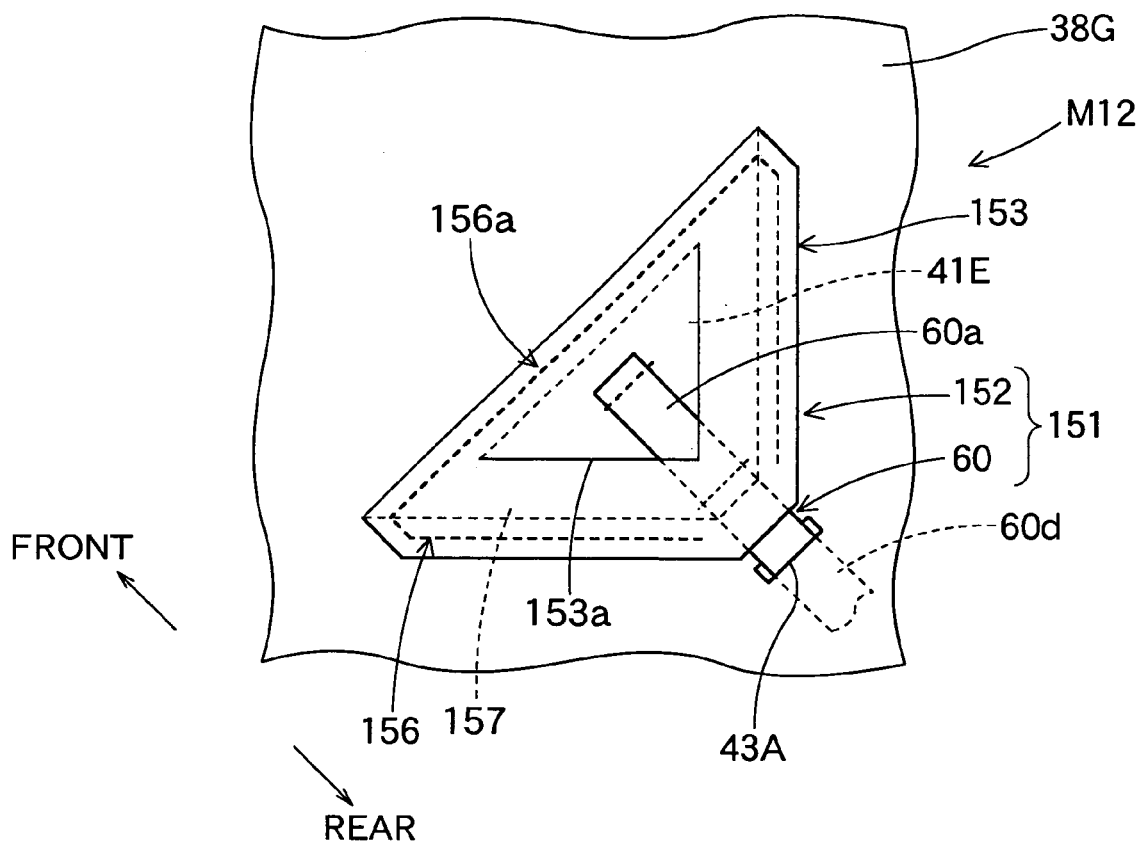
FIG. 39A is a plan view of a flap element used in the twelfth embodiment of the airbag apparatus.
Figure 39B:
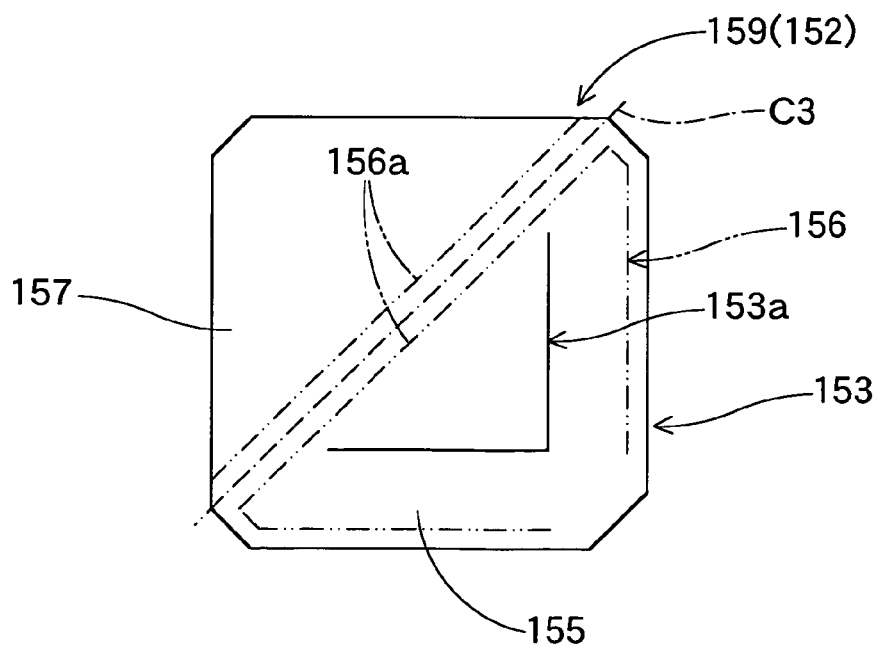
FIG. 39B is a development of a cloth member to form the flap element of FIG. 39A.
Figure 40:
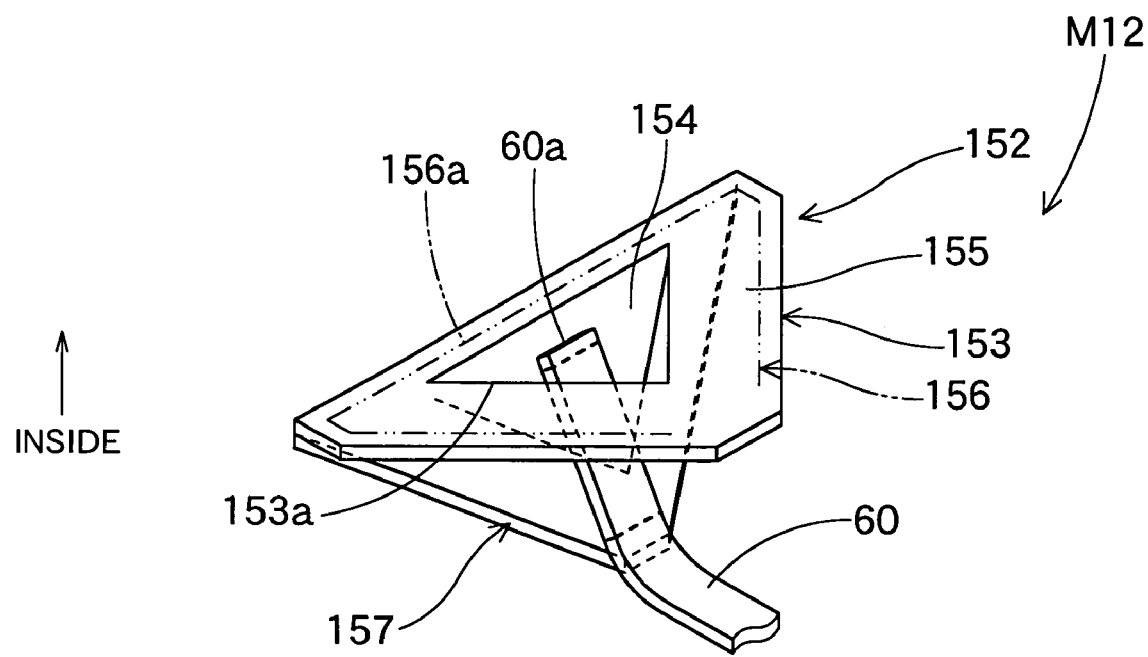
FIG. 40 is a schematic exploded perspective view of the flap element of FIG. 39A.
Figure 40:
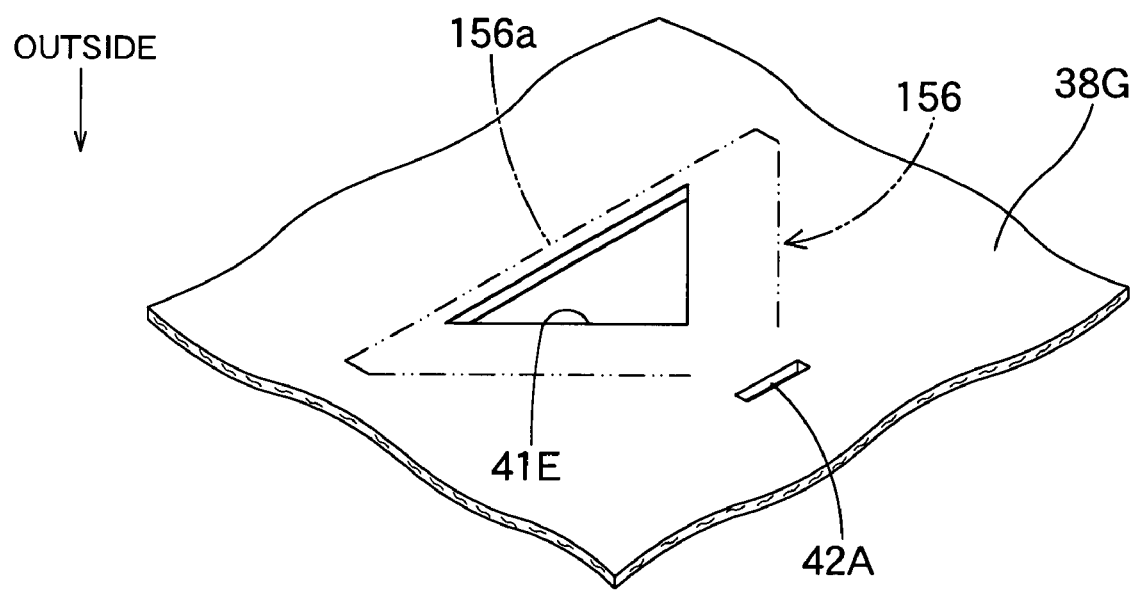

An airbag apparatus M12 of the twelfth embodiment is now described with reference to FIGS. 39A, 39B and 40. In this embodiment, an exhaust hole 41E formed in the vehicle body side wall 38G has a generally right-angled triangular shape. As shown in FIG. 39A, exhaust hole 41E is formed in such a manner that its hypotenuse runs along the lateral direction in the front side. As shown in FIG. 39B, a flap element 151 includes a cloth body portion 152 composed of a cloth member 159 having such a generally square contour that a right-angled triangular anchor region 153 and a main body 157 are connected at their hypotenuse. As shown in FIGS. 39A and 40, the anchor region 153 is disposed on the inner side of the main body 157.

Anchor region 153 has a generally right-angled triangular shape whose hypotenuse is arranged along the lateral direction in the front side. Anchor region 153 is provided with a generally L-shaped slit 153a which slit is not located in the front side. A region inside the slit 153a is an auxiliary portion 154 joined to the main body 157 together with a belt 60 and having a contour corresponding to an exhaust hole 41E. A region outside the slit 153a is a frame region 155 joined to the vehicle body side wall 38G. Frame region 155 is sewn up to the vehicle body side wall 38G at its entire edges except a region in the rear side, thereby providing a joint portion 156. Main body 157 is sewn up to the vehicle body side wall 38G together with the frame region 155 at a front end part 156a of the joint portion 156. This front end part 156a serves as a hinge portion of the main body 157.

Main body 157 has a generally right-angled triangular shape whose hypotenuse or hinge portion 156a is located in the front side, and has a size capable of preventing gas leakage when closing the exhaust hole 41E and at the same time capable of passing through the exhaust hole 41E from the hinge portion 156a to project to the outside of airbag when the exhaust hole 41E is opened. Main body 157 is sewn up only at its front side together with the frame portion 155 so that its edges except the front edge is located inside the joint portion 156 when the cloth member 159 is folded back on a crease C3 (FIG. 39B) i.e. the front edge of the anchor region 153 and main body 157. In the same manner as the above-described cloth body portion 128 and 141, belt 60 is sewn up to the auxiliary portion 153 and main body 157 at its root portion 60a, and again sewn to the main body 157 at an intermediate position apart from the root portion 60a.

With this flap element 151, a leading end or rear end region of the main body 157 apart from the hinge portion 156a is not folded back and therefore not closed. However, since the main body 157 has a size capable of preventing gas leakage when closing the exhaust hole 41E, if the airbag expands and inflates with the belt 60 retained by a retaining mechanism 23, the exhaust hole 41E is securely closed by the main body 157, and gas leakage from the hole 41E is prevented. Of course, when the airbag expands and inflates with the belt 60 released from the retaining mechanism 23, main body 157 is pushed by inflation gas and opens around the hinge portion 156a, and then passes through the exhaust hole 41E to the outside of airbag. Hence, exhaust hole 41E is opened smoothly.

In the cloth body portions 128, 141 and 152 of the flap elements 127, 140 and 151 in the tenth to twelfth embodiments, anchor regions 129, 142 and 153 each has an auxiliary portion 130/143/154 which is joined to the main body 135/146/157 by the belt 60 for enhancing the connecting strength of the root portion 60a of the belt 60. However, it will also be appreciated that the belt 60 is joined only to the main body 135/146/157 while the anchor region 129/142/153 has no auxiliary portion 130/143/154, in which instance the region of the auxiliary portion is cut away.

Although the foregoing embodiments have been described as applied to an airbag apparatus for a steering wheel, the application of the present invention should not be limited thereby. The present invention can also be applied for example to an airbag apparatus for a front passenger's seat.

What is claimed is:

1. An airbag apparatus comprising:
    an airbag inflatable with inflation gas from a folded and housed state, the airbag including an exhaust hole that is formed through a circumferential wall of the airbag in such a manner as to be opened at any time for emitting part of inflation gas;
    an open/close controller for controlling opening and closing operations of the exhaust hole;
    a flap element foldable together with the airbag, the flap element being releasably joined to the open/close controller and being joined to a periphery of the exhaust hole in an outer side of the airbag which periphery is in a side facing away from the open/close controller, upon airbag inflation if the flap element is retained by the open/close controller, the flap element holding down a circumference of the exhaust hole, and if the flap element is released from the open/close controller, the flap element opening by a pressure of inflation gas to open the exhaust hole; and
    an inner flap acting as an open/close means and joined to the periphery of the exhaust hole on the outer side of the airbag in a foldable manner, the inner flap, upon airbag inflation, if the flap element is retained by the open/close controller, being held down at an outer side thereof by the flap element to keep the exhaust hole closed, and if the flap element is released from the open/close controller, opening around a first joint portion joining the inner flap to the airbag due to the pressure of inflation gas such that the exhaust hole opens to exhaust inflation gas, wherein:
    the first joint portion of the inner flap is located opposite from a second joint portion that joins the flap element to the airbag with respect to the exhaust hole;
    both of the first joint portion and the second joint portion are bent in shape such that opposite ends thereof are directed toward the other joint portion; and
    the two joint portions enclose the exhaust hole thoroughly.

2. The airbag apparatus according to claim 1, wherein:
    the flap element includes a flap body that is located on the outer side of the airbag for opening and closing the exhaust hole and a belt that is joined to the flap body by a first end and coupled to the open/close controller by a second end; and
    a middle portion of the belt except the first and second ends connected to the flap body and open/close controller is disposed inside the airbag.

3. The airbag apparatus according to claim 2, wherein the belt is along the expanding direction of the airbag, upon airbag inflation when the flap element is retained by the open-close controller.

4. The airbag apparatus according to claim 2, wherein the flap body and the inner flap are jointed to the periphery of the exhaust hole by a single continuous stitching work in such an overlapping manner as to be slightly offset from each other.

* * * * *